United States Patent [19]
Morikawa et al.

[11] Patent Number: 6,079,629
[45] Date of Patent: Jun. 27, 2000

[54] VEHICLE HEATING APPARATUS HAVING COMBUSTOR

[75] Inventors: Toshio Morikawa, Toyota; Hikaru Sugi, Nagoya; Masashi Takagi; Hajime Ito, both of Kariya, all of Japan

[73] Assignee: Denso Corporation, Kariya, Japan

[21] Appl. No.: 09/324,307

[22] Filed: Jun. 2, 1999

[30] Foreign Application Priority Data

| Jun. 9, 1998 | [JP] | Japan | 10-161024 |
|---|---|---|---|
| Sep. 17, 1998 | [JP] | Japan | 10-263562 |
| Sep. 17, 1998 | [JP] | Japan | 10-263563 |
| Sep. 22, 1998 | [JP] | Japan | 10-268511 |
| Sep. 22, 1998 | [JP] | Japan | 10-268512 |
| Sep. 22, 1998 | [JP] | Japan | 10-268514 |
| Sep. 22, 1998 | [JP] | Japan | 10-268515 |
| Sep. 22, 1998 | [JP] | Japan | 10-268516 |
| Nov. 19, 1998 | [JP] | Japan | 10-329798 |

[51] Int. Cl.$^7$ ................................. B60H 1/02
[52] U.S. Cl. ................. 237/12.3 C; 237/12.3 R
[58] Field of Search ............ 237/12.3 C, 12.3 R, 237/2 A; 123/568.12, 568.15, 556, 550

[56] References Cited

U.S. PATENT DOCUMENTS

| 4,041,916 | 8/1977 | Lida et al. | 123/119 A |
|---|---|---|---|
| 4,207,848 | 6/1980 | Dinger et al. | 123/122 D |
| 4,625,910 | 12/1986 | Kawamura | 237/2 A |
| 5,947,374 | 9/1999 | Echigoya | 237/8 A |

FOREIGN PATENT DOCUMENTS 6-13251   2/1994   Japan .

*Primary Examiner*—Harold Joyce
*Assistant Examiner*—Derek Boles
*Attorney, Agent, or Firm*—Harness, Dickey & Pierce, PLC

[57] ABSTRACT

A heating apparatus for a vehicle includes a heat exchanger for heating air blown into a passenger compartment by using cooling water for cooling an engine as a heating source, and a combustor for heating cooling water flowing into the heat exchanger. When the combustor is stopped, exhaust gas of the engine is introduced into the combustor so that the exhaust gas of the engine is heat-exchanged with cooling water in the combustor, and is introduced into an intake pipe of the engine. Therefore, exhaust gas of the engine, introducing into the intake pipe of the engine, is cooled in the combustor without an additional heat exchanger provided in an engine compartment.

41 Claims, 35 Drawing Sheets

VEHICLE HEATING APPARATUS HAVING COMBUSTOR

CROSS-REFERENCE TO RELATED APPLICATION

This application is related to and claims priority from Japanese Patent Applications No. Hei. 10-161024 filed on Jun. 9, 1998, No. Hei. 10-263562 filed on Sep. 17, 1998, No. Hei. 10-263563 filed on Sep. 17, 1998, No. Hei. 10-268511 filed on Sep. 22, 1998, No. Hei. 10-268512 filed on Sep. 22, 1998, No. Hei. 10-268514 filed on Sep. 22, 1998, No. Hei. 10-268515 filed on Sep. 22, 1998, No. Hei. 10-268516 filed on Sep. 22, 1998, and No. Hei. 10-329798 filed on Nov. 19, 1998, the contents of which are hereby incorporated by reference.

BACKGROUND OF THE INVENTION

1. Field of the Invention

The present invention relates to a vehicle heating apparatus having a combustor for heating a passenger compartment of the vehicle by burning a fuel, and an exhaust gas recirculation system for recycling exhaust gas.

2. Description of Related Art

In a vehicle having a diesel engine or at a time immediately after starting an engine (e.g., a gasoline engine, a diesel engine), an amount of heat generated from the engine is too small to heat cooling water sufficiently. Therefore, in this case, a combustor is used as a supplementary heating source in a conventional heating apparatus. Further, for reducing nitrogen oxide contained in exhaust gas of the engine, exhaust gas from the engine is recycled to an intake side of the engine so that temperature of a combustion chamber is reduced. Because nitrogen oxide is restricted by reducing the temperature of the combustion chamber, the temperature of the combustion chamber is set as low as possible. However, when a heat exchanger for cooling the exhaust gas of the engine is provided, a space for mounting the heat exchanger in an engine room is necessary, and product cost of the vehicle is increased. On the other hand, in the conventional heating apparatus, heat generated from the engine is not effectively used, and fuel consumption effect of the heating apparatus is decreased. In the heating apparatus, when an exhaust pipe of the engine is simply connected to an exhaust side of the combustor, exhaust gas of the engine may reversely flow into the combustor and the combustor cannot be stably burned because pressure of exhaust gas of the engine is larger than that of the combustor. Further, when exhaust gas of the combustor is directly discharged into the atmosphere, unburned gas contained in the exhaust gas of the combustor may be discharged to the atmosphere.

SUMMARY OF THE INVENTION

In view of the foregoing problems, it is an object of the present invention to provide a heating apparatus for a vehicle having an exhaust gas circulating unit in which exhaust gas of an engine flowing into an intake side of the engine is cooled without an additional heat exchanger provided in an engine compartment.

It is an another object of the present invention to provide a heating apparatus for a vehicle having a combustor, which has sufficient heating capacity while fuel consumption effect is improved.

It is a further another object of the present invention to provide a heating apparatus for a vehicle having a combustor, which prevents exhaust gas of the combustor from being directly discharged to the atmosphere.

It is a further another object of the present invention to provide a heating apparatus for a vehicle, which is produced in low cost while a combustor is stably burned.

It is a further another object of the present invention to provide a heating apparatus having a combustor, which is readily mounted on a vehicle.

It is a further another object of the present invention to provide a heating apparatus for a vehicle having a combustor, in which ignition performance of the combustor is improved.

It is a further another object of the present invention to provided a heating apparatus for a vehicle having a combustor, in which nitrogen oxide contained in exhaust gas is sufficiently reduced.

According to an aspect of the present invention, when a combustor for heating cooling liquid supplying to a heat exchanger by burning fuel is stopped, exhaust gas of an engine is introduced into the combustor to be heat-exchanged with cooling liquid in the combustor, and thereafter is introduced into an intake pipe of the engine. Therefore, exhaust gas of the engine, circulating to the intake pipe of the engine, can be cooled in the combustor without an additional heat exchanger disposed in an engine compartment. Thus, it is not necessary to provide a space for providing the additional heat exchanger in the engine compartment.

Further, in the heating apparatus, when the combustor is operated when engine is operated with a rotation speed smaller than a predetermined rotation speed, air in the intake pipe is introduced into the combustor, and exhaust gas of the combustor is introduced into the engine through the intake pipe. On the other hand, when the engine is operated with a rotation speed larger than the predetermined rotation speed, the operation of the combustor is stopped and exhaust gas of the engine is discharged to the atmosphere after being passed through the combustor. Thus, the combustor is effectively used so that exhaust gas is heat-exchanged with cooling liquid in the combustor, while nitrogen oxide contained in exhaust gas is reduced.

According to an another aspect of the present invention, in a vehicle heating apparatus having a combustor, a switching unit is operated in such a manner that air is supplied to the combustor when a rotation speed of an engine is equal to or lower than a predetermined speed, and exhaust gas of the engine is introduced into the combustor when the rotation speed of the engine is larger than the predetermined speed. Therefore, even when the rotation speed of the engine is equal to or lower than the predetermined speed, the combustor is burned by using the introduced air, and heating capacity of the heating apparatus is improved. On the other hand, when the rotation speed of the engine is larger than the predetermined speed, exhaust gas of the engine is introduced into the combustor so that heat from the exhaust gas of the engine can be effectively used. Therefore, time for operation of the combustor can be made shorter, and fuel consumption effect in the combustor can be improved.

According to a further another aspect of the present invention, in a vehicle heating apparatus, when a temperature of exhaust gas of the engine is equal to or lower than a predetermined temperature, air is supplied to the combustor. On the other hand, when the temperature of exhaust gas of the engine is higher than the predetermined temperature, the exhaust gas of the engine is introduced into the combustor. Thus, the heating apparatus has sufficient heating capacity while fuel consumption effect is improved.

According to a further another aspect of the present invention, a vehicle heating apparatus includes a combustor for heating a passenger compartment by burning fuel, a switching unit for switching a case where exhaust gas of the combustor is introduced into an inlet pipe of an engine and a case where exhaust gas of the combustor is introduced into an exhaust pipe of the engine, and a control unit for controlling the switching unit. In the heating apparatus, the control unit has determining means for determining whether exhaust gas of the combustor is introduced into the intake pipe of the engine or into the exhaust pipe of the engine. Thus, the heating apparatus prevents exhaust gas of the combustor from being directly discharged to the atmosphere.

Preferably, the control unit controls the switching unit in such a manner that exhaust gas of the combustor is introduced into the intake pipe of the engine until a predetermined time passes after the combustor starts operating, and is introduced into the exhaust pipe of the engine after the predetermined time is passed after the combustor starts operating. Therefore, exhaust gas of the combustor at a time immediately after starting the operation of the combustor is stored in the intake pipe of the engine, and it can prevent exhaust gas of the combustor, having unburned gas, from being directly discharged to the atmosphere.

More preferably, the control unit controls the switching unit in such a manner that exhaust gas of the combustor is introduced into the intake pipe of the engine when oxygen concentration contained in exhaust gas of the combustor is equal to or larger than a predetermined oxygen concentration, and is introduced into the exhaust pipe of the engine when oxygen concentration of the exhaust gas of the combustor is smaller than the predetermined oxygen concentration. Therefore, it can prevent exhaust gas of the combustor, having unburned gas, from being directly discharged to the atmosphere.

Still more preferably, the control unit controls the switching unit in such a manner that exhaust gas of the combustor is introduced into the intake pipe of the engine when the burning temperature of the combustor is lower than a predetermined temperature, and is introduced into the exhaust pipe of the engine when the burning temperature of the combustor is equal to or higher than the predetermined temperature. Therefore, it can prevent exhaust gas of the combustor, having unburned gas, from being directly discharged to the atmosphere.

According to a further another object of the present invention, a vehicle heating apparatus includes a combustor for heating a passenger compartment by burning fuel, a first communication pipe through which an exhaust pipe of the engine communicates with an intake pipe of the engine, a switching valve disposed in the first communication pipe for opening and closing the first communication pipe, a second communication pipe through which an exhaust side of the combustor communicates with the first communication pipe at a position between the switching valve and the exhaust pipe, and a check valve disposed in the second communication pipe for preventing exhaust gas of the engine from flowing into the exhaust side of the combustor through the second communication pipe. In the heating apparatus, when the engine is operated when the combustor operates, the switching valve opens the first communication pipe. Therefore, when the engine is operated, exhaust gas of the combustor can be introduced into the engine without a volume type blower, and the combustor is stably burned. On the other hand, when the engine is stopped when the combustor operates, the switching valve closes the first communication pipe. Therefore, in this case, exhaust gas of the combustor is discharged to the atmosphere through the exhaust pipe of the engine.

According to a further another aspect of the present invention, in a vehicle heating apparatus, exhaust gas of the combustor is introduced into an exhaust pipe of an engine when the engine is stopped, and is introduced into the intake pipe of the engine when the engine is operated. Therefore, it can prevent exhaust gas of the engine from reversely flowing into the combustor without using a volume type blower, when the engine is operated. Thus, the combustor is stably burned while the heating apparatus is produced in low cost, and the heating apparatus having the combustor can be readily mounted on the vehicle.

According to a further another aspect of the present invention, a vehicle heating apparatus includes a heating unit for heating the passenger compartment by heat generated from the engine, a combustor for heating the passenger compartment by burning fuel, a first communication pipe through which an intake side of the combustor communicates with an intake pipe of an engine at an upstream side of a throttle valve in a flow direction of intake air, a second communication pipe through which an exhaust pipe of the engine communicates with the intake pipe of the engine at a downstream side of the throttle valve in the flow direction of intake air, a switching valve disposed in the second communication pipe for opening and closing the second communication pipe, and a third communication pipe through which an exhaust side of the combustor communicates with the second communication pipe at a position between the switching valve and the intake pipe. In the heating apparatus, the switching valve opens the second communication pipe and the throttle valve is closed when the engine is stopped when the combustor operates, and the throttle valve is opened when the engine is operated. Thus, when the engine is stopped, exhaust pipe of the combustor is discharged to the atmosphere from the exhaust pipe of the engine. On the other hand, when the engine is operated, the exhaust gas of the combustor is introduced into the engine without using a volume type blower, and the combustor can be stably burned.

According to a further another aspect of the present invention, in a vehicle heating apparatus having a combustor, exhaust gas of the combustor is introduced into a catalyst disposed in an exhaust pipe of an engine. Further, exhaust gas of the combustor is introduced into a muffler disposed in the exhaust pipe of the engine. Thus, exhaust pipe of the combustor can be cleaned and noise thereof can be reduced without additional catalyst and muffler for the combustor. Further, because exhaust gas of the combustor is introduced into the catalyst, temperature of the catalyst can be quickly heated, and the catalyst can be quickly activated.

According to a further another object of the present invention, in a vehicle heating apparatus having a combustor, air compressed by a supercharger of the vehicle is introduced into the combustor. Therefore, a blower for blowing air toward the combustor is not necessary, and compartments of the heating apparatus can be reduced. Further, in a vehicle having a diesel engine, fuel heated by a fuel heater for heating fuel supplying into the diesel engine is introduced into the combustor. Therefore, ignition performance of the combustor can be improved without providing an additional fuel heater.

According to a further another aspect of the present invention, a vehicle heating apparatus includes a combustor for heating the passenger compartment by burning fuel, a first communication pipe connected to an intake pipe of the engine at an upstream side of a throttle valve in a flow direction of intake air in such a manner that a part of intake air is introduced into the combustor, and a second communication pipe connected to the intake pipe of the engine at a downstream side of the throttle valve in the flow direction of intake air in such a manner that exhaust gas of the combustor is introduced into the intake pipe of the engine. Therefore, due to a pressure difference between the first communication pipe and the second communication pipe, air in the intake pipe is introduced into the combustor without a volume type blower for blowing air into the combustor. Thus, components of the heating apparatus can be reduced, and the heating apparatus is produced in low cost.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

Figure 1:
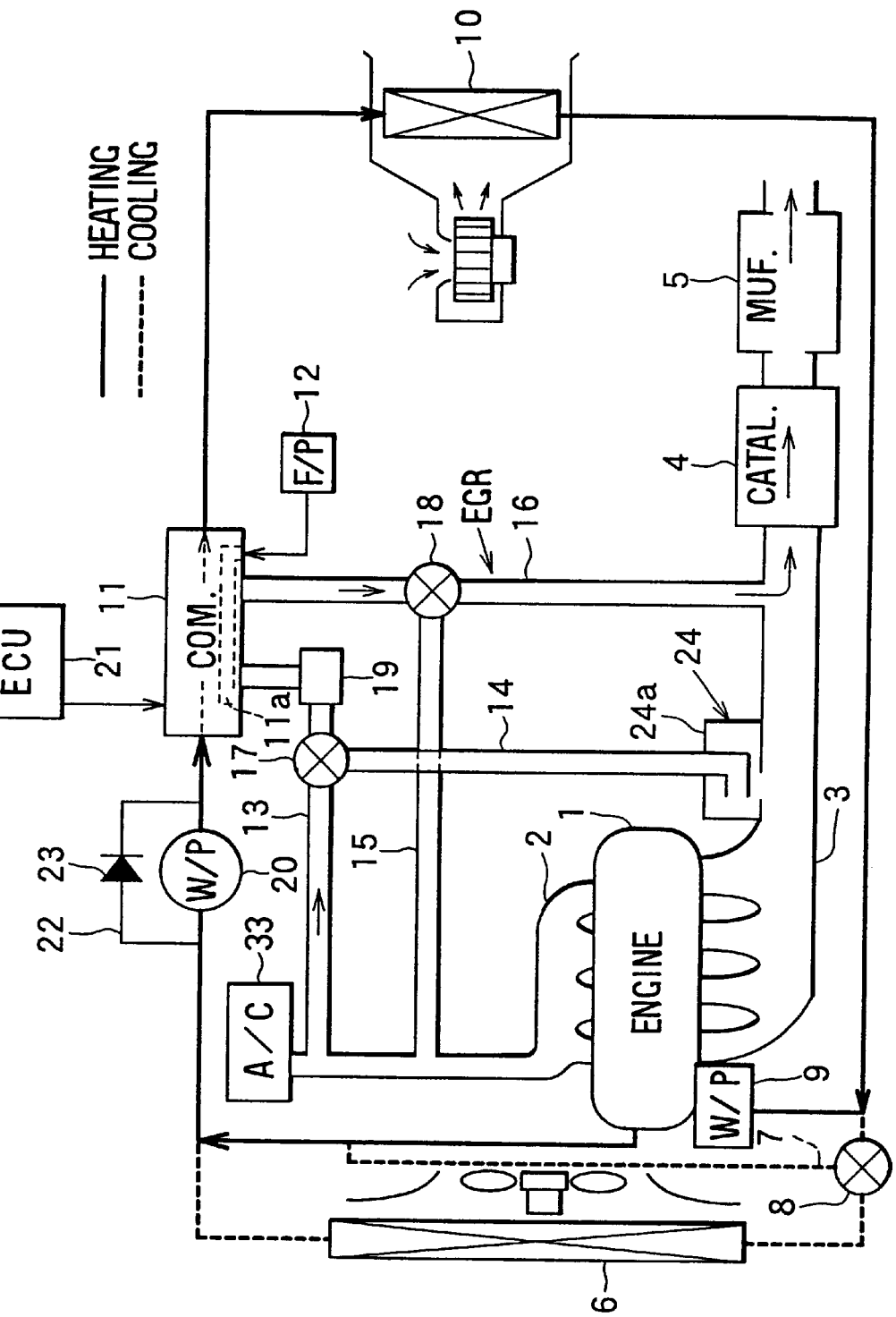
FIG. 1 is a schematic diagram showing a heating apparatus for a vehicle when an engine is stopped, according to a first preferred embodiment of the present invention.

A first preferred embodiment of the present invention will be now described with reference to FIGS. 1–4. In the first embodiment, a heating apparatus of the present invention is applied to a liquid-cooled internal combustion engine (e.g., a water-cooled diesel engine). FIG. 1 shows a circuit of a heating apparatus when a diesel engine 1 stops. Air cleaned in an air cleaner 33 is introduced into the engine 1 through an intake pipe 2.

Exhaust gas discharged from the engine 1 flows through an exhaust pipe 3. In the exhaust pipe 3, there is provided three way catalyst 4 catalyzing oxidation-reduction reaction of hydrocarbon or nitrogen oxide in the exhaust gas and a muffler (silencer) 5 for reducing noise of exhaust gas, flowing from the catalyst 4.

Cooling water for cooling the engine 1 flows through a radiator 6, and is cooled in the radiator 6. Cooling water flowing from the engine 1 returns to the engine 1 through a bypass passage 7 while bypassing the radiator 6. Cooling water flowing into the radiator 6 and cooling water flowing through the bypass passage 7 are switched by a thermostat 8. Cooling water circulates in a cooling water circuit of the heating apparatus by a water pump 9 driven by the engine 1. The water pump 9 and the bypass passage 7 may be provided within the engine 1.

In the heating apparatus, air blown into a passenger compartment of the vehicle is heated in a heater core 10 by using cooling water as a heating source. Cooling water flowing into the heater core 10 can be heated by a combustor 11. Fuel is burned in a combustion chamber 11a within the combustor 11 so that cooling water is heated in the combustor 11. Fuel is supplied to the combustor 11 by a fuel pump 12. That is, the fuel pump 12 pumps fuel (oil) from a fuel tank (not shown) of the engine 1, and supplies the pumped fuel to the combustor 11.

An intake side of the combustion chamber 11a of the combustor 11 communicates with the intake pipe 2 through a first communication pipe 13, and communicates with the exhaust pipe 3 through a second communication pipe 14. An exhaust side of the combustion chamber 11a of the combustor 11 communicates with the intake pipe 2 through a third communication pipe 15, and the exhaust side of the combustion chamber 11a communicates with the exhaust pipe 3 through a fourth communication pipe 16. A communication between the first communication pipe 13 and the intake side of the combustion chamber 11a and a communication between the second communication pipe 14 and the intake side of the combustion chamber 11a are switched by a first switching valve 17. On the other hand, a communication between the third communication pipe 15 and the exhaust side of the combustion chamber 11a and a communication between the fourth communication pipe 16 and the exhaust side of the combustion chamber 11a are switched by a second switching valve 18.

Air in the intake pipe 2 is blown into the combustor 11 through the first communication pipe 13 by a turboblower 19. For example, the turboblower 19 includes a centrifugal blower, a mixed flow blower, and an axial flow blower.

Cooling water circulates in the combustor 11 and the heater core 10 by an electrical water pump 20. The electrical water pump 20, the first and second switching valves 17, 18, the blower 19 and the fuel pump 12 are controlled by an electronic control unit (ECU) 21.

Cooling water flowing from the engine 1 bypasses the water pump 20 through a bypass passage 22. Therefore, cooling water from the engine 1 can be introduced into the combustor 11 through the bypass passage 22 while bypassing the water pump 20. A check valve 23 is disposed in the bypass passage 22 to prevent cooling water discharged from the water pump 20 from being returned to an intake side of the water pump 20 through the bypass passage 20.

Carbon (black smoke) contained in exhaust gas of the engine 1 is separated in a carbon separator 24, and the carbon separator 24 prevents carbon from flowing into the second communication pipe 14. In the first embodiment, the carbon separator 24 is a centrifugal type carbon separator and includes a cylindrical separating portion 24a. Exhaust gas flowing into the separating portion 24a is rotated along an inner wall of the separating portion 24a so that carbon is separated from exhaust gas. Thereafter, exhaust gas is sucked into the second communication pipe 14 opened at a center of the separating portion 24a.

Next, operation of the heating apparatus for the vehicle according to the first embodiment of the present invention will be now described.

When the operation of the engine 1 is stopped, the first and second switching valves 17, 18 are operated so that the combustion chamber 11a of the combustor 11 communicate with the first communication pipe 13 and the fourth communication pipe 16 as shown in FIG. 1. In this case, the blower 19 and the electrical water pump 20 are operated and the combustor 11 is ignited (i.e., operated). Thus, fuel supplied from the fuel pump 12 is mixed with air (i.e., intake air) introduced from the intake pipe 2 through the first communication pipe 13, and is burned in the combustion chamber 11a of the combustor 11. Cooling water flowing toward the heater core 10 is heated by heat generated from the combustion chamber 11a during burning. Exhaust gas generated from the combustion chamber 11a of the combustor 11 flows through the fourth communication pipe 16, and is discharged to the atmosphere after cleaning in the catalyst 4 and reducing noise in the muffler 5. The amount of air blown by the blower 19 is controlled according to a fuel amount supplied based on a heat quantity required in the combustor 11.

Figure 2:
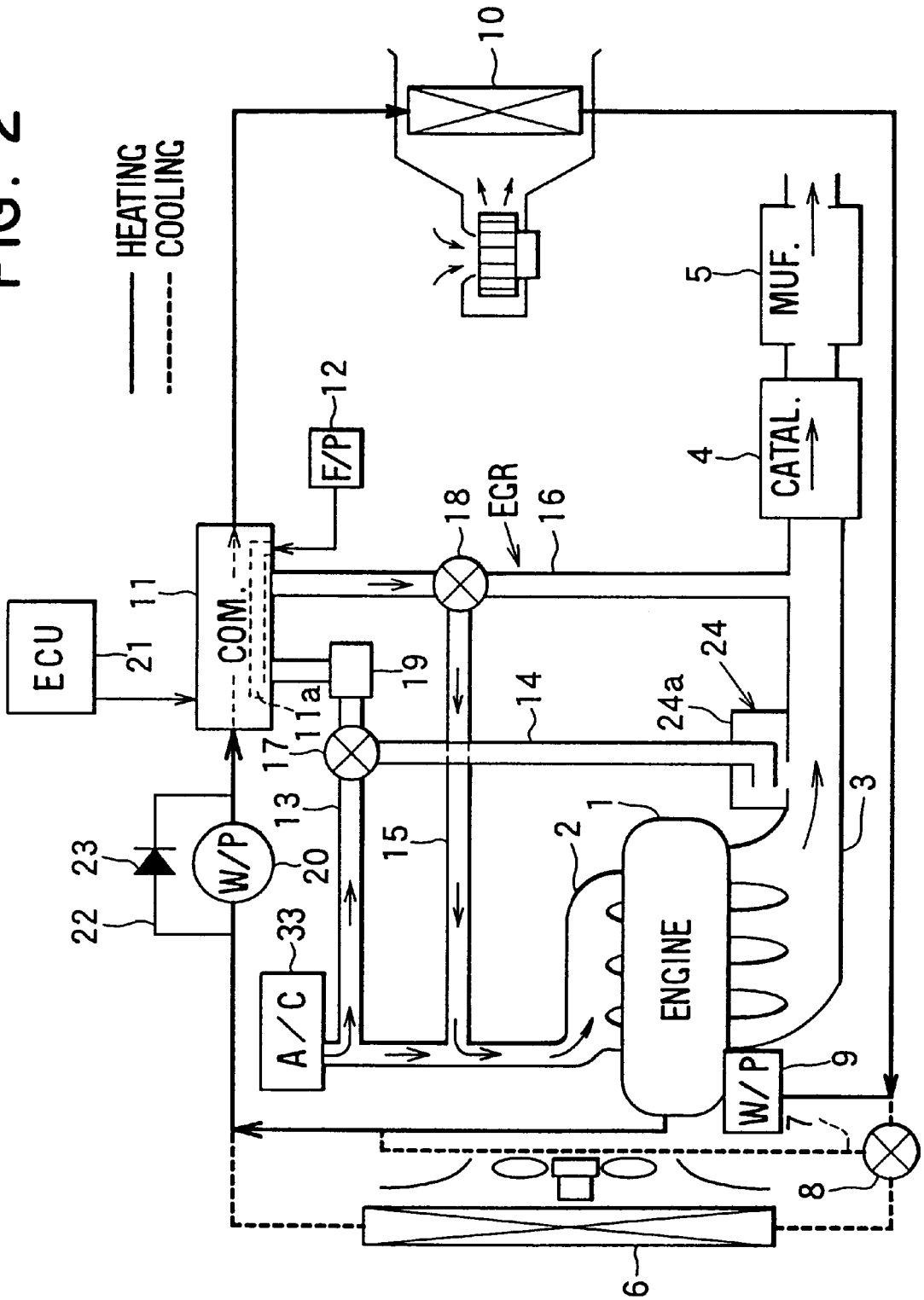
FIG. 2 is a schematic diagram showing the heating apparatus when the engine is in idling, according to the first embodiment.

When a rotation speed of the engine 1 is lower than a predetermined rotation speed (e.g., an engine idling), the first and second switching valves 17, 18 are operated so that the combustor 11 communicates with the first communication pipe 13 and the third communication pipe 15 as shown in FIG. 2. In this case, the blower 19 is operated and the combustor 11 is ignited (i.e., operated). Because the water pump 9 is operated together with the operation of the engine 1, the operation of the electrical water pump 20 is stopped. Thus, fuel supplied from the fuel pump 12 is mixed with air (i.e., intake air) introduced from the intake pipe 2 through the first communication pipe 13, and is burned in the combustion chamber 11a of the combustor 11. Cooling water flowing toward the heater core 10 is heated by heat generated from the combustion chamber 11a during burning.

Exhaust gas generated from the combustion chamber 11a of the combustor 11 is discharged into the intake pipe 2 through the third communication pipe 15.

Figure 3:
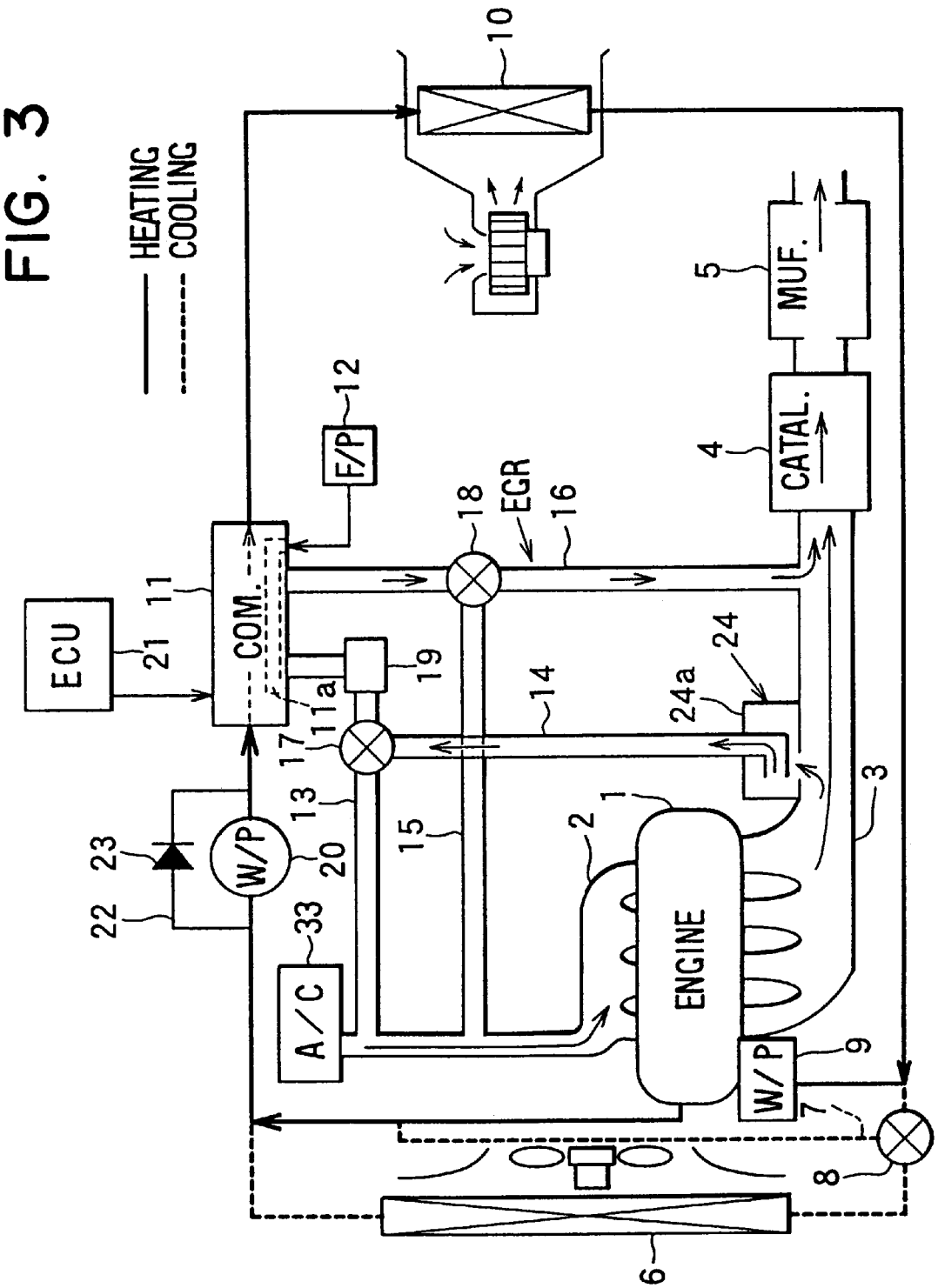
FIG. 3 is a schematic diagram showing the heating apparatus when the vehicle travels, according to the first embodiment.

When the rotation speed of the engine 1 is larger than a predetermined rotation speed, e.g., when the vehicle is travelling, the first and second switching valves 17, 18 are operated so that the combustor 11 communicates with the second and fourth communication pipes 14, 16, as shown in FIG. 3. In this case, the blower 19 is operated, while the combustor 11 and the electrical water pump 20 are stopped. Thus, exhaust gas of the engine 1 is blown into the combustion chamber 11a of the combustor 11 by the blower 19. Heat of exhaust gas of the engine 1 is transmitted to cooling water flowing through the combustor 11. That is, exhaust gas of the engine, having a high temperature, is heat-exchanged with cooling water in the combustor 11. Exhaust gas having been heat-exchanged in the combustion chamber 11a of the combustor 11 flows through the fourth communication pipe 16, and is discharged to the atmosphere after being cleaned in the catalyst 4 and reducing noise in the muffler 5.

Figure 4:
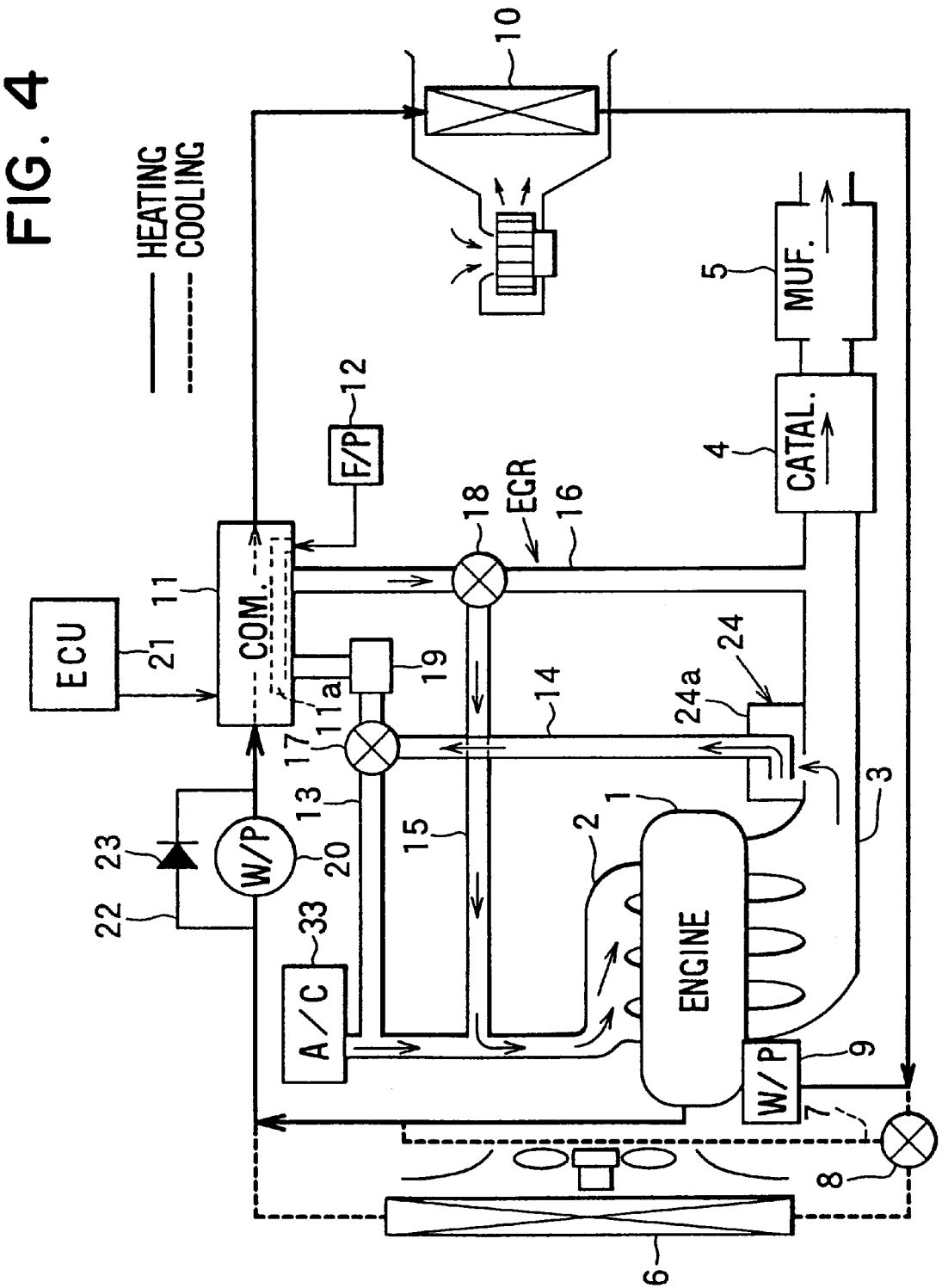
FIG. 4 is a schematic diagram showing the heating apparatus when a combustor is stopped, according to the first embodiment.

On the other hand, when temperature of outside air is higher than a predetermined temperature (e.g., approximately 25° C.), it is not necessary to operate the combustor 11. In this case, as shown in FIG. 4, the first and second switching valves 17, 18 are operated so that the combustor 11 communicates with the second communication chamber 14 and the third communication chamber 15. Further, the combustor 11 is stopped while the blower 19 is operated. Thus, exhaust gas from the engine 1 is blown into the combustion chamber 11a of the combustor 11 by the blower 19 to be cooled by cooling water flowing in the combustor 11. The exhaust gas of the engine 1, cooled by cooling water in the combustor 11, is discharged into the intake pipe 2 through the third communication pipe 15. That is, an exhaust gas recirculation system (EGR) for cooling exhaust gas from the engine 1 and recycling the exhaust gas into the intake pipe 2 of the engine 1 is constructed by the second and third communication pipes 14, 15, the first and second switching valves 17, 18, the blower 19 and the combustor 11.

In FIGS. 1–4, during heating for heating the passenger compartment, cooling water is supplied to the heater core 10 so that air blown into the passenger compartment is heated in the heater core 10 by the cooling water. On the other hand, during cooling, cooling water is supplied to the radiator 6 as shown by chain line in the cooling water circuit of the heating apparatus, so that cooling water is cooled in the radiator 6.

According to the first embodiment of the present invention, when the rotation speed of the engine 1 is lower than a predetermined rotation speed of the engine 1, the combustor 11 is operated so that cooling water is heated by heat generated from the combustor 11. On the other hand, when the rotation speed of the engine 1 is higher than the predetermined rotation speed of the engine 1, the operation of the combustor 11 is stopped, and cooling water is heated by heat generated from the exhaust gas of the engine 1. Thus, the predetermined rotation speed of the engine 1 is determined based on whether or not heat quantity of exhaust gas of the engine 1 is sufficiently high to heat the passenger compartment. In the first embodiment, the predetermined rotation speed corresponds to the idling rotation speed (about 600 rpm) of the engine 1.

According to the first embodiment of the present invention, when the operation of the combustor 11 is stopped, i.e., when the combustor 11 is not ignited, exhaust gas from the engine 1 is recycled to the intake side of the engine 1 after being heat-exchanged with cooling water in the combustion chamber 11a of the combustor 11. Therefore, nitrogen oxide generated in the engine 1 can be effectively restricted. Because exhaust gas circulating in the exhaust gas recirculation system (EGR) of the engine 1 can be cooled without an additional heat exchanger, a space for the additional heat exchanger is not necessary in an engine compartment, and the vehicle is produced in low cost.

According to the vehicle heating apparatus of the first embodiment of the present invention, when the rotation speed of the engine 1 is lower than the predetermined rotation speed, it is determined that heat quantity from the engine 1 is not sufficient for heating the passenger compartment, and the combustor 11 is operated to burn fuel so that heating capacity for the passenger compartment is increased. On the other hand, when the rotation speed of the engine 1 is larger than the predetermined rotation speed, it is determined that the heat quantity from the engine 1 is sufficient for heating the passenger compartment, and the combustor 11 is stopped. In this case, heat from the cooling water and heat in exhaust gas of the engine 1 are received so that the passenger compartment is heated. Thus, time for using the combustor 11 as a supplementary heating source can be made shorter, and fuel-consumption effect of the heating apparatus can be improved.

Further, when the rotation speed of the engine 1 is lower than the predetermined speed, the combustor 11 is operated so that cooling water is heated in the combustor 11. Therefore, heating operation of the engine 1 can be facilitated, and the temperature of the catalyst 4 can be quickly increased so that the function of the catalyst 4 is improved.

The heating apparatus of the first embodiment may be applied to a vehicle having a supercharger or a turbocharger. In the above-described first embodiment of the present invention, air is introduced into the combustor 11 from the intake pipe of the engine 1. However, air in the atmosphere may be introduced into the combustor 11. Further, when the rotation speed of the engine 1 is lower than the predetermined rotation speed, exhaust gas of the engine 1 may be slightly introduced into the third communication pipe 15. In this case, exhaust gas of the combustor 11 can be accurately introduced into the intake pipe 2 by pressure of exhaust gas of the engine 1.

Further, in the above-described first embodiment of the present invention, when the combustor 11 is stopped, exhaust gas circulates in the exhaust gas recirculation system. However, an exhaust pipe for the exhaust gas recirculation system may be provided, and exhaust gas may be circulates in the exhaust gas recirculation system even when the combustor 11 is operated.

Figure 5:
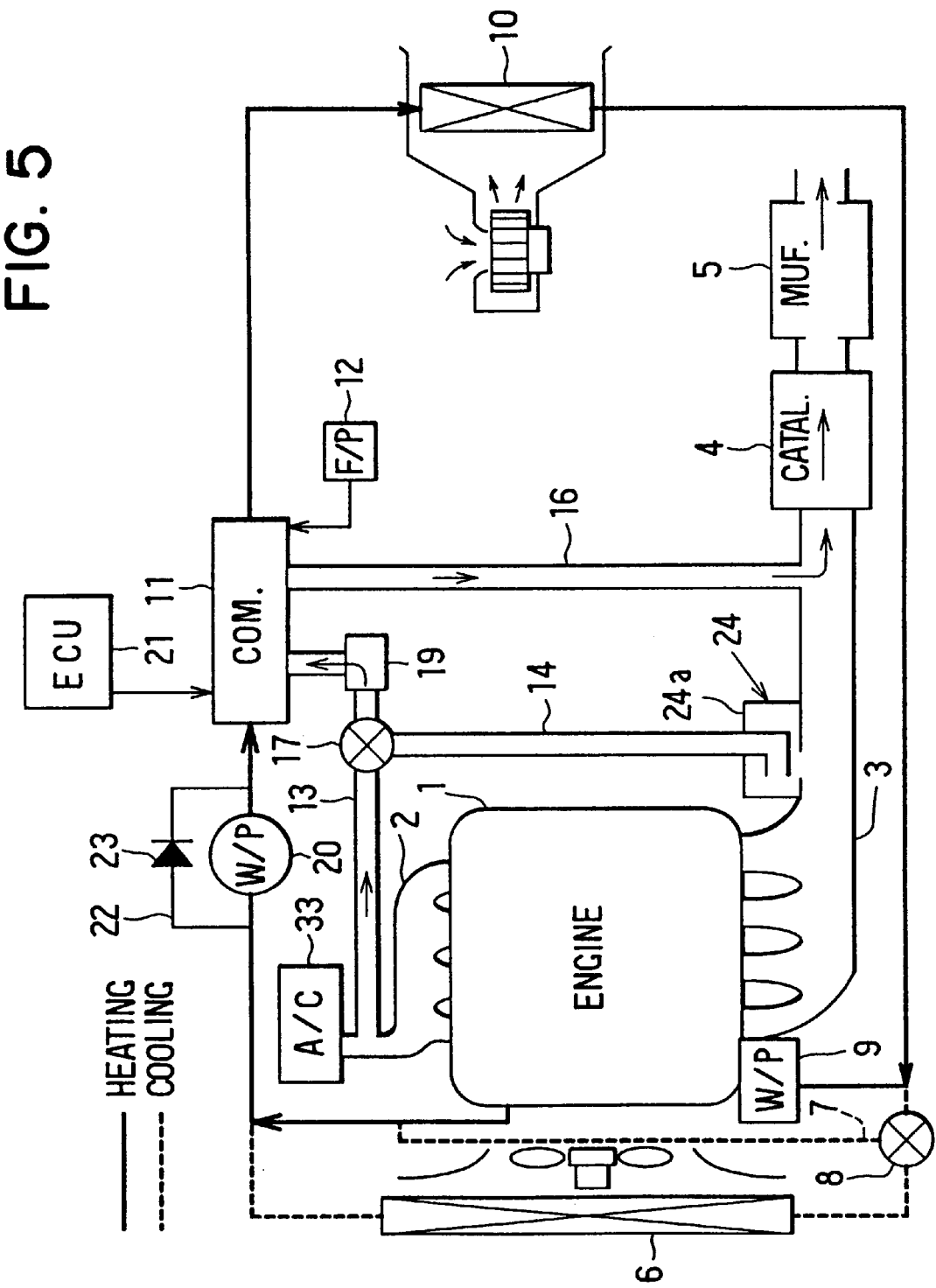
FIG. 5 is a schematic diagram showing a heating apparatus for a vehicle when an engine is stopped, according to a second preferred embodiment of the present invention.
Figure 6:
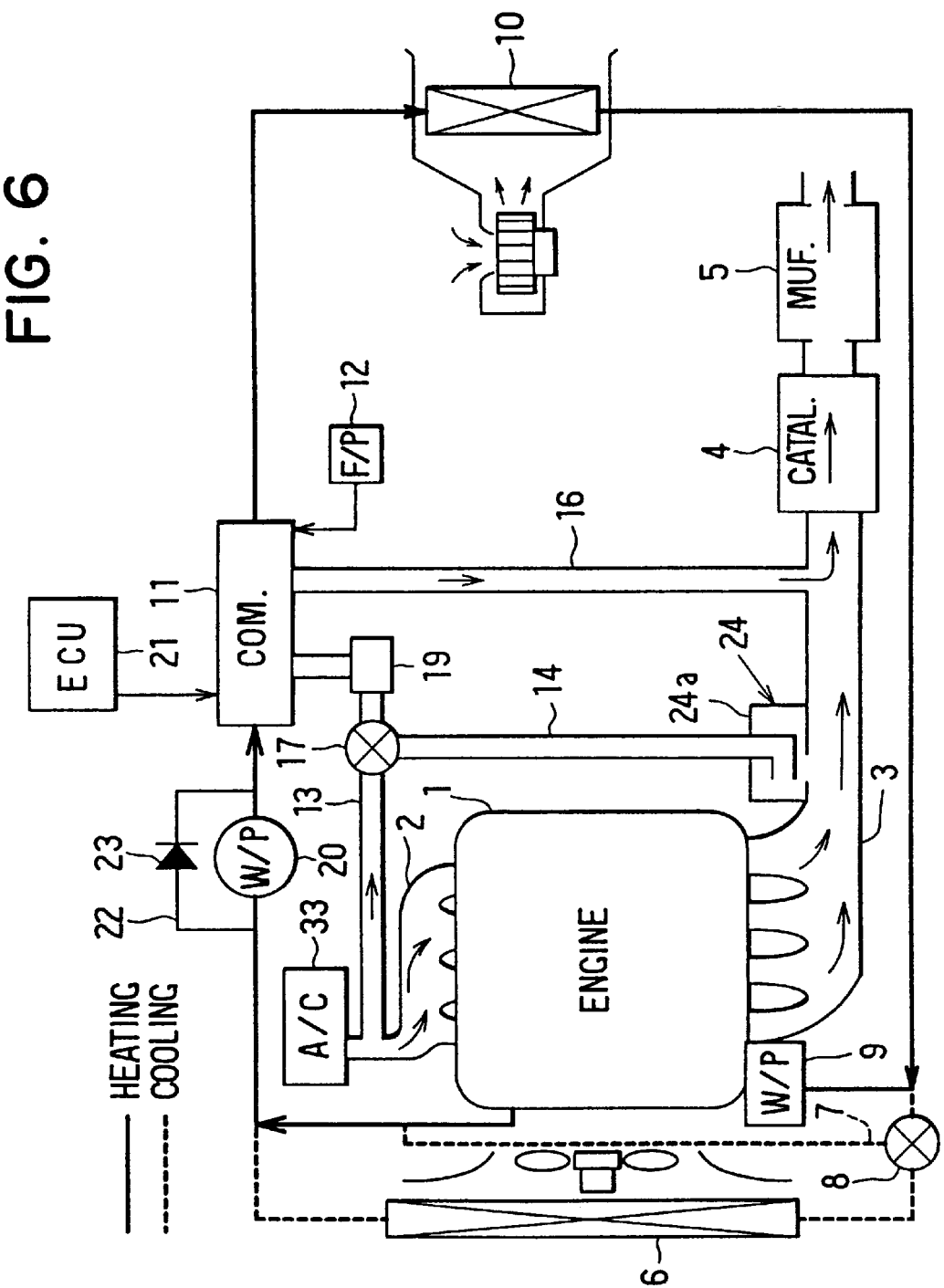
FIG. 6 is a schematic diagram showing the heating apparatus when the engine is in idling, according to the second embodiment.
Figure 7:
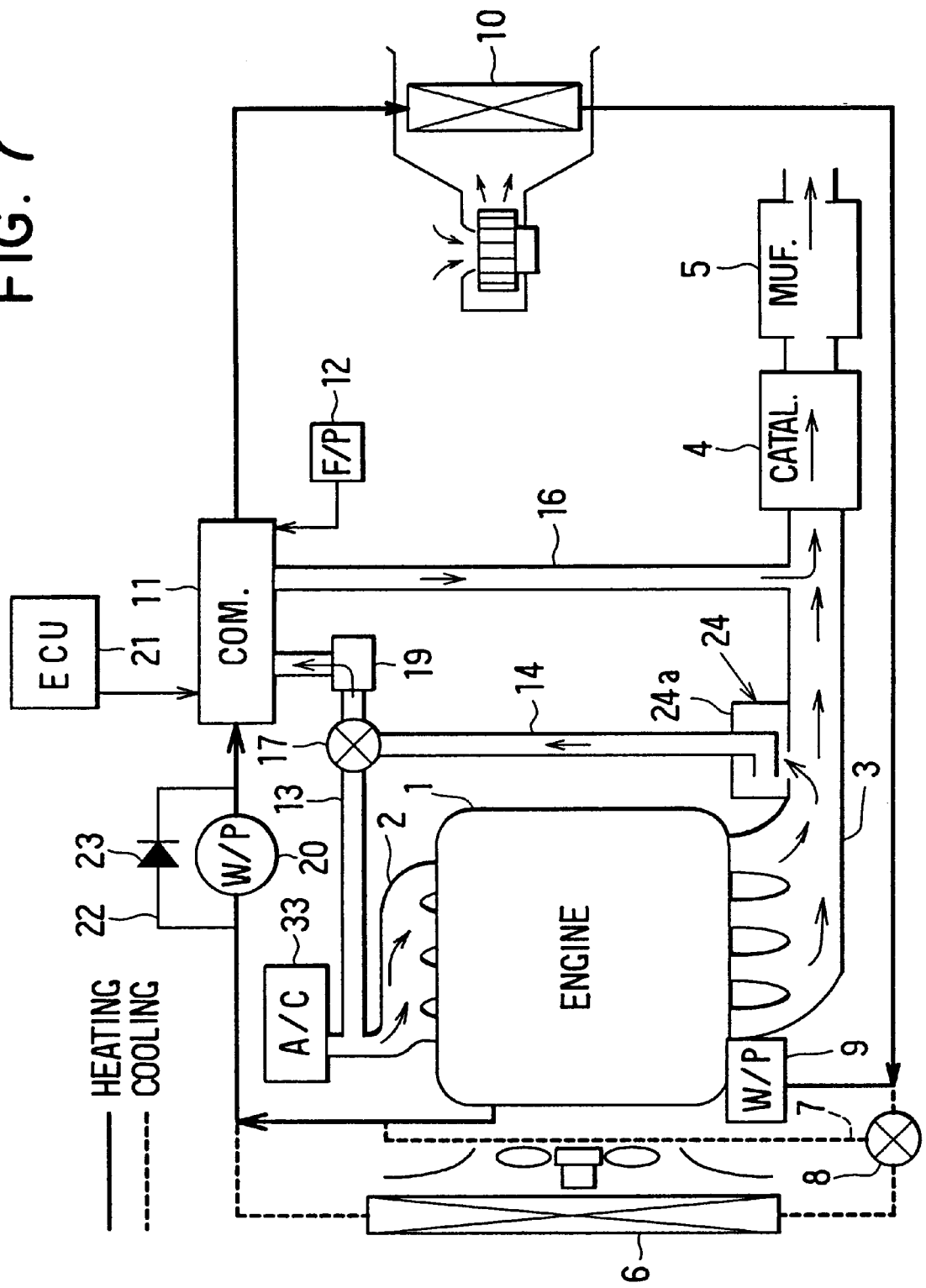
FIG. 7 is a schematic diagram showing the heating apparatus when the vehicle travels, according to the second embodiment.

A second embodiment of the present invention will be now described with reference to FIGS. 5–7. In the second embodiment, components similar to those in the first embodiment are indicated with the same reference numbers, and the explanation thereof is omitted. FIGS. 5–7 shows a heating apparatus for a vehicle according to the second embodiment.

In the second embodiment, as shown in FIG. 5, there is formed the communication pipe 13 through which the intake pipe 2 of the engine 1 communicates with the intake side of the combustor 11, the communication pipe 14 through which the intake side of the combustor 11 communicates with the exhaust pipe 3. Therefore, intake air of the intake pipe 2 is introduced into the combustor 11 through the communication pipe 13, and exhaust gas of the engine 1 is introduced into the intake side of the combustor 11 through the communication pipe 14. Similarly to the first embodiment of the present invention, the switching valve 17 is provided so that the communication between the communication pipe 13 and the combustor 11 and the communication between the communication pipe 14 and the combustor 11 are switched by the switching valve 17. Further, the turboblower 19 is disposed between the switching valve 17 and a combustion chamber of the combustor 11. Further, the exhaust side of the combustor 11 communicates with the exhaust pipe 3 through the communication pipe 16, so that exhaust gas of the combustor 11 is introduced into the catalyst 4 and the muffler 5. That is, in the second embodiment, it is compared with the first embodiment of the present invention, the communication pipe 15 communicating with the intake side of the engine 1 and exhaust side of the combustor 11 are not provided, and the exhaust side of the combustor 11 always communicates with the exhaust pipe 3. The water pump 20, the switching valve 17, the blower 19 and the fuel pump 12 are controlled by the ECU 21.

Next, operation of the vehicle heating apparatus according to the second embodiment will be now described.

When the operation of the engine 1 is stopped, the switching valves 17 is operated so that the intake side of the combustor 11 communicate with the communication pipe 13, as shown in FIG. 5. In this case, the blower 19 and the electrical water pump 20 are operated and the combustor 11 is ignited (i.e., operated). Thus, fuel supplied from the fuel pump 12 is mixed with air (i.e., intake air) introduced from the intake pipe 2 through the communication pipe 13, and is burned in the combustion chamber of the combustor 11. Cooling water flowing toward the heater core 10 is heated by heat generated from the combustion chamber of the combustor 11 during burning. Exhaust gas generated from the combustion chamber of the combustor 11 flows through the communication pipe 16, and is discharged to the atmosphere after being cleaned in the catalyst 4 and reducing noise in the muffler 5. The amount of air blown by the blower 19 is controlled according to the fuel amount supplied based on a heat quantity required in the combustor 11.

When the rotation speed of the engine 1 is lower than a predetermined rotation speed (e.g., an engine idling) while the engine 1 is operated, the switching valve 17 is operated so that the intake side of the combustor 11 communicates with the communication pipe 13. In this case, the blower 19 is operated and the combustor 11 is ignited (i.e., operated). Because the water pump 9 is operated together with the operation of the engine 1, the operation of the electrical water pump 20 is stopped. Thus, fuel supplied from the fuel pump 12 is mixed with air (i.e., intake air) introduced from the intake pipe 2, and is burned in the combustion chamber of the combustor 11. Cooling water flowing toward the heater core 10 is heated by heat generated from the combustion chamber of the combustor 11 during burning. Exhaust gas generated from the combustion chamber of the combustor 11 is discharged to the atmosphere after being cleaned in the catalyst 4 and reducing noise in the muffler 5. When the rotation speed of the engine is lower than the predetermined rotation speed, exhaust gas from the engine 1 may reversely flow into the combustor 11 through the communication pipe 16. However, in this case of the second embodiment, because the blower 19 is operated and the pressure of exhaust gas from the engine 1 is low due to the low rotation speed of the engine 1, exhaust gas from the engine 1 is not reversely introduced into the combustor 11. Thus, the operation of the combustor 11 is not stopped due to exhaust gas flowing from the exhaust pipe 3.

When the rotation speed of the engine 1 is equal to or larger than a predetermined rotation speed, e.g., when the vehicle is travelling, the switching valves 17 is operated so that the intake side of the combustor 11 communicates with the communication pipe 14, as shown in FIG. 7. In this case, the blower 19 is operated, and the combustor 11 and the electrical water pump 20 are stopped because the rotation speed of the engine 1 is larger than the predetermined speed. Thus, exhaust gas of the engine 1 is blown into the combustion chamber of the combustor 11 by the blower 19. Heat of exhaust gas of the engine 1 is transmitted to cooling water flowing through the combustor 11. Exhaust gas having been heat-exchanged in the combustion chamber of the combustor 11 flows through the communication pipe 16, and is discharged to the atmosphere after being cleaned in the catalyst 4 and reducing noise in the muffler 5.

According to the second embodiment of the present invention, when the rotation speed of the engine 1 is lower than the predetermined rotation speed, it is determined that heat quantity from the engine 1 is not sufficient for heating, and the combustor 11 is operated to burn fuel so that heating capacity of the heater core 10 is increased. On the other hand, when the rotation speed of the engine 1 is larger than the predetermined rotation speed, it is determined that the heat quantity from the engine 1 is sufficient for heating the passenger compartment, and the operation of the combustor 11 is stopped. In this case, heat from the cooling water and heat in exhaust gas of the engine 1 are received so that the passenger compartment is heated. Thus, time for using the combustor 11 as a supplementary heating source can be made shorter, fuel-consumption effect of the engine 1 and the combustor 11 can be improved.

Further, when the rotation speed of the engine 1 is lower than the predetermined speed (e.g., engine idling), the combustor 11 is operated so that cooling water is heated in the combustor 11. Therefore, heating operation of the engine 1 can be facilitated, the temperature of the catalyst 4 can be quickly increased so that the function of the catalyst 4 is improved.

The heating apparatus of the second embodiment may be applied to a vehicle having a gasoline engine or having a supercharger or a turbocharger. In the above-described second embodiment of the present invention, air is introduced into the combustor 11 from the intake pipe of the engine 1. However, air in the atmosphere may be introduced into the combustor 11. Further, in the above-described second embodiment of the present invention, it is determined whether or not the combustor 11 is operated based on a rotation speed of the engine 1. However, the operation of the combustor 11 may be determined based on temperature of exhaust gas of the engine 1. That is, air may be introduced into the combustion chamber of the combustor 11 so that the combustor 11 is operated when temperature of exhaust gas of the engine 1 is lower than a predetermined temperature, and exhaust gas of the engine 1 may be introduced into the intake side of the combustion chamber of the combustor 11 when the temperature of exhaust gas of the engine 1 is larger than the predetermined temperature.

Figure 8:
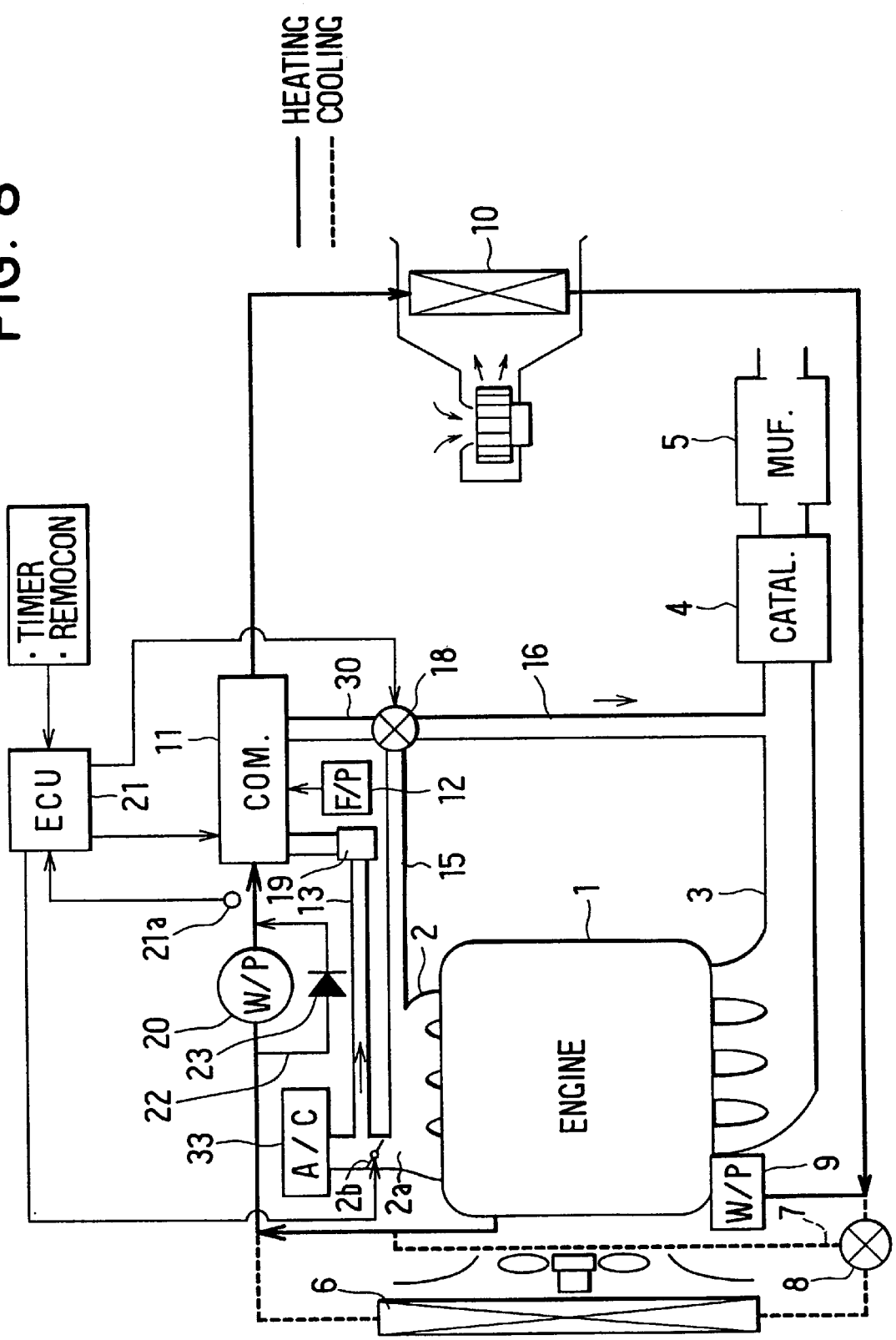
FIG. 8 is a schematic diagram showing a heating apparatus for a vehicle according to a third preferred embodiment of the present invention.

A third predetermined embodiment of the present invention will be now described with reference to FIG. 8. In the third embodiment, the components similar to those in the first and second embodiments are indicated with the same reference numbers, and the explanation thereof is omitted. FIG. 8 shows a heating apparatus for a vehicle according to the third embodiment.

In the third embodiment, as shown in FIG. 8, a throttle valve 2b is disposed between a joining portion 2a of the intake pipe 2 and the air cleaner 33. Therefore, air introduced from the intake pope 2 into the combustor 11 through the communication pipe 13 is restricted by the throttle valve 2b.

When the combustor 11 is operated, fuel supplied from the fuel pump 12 is burned in the combustion chamber of the combustor 11. The operation of the combustor 11 or heat-generating amount from the combustor 11, a fuel amount supplied from the fuel pump 12 to the combustor 11, the electrical water pump 20 are controlled by the ECU 21 based on a set value of a timer switch or a remocon (i.e., remote control) unit and signals detected by a water temperature sensor 21a. The timer switch and the remocon unit are manually operated by a passenger in the passenger compartment. The water temperature sensor 21a detects the temperature of cooling water flowing from the engine 1.

Air cleaned in the air cleaner 33 is introduced into the combustor 11 through the communication pipe 13. In the third embodiment, an upstream air position of the throttle valve 2b in the intake pipe 2 communicates with the intake side of the combustor 11 through the communication pipe 13. A blower 19 for blowing intake air into the combustor 11 is disposed in the communication pipe 13, and is driven electrically. In the third embodiment, the blower 19 is a volume type blower.

Exhaust gas of the combustor 22 flows through an exhaust pipe 30. The exhaust pipe 30 is branched at a branch point into the communication pipe 15 and the communication pipe 16. The exhaust pipe 30 of the combustor 11 communicates with the intake pipe 2 through the communication pipe 15 at a downstream air side of the throttle valve 2b, and communicates with the exhaust pipe 3 through the communication pipe 16 at an upstream side of the catalyst 4. The switching valve 18 is disposed at the branch point, so that a communication between the exhaust pipe 30 of the combustor 11 and the communication pipe 15 and a communication between the exhaust pipe 30 of the combustor 11 and the communication pipe 16 can be switched by the switching valve 18. The operation of the switching valve 18 is controlled by the ECU 21.

Next, operation of the vehicle heating apparatus according to the third embodiment will be now described. When the combustor 11 is operated while the engine 1 is stopped, the switching valve 18 is operated so that exhaust gas of the combustor 11 is introduced into the intake pipe 2 through the communication pipe 15, until a predetermined time Tp is passed after the combustor 11 starts. After the predetermined time Tp is passed after the combustor 11 starts, the switching valve 18 is operated so that exhaust gas of the combustor 11 is introduced into the exhaust pipe 3 of the engine 1 through the communication pipe 16. Here, the predetermined time Tp is a time from a point where an ignition signal for igniting (operating) the combustor 11 is sent from the ECU 21 to a point where the combustion of the combustor 11 becomes stable. The predetermined time Tp is obtained by experiments, for example.

The combustor 11 may be directly ignited with the operation of the blower 19 at the same time as the ignition signal is sent from the ECU 21, or the blower 19 may be operated so that the combustor 11 may be ignited after a predetermined time is passed after the ignition signal is sent from the ECU 21 to the combustor 11. Therefore, the predetermined time Tp is necessary to includes this conditions.

Thus, unburned gas with smelling, generated immediately after the combustor 11 is operated (ignited), is stored in the intake pipe 2. As a result, it can prevent unburned gas of the combustor 11 from being discharged to the atmosphere. The unburned gas stored in the intake pipe 2 is further burned with intake air in the engine 1 when the operation of the engine 1 starts, and is discharged to the atmosphere after passing through the catalyst 4 and the muffler 5.

When the combustor 11 is operated when the engine 1 operates, the switching valve 18 is operated so that exhaust gas of the combustor 11 flows into the exhaust pipe 3 through the exhaust pipe 30 and the communication pipe 16. Therefore, exhaust gas of the combustor 11 is discharged to the atmosphere after passing through the catalyst 4 and the muffler 5, together with exhaust gas of the engine 1. Thus, it is not necessary to provide additional catalyst and muffler for the combustor 11. As a result, the heating apparatus having the combustor 11 can be readily mounted on the vehicle. Further, because exhaust gas of the combustor 11 is discharged to the atmosphere through the exhaust pipe 3 of the engine 1, the combustor 11 has a simple exhaust-pipe system.

In the above-described third embodiment, the heating apparatus may be applied to a vehicle having a gasoline engine or a diesel engine, or may be applied to a vehicle having a supercharger or a turbocharger. In the above-described third embodiment, heat generated from the combustor 11 is transmitted to cooling water flowing into the heater core 10 so that the passenger compartment is heated. However, the passenger compartment may be directly heated by the combustor 11.

Figure 9:
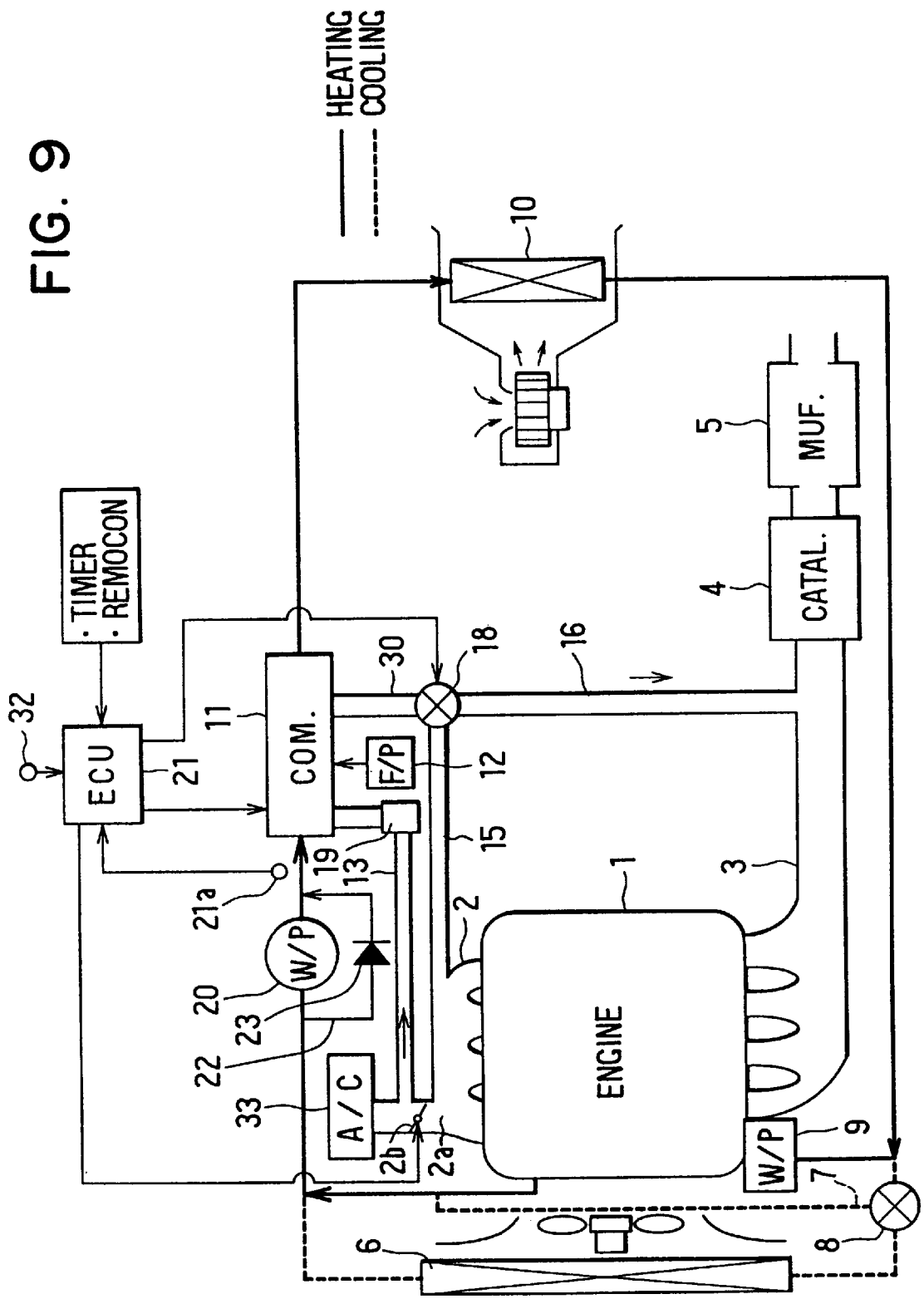
FIG. 9 is a schematic diagram showing a heating apparatus for a vehicle according to a fourth preferred embodiment of the present invention.
Figure 10:
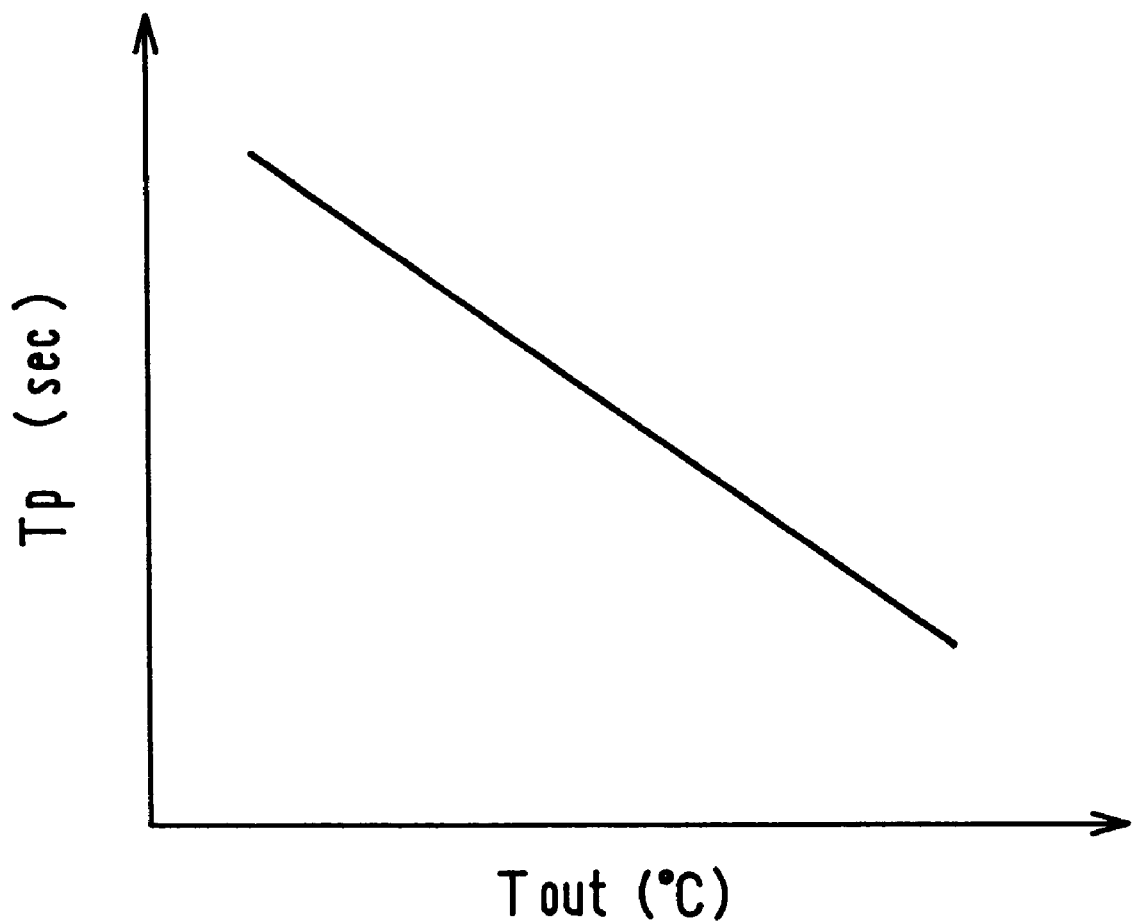
FIG. 10 is a graph showing the relationship between a predetermined time Tp and an outside air temperature Tout according to the fourth embodiment.

A fourth preferred embodiment of the present invention will be now described with reference to FIGS. 9, 10. FIG. 9 shows a heating apparatus for a vehicle according to the fourth embodiment. In the fourth embodiment, an outside air temperature sensor 32 for detecting temperature of outside air (i.e., air outside the passenger compartment of the vehicle) is provided. The other portions of the fourth embodiment are similar to those in the third embodiment, and explanation thereof is omitted.

In the fourth embodiment, the predetermined time Tp until the combustion of the combustor 11 becomes stable after the combustor 11 operates is set to become shorter according to an increase of temperature of outside air. That is, the predetermined time Tp is set based on the graph shown in FIG. 10 pre-stored in the ECU 21, and the switching valve 18 is operated. According to the fourth embodiment of the present invention, the operation of the combustor 11 can be accurately controlled.

Figure 11:
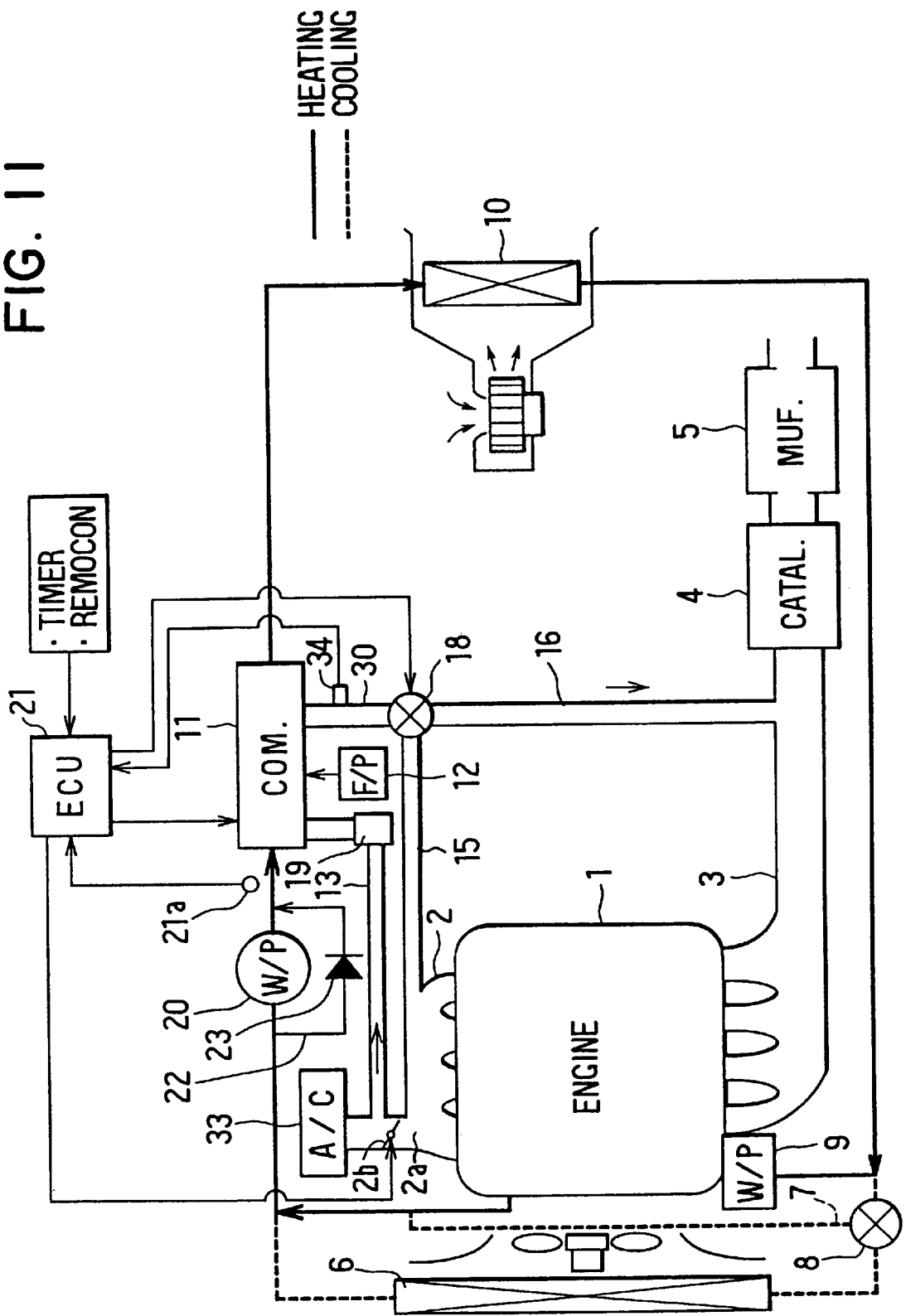
FIG. 11 is a schematic diagram showing a heating apparatus for a vehicle according to a fifth preferred embodiment of the present invention.

A fifth preferred embodiment of the present invention will be now described with reference to FIG. 11. FIG. 11 shows a heating apparatus for a vehicle according to the fifth embodiment. When the combustor 11 is burned stably, oxygen concentration contained in exhaust gas of the combustor 11 becomes lower than a predetermined concentration (about 2%). In the fifth embodiment, an oxygen sensor 34 for detecting an oxygen concentration contained in exhaust gas of the combustor 11 is disposed in the exhaust pipe 30 at an upstream side of the switching valve 18.

In a case where the combustor 11 is operated when the engine 1 stops, when the oxygen concentration detected by the oxygen sensor 34 is equal to or larger than a predetermined concentration, the switching valve 18 is operated so that exhaust gas of the combustor 11 flows into the intake pipe 2. That is, in this case, the switching valve 18 is operated so that the exhaust pipe 30 communicates with the communication pipe 15. On the other hand, when the oxygen concentration detected by the oxygen sensor 34 is smaller than the predetermined concentration, the switching valve 18 is operated so that exhaust gas of the combustor 11 flows into the exhaust pipe 3 through the communication pipe 16. That is, in this case, the switching valve 18 is operated so that the exhaust pipe 30 communicates with the communication pipe 16.

In the above-described fifth embodiment, the oxygen sensor 34 for detecting oxygen concentration contained in exhaust gas of the combustor 11 is disposed in the exhaust pipe 30 at the upstream side of the switching valve 18. However, the switching valve 18 may be controlled by a detection signal of an oxygen sensor which is disposed at an upstream side of the throttle valve 2b of the intake pipe 2. In this case, a correction is necessary.

According to the fifth embodiment of the present invention, the unburned gas with smelling of exhaust gas of the combustor 11 can be prevented from being discharged into the atmosphere. The other portions of the heating apparatus of the fifth embodiment are similar to those of the third embodiment.

A sixth preferred embodiment of the present invention will be now described with reference to FIG. 12. In the sixth embodiment, the burning temperature of the combustor 11 is detected by a burning temperature sensor 35 so that it is determined whether or not the combustor 11 is stably burned. That is, the switching valve 18 is operated based on the burning temperature of the combustor 11. The other portions in the sixth embodiment are similar to those in the third embodiment, and the explanation thereof is omitted.

Figure 12:
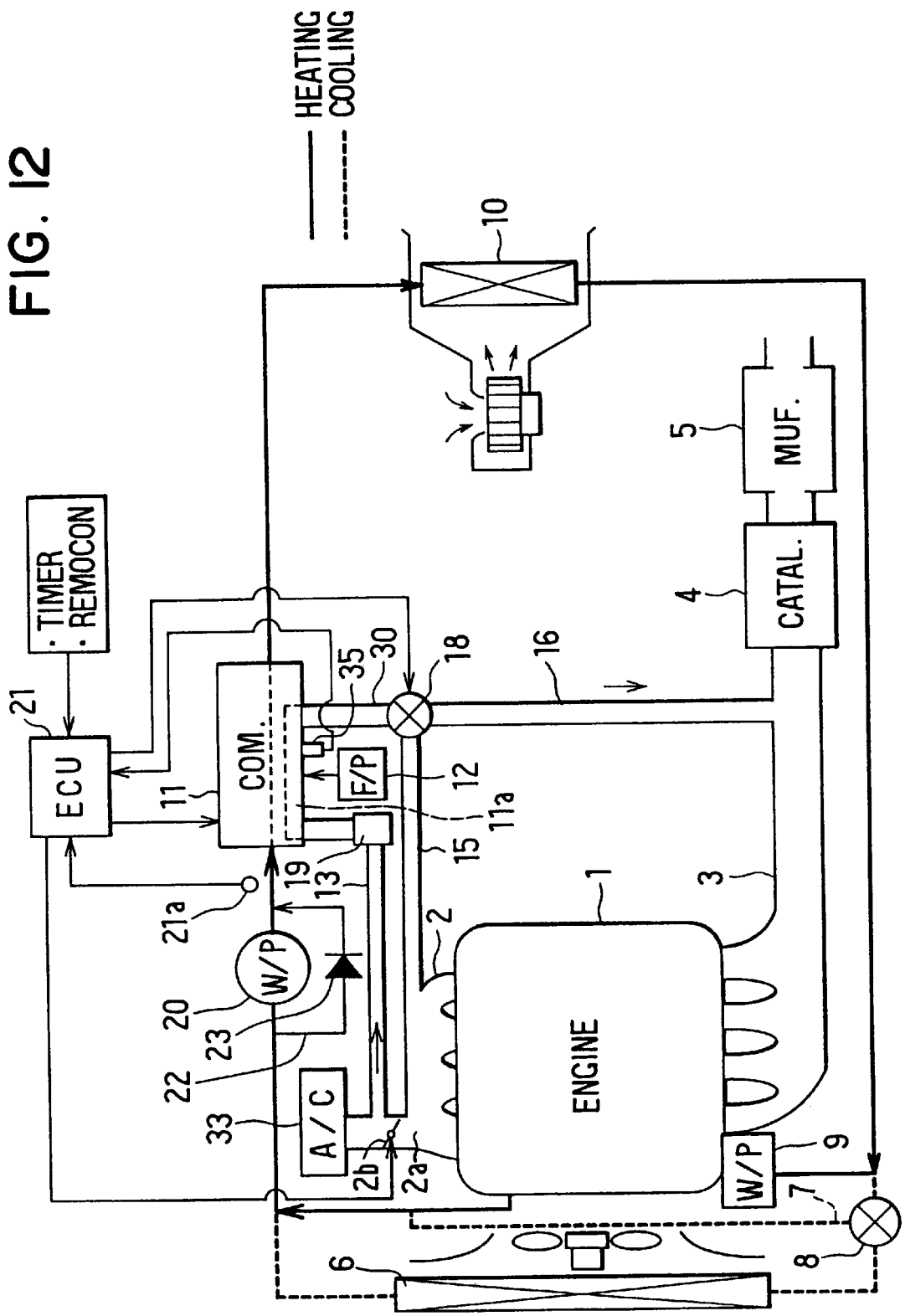
FIG. 12 is a schematic diagram showing a heating apparatus for a vehicle according to a sixth preferred embodiment of the present invention.

As shown in FIG. 12, the burning temperature sensor 35 for detecting temperature of the combustion chamber of the combustor 11 is provided. In a case where the combustor 11 is operated when the engine 1 stops, when the temperature detected by the burning temperature sensor 35 is lower than a predetermined temperature (e.g., 300° C.), the switching valve 18 is operated so that exhaust gas of the combustor 11 flows into the intake pipe 2. That is, in this case, the switching valve 18 is operated so that the exhaust pipe 30 of the combustor 11 communicates with the communication pipe 15. On the other hand, when the temperature detected by the burning temperature sensor 35 is higher than the predetermined temperature, the switching valve 18 is operated so that exhaust gas of the combustor 11 flows into the exhaust pipe 3. That is, in this case, the switching valve 18 is operated so that the exhaust pipe 30 of the combustor 11 communicates with the communication 16. According to the sixth embodiment of the present invention, the unburned gas with smelling in exhaust gas of the combustor 11 can be prevented from being discharged to the atmosphere.

Figure 13:
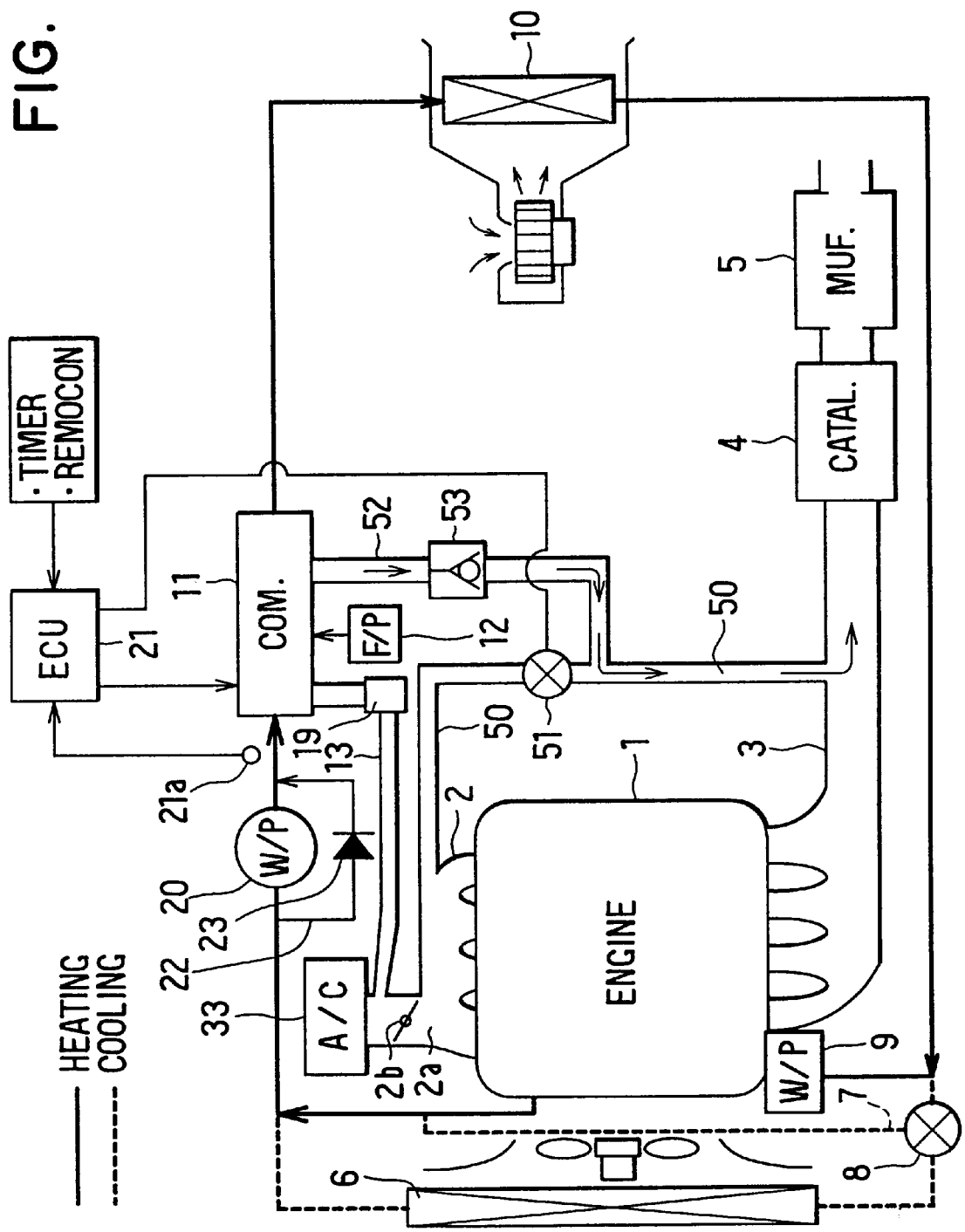
FIG. 13 is a schematic diagram showing a heating apparatus for a vehicle when an engine is stopped, according to a seventh preferred embodiment of the present invention.
Figure 14:
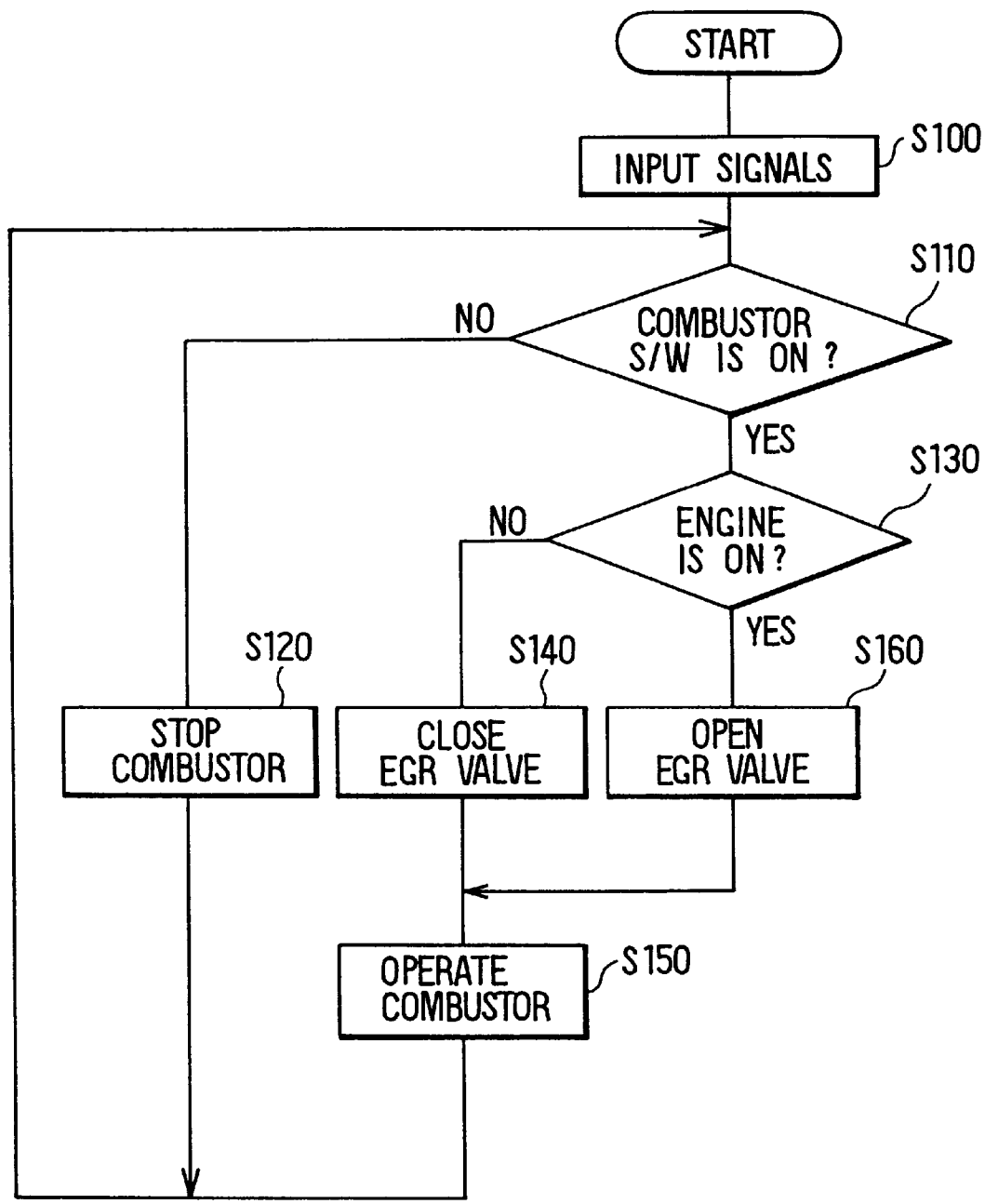
FIG. 14 is a flow diagram showing a control of an electronic control unit (ECU) of the heating apparatus according to the seventh embodiment.

A seventh preferred embodiment of the present invention will be now described with reference to FIGS. 13–15. FIG. 13 shows a heating apparatus for a vehicle according to the seventh embodiment of the present invention. In the seventh embodiment, the components similar to those in the third embodiment are indicated with the same reference numbers. Similarly to the third embodiment, the throttle valve 2b is disposed between the joining portion 2a of the intake pipe 2 and the air cleaner 33. Therefore, by adjusting the opening degree of the throttle valve 2b, pressure of exhaust gas of a communication pipe 50 (EGR pipe) connected to the intake pipe 2 at a downstream side of the throttle valve 2b is adjusted so that exhaust gas recycled from the exhaust pipe 3 to the intake pipe 2 of the engine 1 is adjusted. In the seventh embodiment, the communication pipe 50 is connected to the intake pipe 2 at the downstream side of the throttle valve 2b and the exhaust pipe 3 at an upstream side of the catalyst 4, so that a part of exhaust gas of the engine 1 is introduced into the intake pipe 2 through the communication pipe 50. A EGR valve 51 for opening and closing the communication pipe 50 is disposed in the communication pipe 50. An exhaust pipe 52 of the combustor 11 is connected to the communication pipe 50 at a position between the EGR valve 51 and the exhaust pipe 3. The opening degree of the throttle valve 2b is controlled based on a burning state (i.e., burning temperature) of the engine 1, load applied to the engine 1, a rotation speed of the engine 1 and the like. The opening degree of the throttle valve 2b is operatively connected to the EGR valve 51.

When the combustor 11 is operated, fuel supplied from the fuel pump 12 is burned in the combustion chamber of the combustor 11. The operation state of the combustor 11 or heat-generating amount from the combustor 11, a fuel amount supplied from the fuel pump 12 to the combustor 11, the electrical water pump 20 are controlled by the ECU 21 based on a set value of a timer switch or a remocon (i.e., remote control) unit and signals detected by the water temperature sensor 21a. The water temperature sensor 21a detects the temperature of cooling water flowing from the engine 1.

Air cleaned in the air cleaner 33 is introduced into the combustor 11 through the communication pipe 13. In the seventh embodiment, an upstream air position of the throttle valve 2b in the intake pipe 2 communicates with the intake side of the combustor 11 through the communication pipe 13. The electrical blower 19 for blowing intake air into the combustor 11 is disposed in the communication pipe 13. In the seventh embodiment, the blower 19 is a turboblower.

In the seventh embodiment, exhaust gas of the engine 1 is introduced into the intake pipe 2 through the communication pipe 50 so that nitrogen oxide contained in exhaust gas of the engine 1 can be reduced. That is, the communication pipe 50 forms an exhaust gas recirculation (EGR) system. The EGR valve 51 is also controlled by the ECU 21 together with the throttle valve 2b and the combustor 11.

The exhaust pipe 52 of the combustor 11 is connected to the communication pipe 50 between the EGR valve 51 and the exhaust pipe 3, so that exhaust gas of the combustor 11 is introduced into the communication pipe 50 between the EGR valve 51 and the exhaust pipe 3. A check valve 53 for preventing exhaust gas in the communication pipe 50 from reversely flowing into the combustor 11 is disposed in the exhaust pipe 52.

Next, operation of the heating apparatus according to the seventh embodiment of the present invention will be now described with reference to the flow diagram of FIG. 14. Firstly, at step S100, signals from the timer switch or the remote control (i.e., remocon) unit are input to ECU 21 at step S100. At step S110, it is determined whether or not a switch (S/W) of the combustor 11 is turned on based on signals from the ECU 21. At step S110, it is determined that the signals from the ECU 21 is not for turning on combustor 11, the combustor 11 is turned off at step S120. In this case, when the combustor 11 is stopped, the stopping state of the combustor 11 is maintained. On the other hand, it is determined that the signals from the ECU 21 is for turning on the combustor 11 at step S110, it is determined whether or not the engine 1 is turned on based on ignition signals to an ignition coil of the engine 1 at step S130. When the operation of the engine 1 is stopped, the EGR valve 51 is closed at step S140, and the fuel pump 12, the water pump 20 and the blower 19 are operated so that the combustor 11 is operated (ignited) at step S150. In this case, when the combustor 11 is operated, the operation state (ON state) of the combustor 11 is maintained. When the EGR valve 51 is closed, exhaust gas of the combustor 11 flows into the exhaust pipe 3 through the exhaust pipe 52 and the communication pipe 50, and is discharged to the atmosphere after passing through the catalyst 4 and the muffler 5, as shown in FIG. 13.

On the other hand, when the engine 1 is turned on at step S130, the EGR valve 51 is opened at step S160, and the combustor 11 is operated (ignited) at step S150. Therefore, as shown in FIG. 15, exhaust gas of the combustor 11 flows through the exhaust pipe 52, and is introduced into the intake pipe 2 of the engine 1, together with exhaust gas of the engine 1.

When the engine is operated when the combustor 11 operates, exhaust gas of the combustor 11 is sucked into the engine 1 together with intake air to be burned (exploded). Therefore, in a fuel injection unit of the engine 1, exhaust gas of the combustor 11 can be mixed into the intake air so that oxygen concentration contained in the intake air of the engine 1 can be reduced.

According to the seventh embodiment of the present invention, when the operation of the engine 1 is stopped, the EGR valve 51 is closed as shown in FIG. 13. Therefore, exhaust gas of the combustor 11 flows into the exhaust pipe 3 through the exhaust pipe 52 of the combustor 11 and the communication pipe 50, and is discharged to the atmosphere after passing through the catalyst 4 and the muffler 5, Therefore, additional catalyst and muffler are not necessary for the combustor 11.

Figure 15:
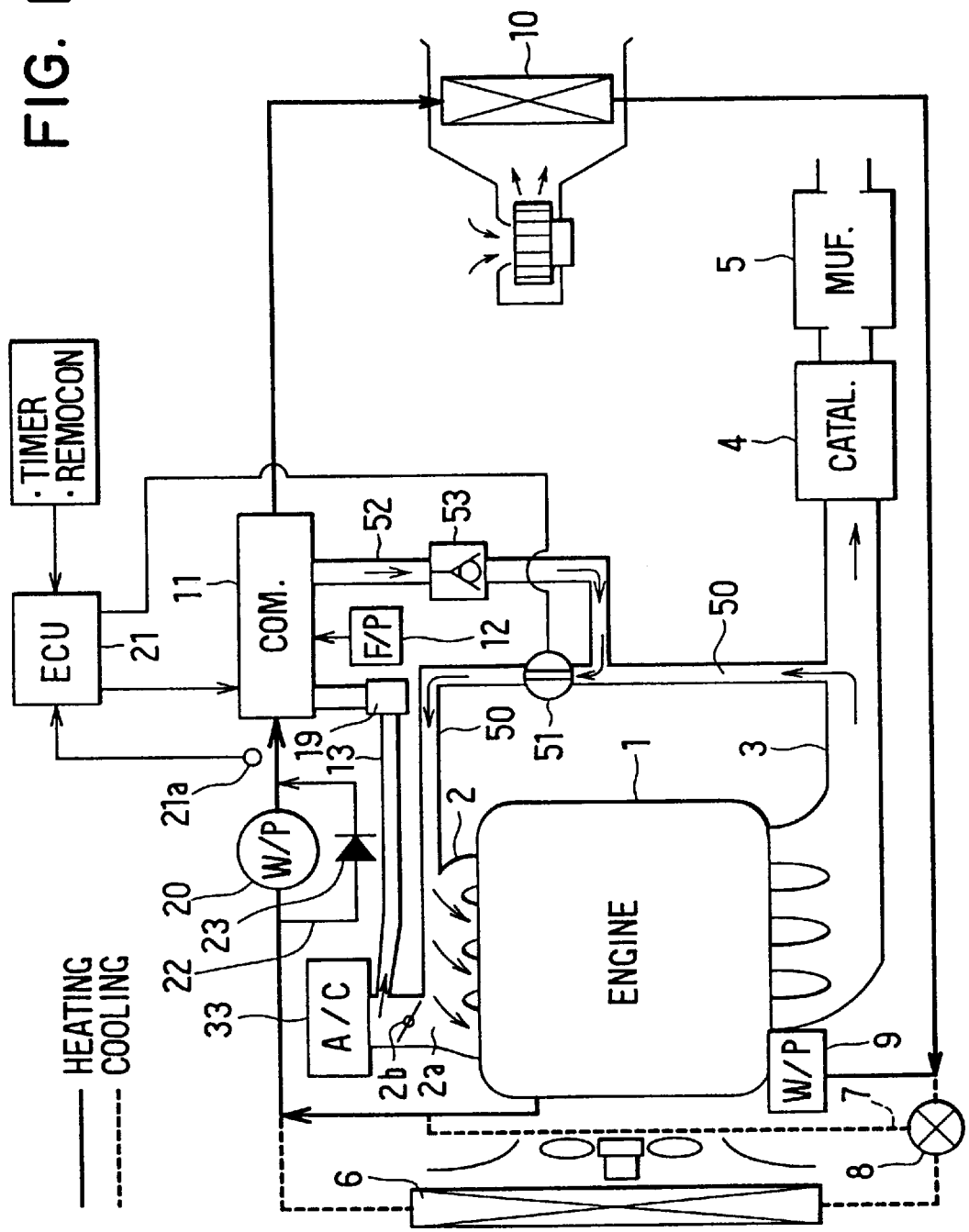
FIG. 15 is a schematic diagram showing a heating apparatus for a vehicle when the engine is operated, according to the seventh embodiment.

When the engine 1 is operated, the EGR valve 51 is opened as shown in FIG. 15. Therefore, exhaust gas of the combustor 11 is sucked into the intake pipe 2 of the engine 1, together with exhaust gas of the engine 1. Thus, exhaust gas of the combustor 11 can be discharged without using a volume type blower, and the combustor 11 can be stably burned. As a result, in the heating apparatus of the seventh embodiment, the combustor 11 can be stably burned while product cost of the heating apparatus is reduced. Further, because exhaust gas of the combustor 11 can be cleaned without additional catalyst and muffler for the combustor 11, the combustor 11 is readily mounted on the vehicle.

Even when the engine 1 is stopped, cooling water heated in the combustor 11 circulates in the heater core 10 and the engine 1. Therefore, the engine 1 is heated, and time for heating the engine 1 can be reduced at an engine starting time. Further, even when the engine 1 is stopped, exhaust gas is introduced into the catalyst 4, and the temperature of the catalyst 4 can be increased. Therefore, when the engine 1 restarts, a request time for increasing the temperature of the catalyst 4 to a predetermined temperature, i.e., a time for activating the catalyst 4 can be reduced. Thus, exhaust gas of the engine 1 can be quickly cleaned.

Because the combustor 11 is burned slowly as compared with the engine 1, fuel can be readily completely burned in the combustor 11. Therefore, exhaust gas of the combustor 11 has an oxygen concentration smaller than that of exhaust gas of the engine 1. Thus, it is compared with a general exhaust gas recirculation system where exhaust gas of the engine 1 is simply introduced into the intake side of the engine 1, it can prevent the burning temperature of the combustion chamber of the engine 1 from being increased due to oxidation of exhaust gas of the combustor 11. Thus, according to the seventh embodiment of the present invention, nitrogen oxide of exhaust gas can be further reduced as compared with the general exhaust gas recirculation system.

If the check valve 53 is not provided in the exhaust pipe 52 of the combustor 11, when the engine 1 is operated while the combustor 11 stops, exhaust gas of the engine 1 reversely flows into the intake pipe 2 through the communication pipe 50, the exhaust pipe 52, the combustor 11 and the communication pipe 13 even when the EGR valve 51 is closed. However, according to the seventh embodiment of the present invention, because the check valve 53 is provided in the exhaust pipe 52 of the combustor 11, it can prevent exhaust gas of the engine 1 from reversely flowing into the intake pipe 2 through the combustor 11. That is, the check valve 53 prevents exhaust gas of the engine 1 from flowing into the combustor 11.

In the seventh embodiment of the present invention, when the combustor 11 is stopped, the EGR valve 51 is operated based on the burning state of the engine 1, the load applied to the engine 1, the rotation speed of the engine 1, and the like.

In the above-described seventh embodiment of the present invention, heat of the combustor 11 is transmitted to cooling water so that a passenger compartment is heated. However, the passenger compartment may be directly heated by the combustor 11. The heating apparatus of the seventh embodiment is not limited to be applied to a diesel engine, but may be applied to a gasoline engine, an engine having a turbo-charging function where pressure of intake air of the engine 1 is charged using energy of exhaust gas of the engine 1.

In the above-described seventh embodiment of the present invention, when the combustor 11 is operated while the engine 1 stops, the EGR valve 51 is closed. However, when the throttle valve 2b is closed in this case, the EGR valve 51 may be opened. In the above-described seventh embodiment of the present invention, when an inter cooler for cooling intake air of the intake pipe 2 of the engine 1 is necessary, a draining port for draining condensed water is necessary in a case where exhaust gas of the combustor 11 is discharged into the intake pipe 2 at an upstream side of the inter cooler. Because exhaust gas of the combustor 11 includes a large amount water, condensed water is readily generated when exhaust gas of the combustor 11 is cooled in the inter cooler.

Further, in the above-described seventh embodiment of the present invention, it is determined whether or not the engine 1 is operated based on ignition signals. However, the operation of the engine 1 may be determined based on signals from an alternator mechanically operatively linked with the operation of the engine 1.

Figure 16:
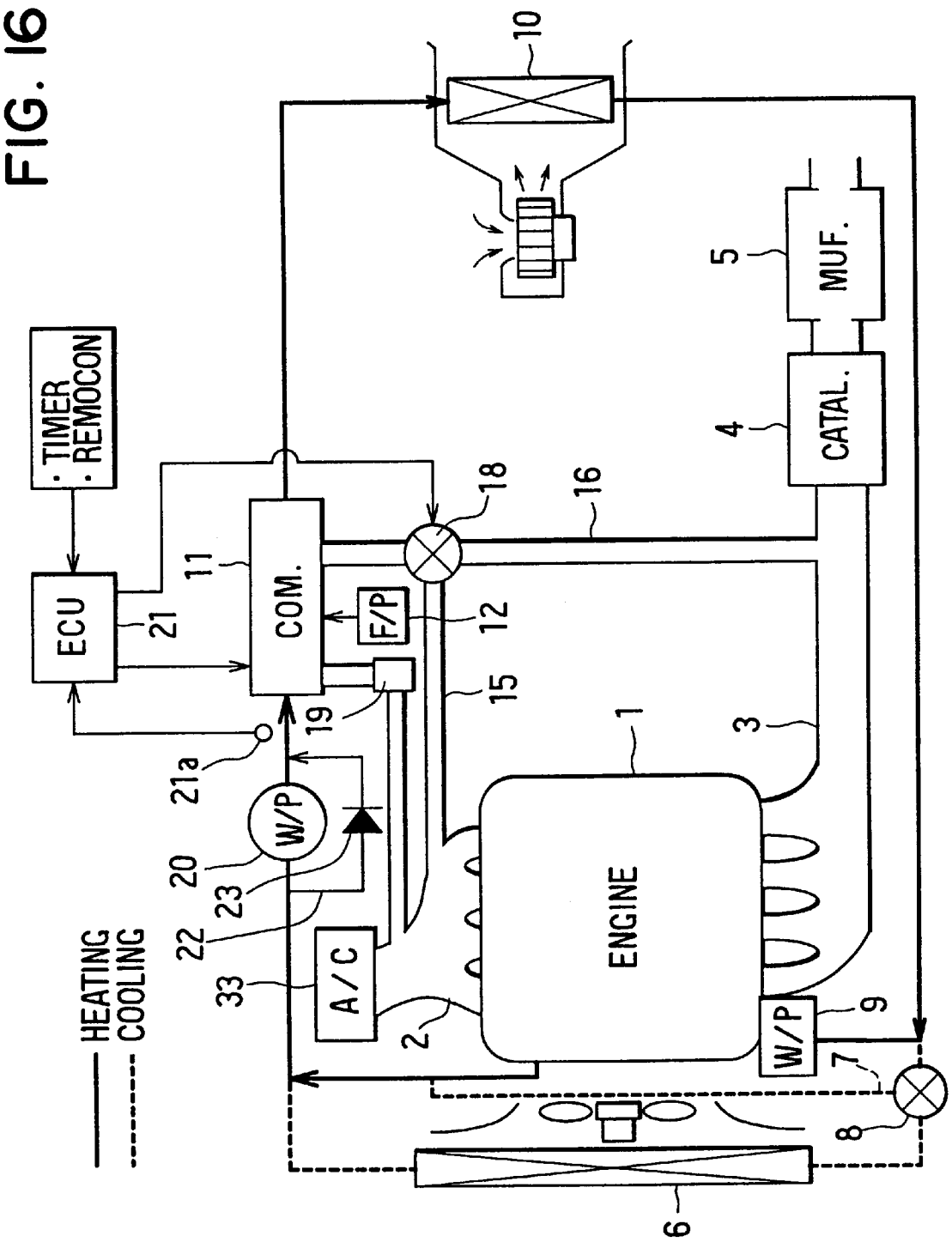
FIG. 16 is a schematic diagram showing a heating apparatus for a vehicle according to an eighth preferred embodiment of the present invention.
Figure 17:
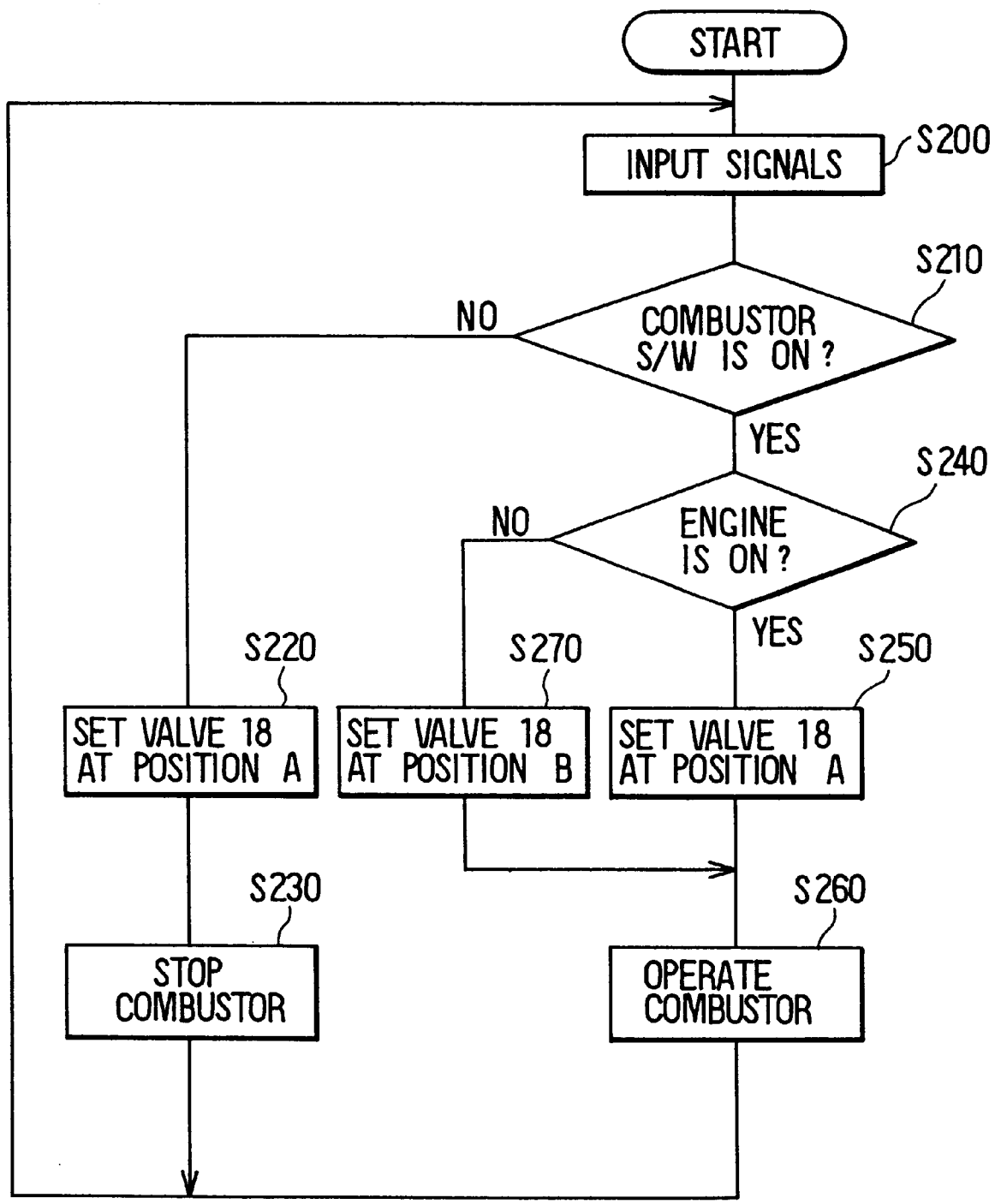
FIG. 17 is a flow diagram showing a control of an electronic control unit (ECU) of the heating apparatus according to the eighth embodiment.

An eighth preferred embodiment of the present invention will be now described with reference to FIGS. 16, 17. FIG. 16 shows a heating apparatus for a vehicle of the eighth embodiment. In the eighth embodiment, components similar to those in the above-described third embodiment are indicated with the same reference numbers, and the explanation thereof is omitted. Cooling water flows into the heater core 10 during heating, and flows into the radiator 6 during cooling. Generally, the water pump 9 and the bypass passage 7 through which cooling water bypasses the radiator 6 are formed within an engine room of the engine 1. Air blown into a passenger compartment of the vehicle is heated in the heater core 10 using cooling water as a heating source. Cooling water supplying to the heater core 10 is heated in the engine 1 or in the combustor 11. The operation state of the combustor 11 or heat-generating amount from the combustor 11, a fuel amount supplied from the fuel pump 12 to the combustor 11, the electrical water pump 20 are controlled by the ECU 21 based on a set value of a timer switch or a remocon (i.e., remote control) unit and signals detected by the water temperature sensor 21a. The water temperature sensor 21a detects the temperature of cooling water flowing from the engine 1.

Cooling water from the engine 1 bypasses the water pump 20 through the bypass passage 22, and is supplied to the combustor 11. The check valve 23 prevents cooling water discharged from the electrical water pump 20 from flowing into the intake side of the water pump 20 through the bypass passage 22.

Air cleaned in the air cleaner 33 is introduced into the combustor 11 through the intake pipe 2 and the communication pipe 13. The blower 19 for blowing intake air into the combustor 11 is disposed in the communication pipe 13. In the eighth embodiment, the blower 19 is a turboblower.

Exhaust gas of the combustor 11 is introduced into the intake pipe 2 through the communication pipe 15. Further, exhaust gas of the combustor 11 is introduced into the exhaust pipe 3 at an upstream side of the catalyst 4 through the communication pipe 16. The switching valve 18 is disposed at a connection point between the communication pipes 15, 16. Therefore, the switching valve 18 switches between a case where exhaust gas of the combustor 11 flows into the communication pipe 15, and a case where exhaust gas of the combustor 11 flows into the exhaust pipe 3 through the communication pipe 16.

In the eighth embodiment, the switching valve 18 is an electrical valve in which a valve body is operated by a stepping motor. The operation of the switching valve 18 is controlled by the ECU 21.

Next, operation of the heating apparatus according to the eighth embodiment of the present invention will be now described with reference to the flow diagram of FIG. 17. As shown in FIG. 17, firstly, signals from the timer switch or the remote control (i.e., remocon) unit are input to ECU 21 at step S200. At step S210, it is determined whether or not a switch (S/W) of the combustor 11 is turned on based on signals from the ECU 21. At step S210, when it is determined that the signals from the ECU 21 is not for turning on combustor 11, the switching valve 18 is set at position A so that exhaust gas of the combustor 11 is introduced into the intake pipe 2 through the communication pipe 15 at step S220. Then, at step S230, the combustor 11 is stopped. In this case, when the combustor 11 has been stopped, the stopping state of the combustor 11 is maintained. On the other hand, when it is determined that the signals from the ECU 21 is for turning on the combustor 11 at step S210, it is determined whether or not the engine 1 is turned on based on ignition signals to an ignition coil of the engine 1 at step S240. When the engine 1 is operated, the switching valve 18 is set at the position A at step S250 so that exhaust gas of the combustor 11 is introduced into the intake pipe 2 of the engine 1. In this case, the fuel pump 12 and the blower 19 are operated, and the combustor 11 is operated (ignited) at step S260. When the combustor 11 has been operated, the operation state of the combustor 11 is maintained.

On the other hand, when the engine 1 is not operated at step S240, the switching valve 18 is set at a position B at step S270 so that exhaust gas of the combustor 11 is introduced into the exhaust pipe 3 through the communication pipe 16. In this case, the fuel pump 12, the electrical water pump 20 and the blower 19 are operated, and the combustor 11 is operated at step S260. When the combustor 11 has been operated, the operation state of the combustor 11 is maintained.

When the engine 1 is operated when the combustor 11 operates, exhaust gas of the combustor 11 is sucked into the engine 1 together with intake air to be burned (exploded). Therefore, in a fuel injection unit of the engine 1, exhaust gas of the combustor 11 can be mixed into the intake air so that oxygen concentration contained in the intake air of the engine 1 can be reduced.

According to the eighth embodiment of the present invention, when the operation of the engine 1 is stopped, exhaust gas of the combustor 11 flows into the exhaust pipe 3 through the communication pipe 16, and is discharged to the atmosphere after being cleaned in the catalyst 4 and reducing noise in the muffler 5. Therefore, additional catalyst and muffler are not necessary for the combustor 11.

When the engine 1 is operated, exhaust gas of the combustor 11 is introduced into the intake pipe 2 of the engine 1 through the communication pipe 15. Therefore, exhaust gas of the combustor 11 can be discharged without using a volume type blower, and it can prevent exhaust gas of the engine 1 from flowing into the combustor 11. Thus, in the heating apparatus of the eighth embodiment, the combustor 11 can be stably burned while product cost of the heating apparatus is reduced. Further, because exhaust gas of the combustor 11 can be cleaned without additional catalyst and muffler for the combustor 11, the combustor 11 is readily mounted on the vehicle.

Even when the engine 1 is stopped, cooling water heated in the combustor 11 circulates in the heater core 10 and the engine 1. Therefore, the engine 1 is heated, and time for heating the engine 1 can be reduced at an engine starting time. Further, even when the engine 1 is stopped, exhaust gas is introduced into the catalyst 4, and the temperature of the catalyst 4 can be increased. Therefore, when the engine 1 restarts, a request time for increasing the temperature of the catalyst 4 to a predetermined temperature, i.e., a time for activating the catalyst 4 can be reduced. Thus, exhaust gas of the engine 1 can be quickly cleaned. Further, when the engine 1 operates, exhaust gas of the combustor 11 is introduced into the intake pipe 2, and nitrogen oxide contained in exhaust gas of the engine 1 can be restricted.

Because the combustor 11 is burned slowly as compared with the engine 1, fuel can be readily completely burned in the combustor 11. Therefore, exhaust gas of the combustor 11 has an oxygen concentration smaller than that of exhaust gas of the engine 1. Thus, it is compared with a general exhaust gas recirculation system where only exhaust gas of the engine 1 is introduced into the intake side of the engine 1, it can prevent the burning temperature of the combustion chamber of the engine 1 from being increased. Thus, according to the eighth embodiment of the present invention, nitrogen oxide can be further reduced as compared with the general exhaust gas recirculation system.

Figure 18:
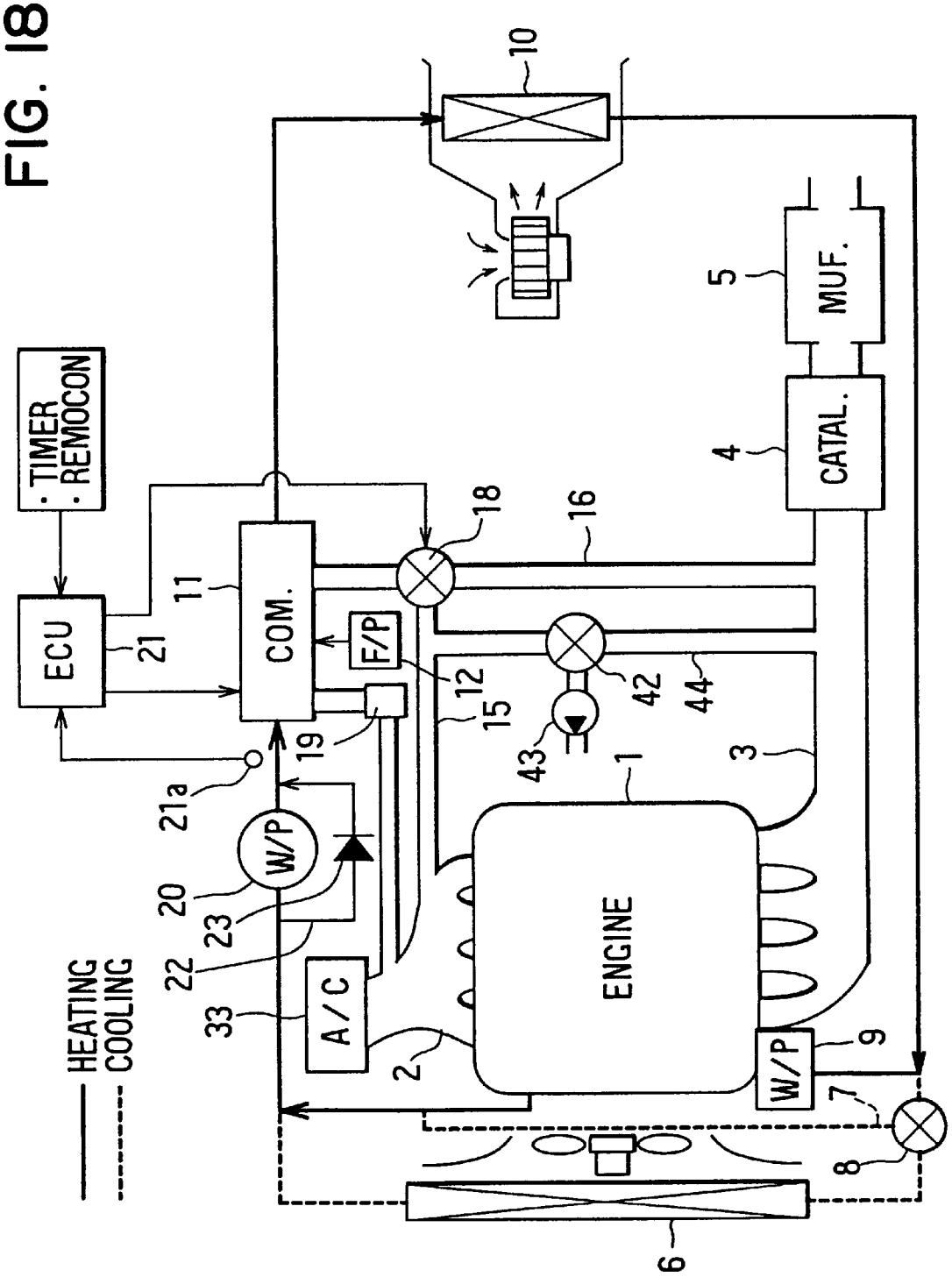
FIG. 18 is a schematic diagram showing a heating apparatus for a vehicle according to a modification of the eighth embodiment of the present invention.

In the above-described eighth embodiment, the valve body of the switching valve 18 is operated by a stepping motor. However, the valve body of the switching valve 18 may be operated through an actuator which is operated by a negative pressure of a vacuum pump operatively linked with the engine 1. In this case, as shown in FIG. 18, a communication pipe 44 for connecting the exhaust pipe 3 and the communication pipe 15 is provided, a valve 42 for opening and closing the communication pipe 44 is provided in the communication pipe 44 and a vacuum pump 43 is provided.

Further, the switching valve 18 may be a mechanical type in which an actuator is directly operated by using a pressure difference between an exhaust gas pressure and an intake air pressure of the engine 1 so that the valve body of the switching valve 18 is operated.

Further, the heating apparatus according to the eighth embodiment of the present invention may be applied to an engine having a turbo-charging unit where pressure of intake air of the engine 1 is charged using energy of exhaust gas of the engine 1. In this case, the intake side and the exhaust side of the combustor 11 are connected to an upstream side or a downstream side of the turbo-charging unit so that a pressure difference between the intake side and the exhaust side of the combustor 11 is made smaller. When a turbo-charging unit or a throttle valve is provided between the intake side and the exhaust side of the combustor 11, the turbo-charging unit is stopped or the throttle valve is opened so that the pressure difference between the intake side and the exhaust side of the combustor 11 is made smaller. When an inter cooler for cooling intake air of the intake pipe 2 of the engine 1 is necessary, a draining port for draining condensed water is necessary in the inter cooler in a case where exhaust gas of the combustor 11 is discharged into the intake pipe 2 at an upstream side of the inter cooler. Because exhaust gas of the combustor 11 includes a large amount water, condensed water is readily generated when exhaust gas of the combustor 11 is cooled in the inter cooler.

Further, in the above-described eighth embodiment, it is determined whether or not the engine 1 is operated based on ignition signals. However, the operation of the engine 1 may be determined based on signals from an alternator mechanically operatively linked with the operation of the engine 1.

Figure 19:
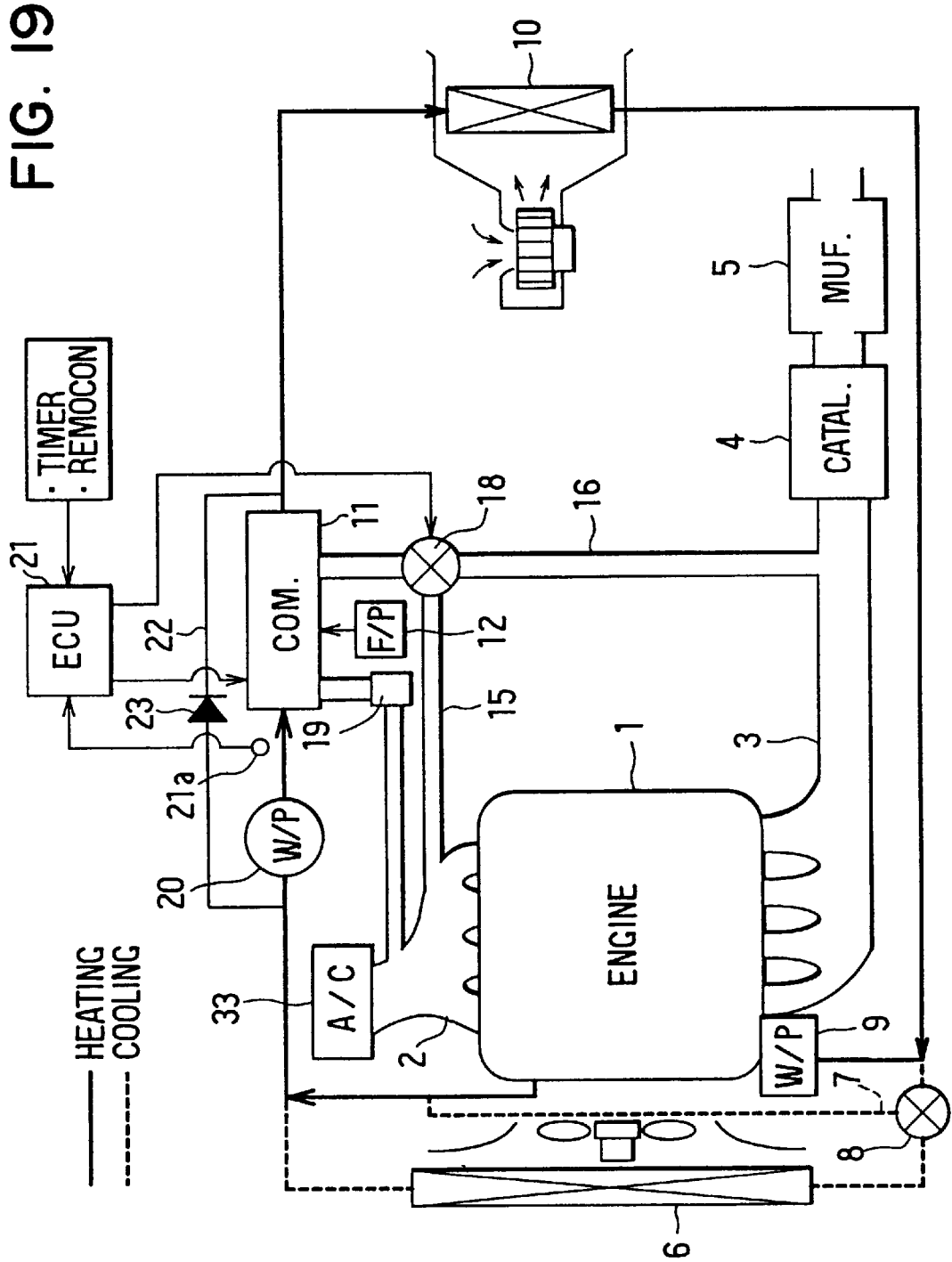
FIG. 19 is a schematic diagram showing a heating apparatus for a vehicle according to a ninth preferred embodiment of the present invention.

A ninth preferred embodiment of the present invention will be now described with reference to FIG. 19. FIG. 19 shows a heating apparatus for a vehicle according to the ninth embodiment. In the ninth embodiment, the components similar to those in the above-described eighth embodiment are indicated with the same reference numbers, and the explanation thereof is omitted. In a vehicle heating apparatus of the ninth embodiment, ignition performance (starting performance) of the combustor 11 is improved.

As shown in FIG. 19, the bypass passage 22 is connected to a water intake side of the electrical water pump 20 and a water discharge side of the combustor 11, so that cooling water flowing from the engine 1 can be directly introduced into the heater core 10 while bypassing the electrical water pump 20 and the combustor 11. In the ninth embodiment, until a predetermined time is passed after an ignition signal for igniting the combustor 11 is sent from the ECU 21, the electrical water pump 20 is stopped, and thereafter, the electrical water pump 20 is operated. Thus, it can prevent cooling water from being introduced into the combustor 11 at the same time as the ignition signal is sent to the combustor 11. Accordingly, heat within the combustor 11 is not transmitted into the outside (e.g., heater core 10) of the combustor 11 before the combustor 11 is completely ignited. As a result, the ignition performance of the combustor 11 is improved.

Figure 20:
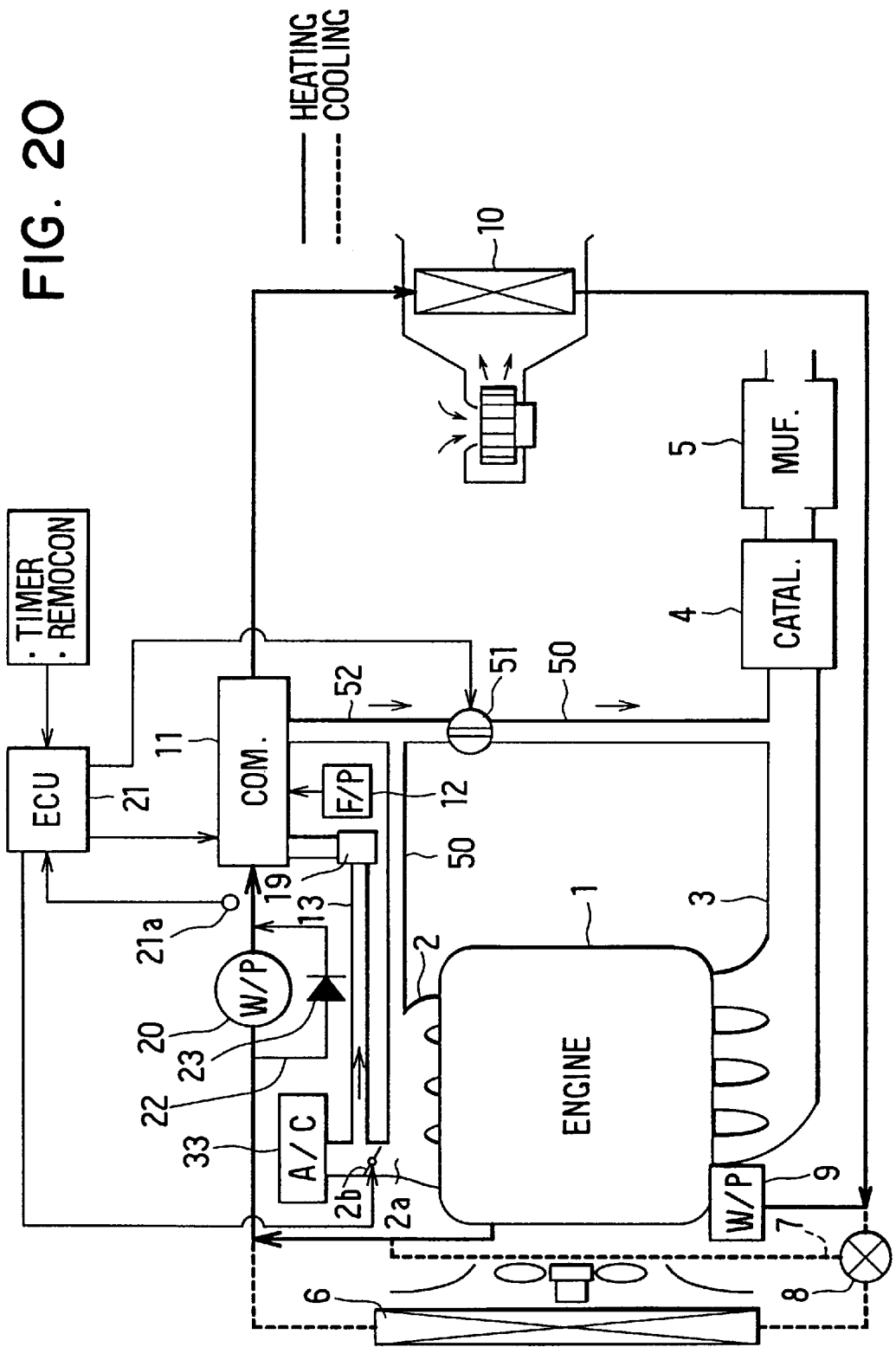
FIG. 20 is a schematic diagram showing a heating apparatus for a vehicle when an engine is stopped, according to a tenth preferred embodiment of the present invention.

A tenth preferred embodiment of the present invention will be now described with reference to FIGS. 20–23. FIG. 20 shows a heating apparatus for a vehicle of the tenth embodiment. In the tenth embodiment, components similar to those in the above-described seventh embodiment are indicated with the same reference numbers, and the explanation thereof is omitted. Similarly to the seventh embodiment of the present invention, the communication pipe (EGR pipe) 50 is formed so that exhaust gas of the engine 1 is introduced into the intake pipe 2 of the engine 1. Further, the EGR valve 51 for opening and closing the communication pipe 50 is provided in the communication pipe 50. In the tenth embodiment, the exhaust pipe 52 of the combustor 11 is connected to the communication pipe 50 at a position between the intake pipe 2 and the EGR valve 51. Cooling water flows into the heater core 10 during heating, and flows into the radiator 6 during cooling.

In the tenth embodiment, as shown in FIG. 20, the throttle valve 2b is disposed between the joining portion 2a of the intake pipe 2 and the air cleaner 33. Therefore, air introduced from the intake pipe 2 is restricted by the throttle valve 2b.

When the combustor 11 is operated, fuel supplied from the fuel pump 12 is burned in the combustion chamber of the combustor 11. The operation of the combustor 11 or heat-generating amount from the combustor 11, a fuel amount supplied from the fuel pump 12 to the combustor 11, the electrical water pump 20 are controlled by the ECU 21 based on a set value of a timer switch or a remocon (i.e., remote control) unit and signals detected by the water temperature sensor 21a. The water temperature sensor 21a detects the temperature of cooling water flowing from the engine 1.

Air cleaned in the air cleaner 33 is introduced into the combustor 11 through the communication pipe 13. In the tenth embodiment, an upstream air position of the throttle valve 2b in the intake pipe 2 communicates with the intake side of the combustor 11 through the communication pipe 13. The blower 19 for blowing intake air into the combustor 11 is disposed in the communication pipe 13. In the tenth embodiment, the blower 19 is a turboblower.

The exhaust pipe 52 of the combustor 11 communicates with the intake pipe 2 through the communication pipe 50 at a downstream side of the throttle valve 2b, and communicates with the exhaust pipe 3 through the communication pipe 50 at an upstream side of the catalyst 4. When the EGR valve 51 closes the communication pipe 50, exhaust gas of the combustor 11 is introduced into the intake pipe 2. The operations of the EGR valve 51 and the throttle valve 2b are controlled by the ECU 21. In the tenth embodiment, according to the operation position of the EGR valve 51, exhaust gas of the combustor 11 can be introduced into the intake pipe 2 or can be discharged to the exhaust pipe 3 of the engine 1.

Figure 21:
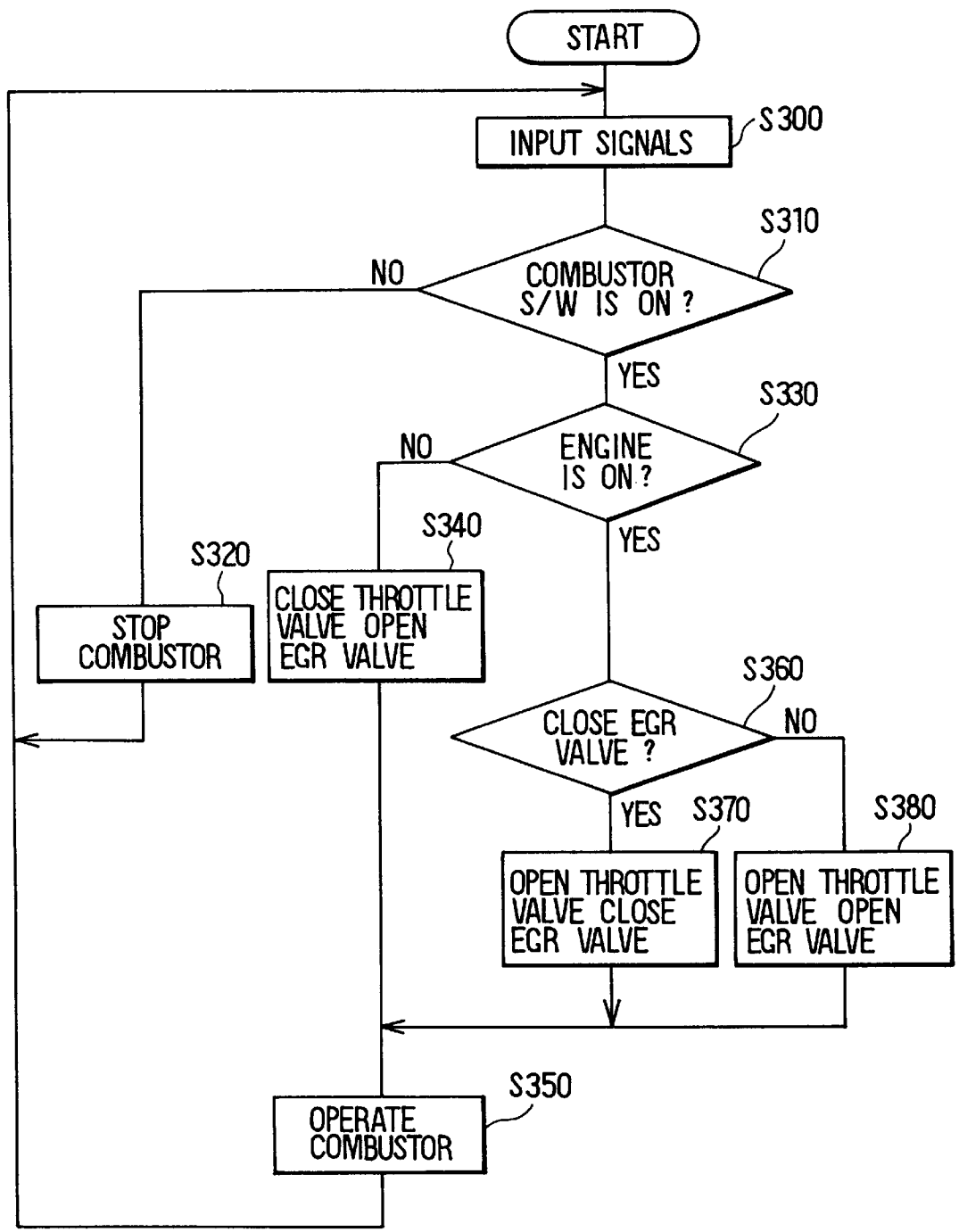
FIG. 21 is a flow diagram showing a control of an electronic control unit (ECU) of the heating apparatus according to the tenth embodiment.

Next, operation of the vehicle heating apparatus according to the tenth embodiment will be now described with reference to the flow diagram of FIG. 21. Firstly, at step S300, signals from the timer switch or the remote control (i.e., remocon) unit are input to the ECU 21. At step S310, it is determined whether or not a switch (S/W) of the combustor 11 is turned on based on signals from the ECU 21. At step S310, when it is determined that the signals from the ECU 21 is not for turning on combustor 11, the combustor 11 is turned off at step S320. In this case, when the combustor 11 has been stopped, the stopping state of the combustor 11 is maintained at step S320. On the other hand, when it is determined that the signals from the ECU 21 is for turning on the combustor 11 at step S310, it is determined whether or not the engine 1 is turned on based on ignition signals to an ignition coil of the engine 1 at step S330. When the operation of the engine 1 is stopped, the throttle valve 2b is closed and the EGR valve 51 is opened at step S340. Further, the fuel pump 12 and the blower 19 are operated, and the combustor 11 is operated (ignited) at step S350. In this case, when the combustor 11 has been operated, the operation state (ON state) of the combustor 11 is maintained. When the EGR valve 51 is opened, exhaust gas of the combustor 11 flows into the exhaust pipe 3 through the exhaust pipe 52 and the communication pipe 50, and is discharged to the atmosphere after passing through the catalyst 4 and the muffler 5, as shown in FIG. 20. At this time, because the throttle valve 2b is closed, exhaust gas of the combustor 11 is not introduced into again an intake side of the combustor 11, and fresh air is introduced into the intake side of the combustor 11.

Figure 22:
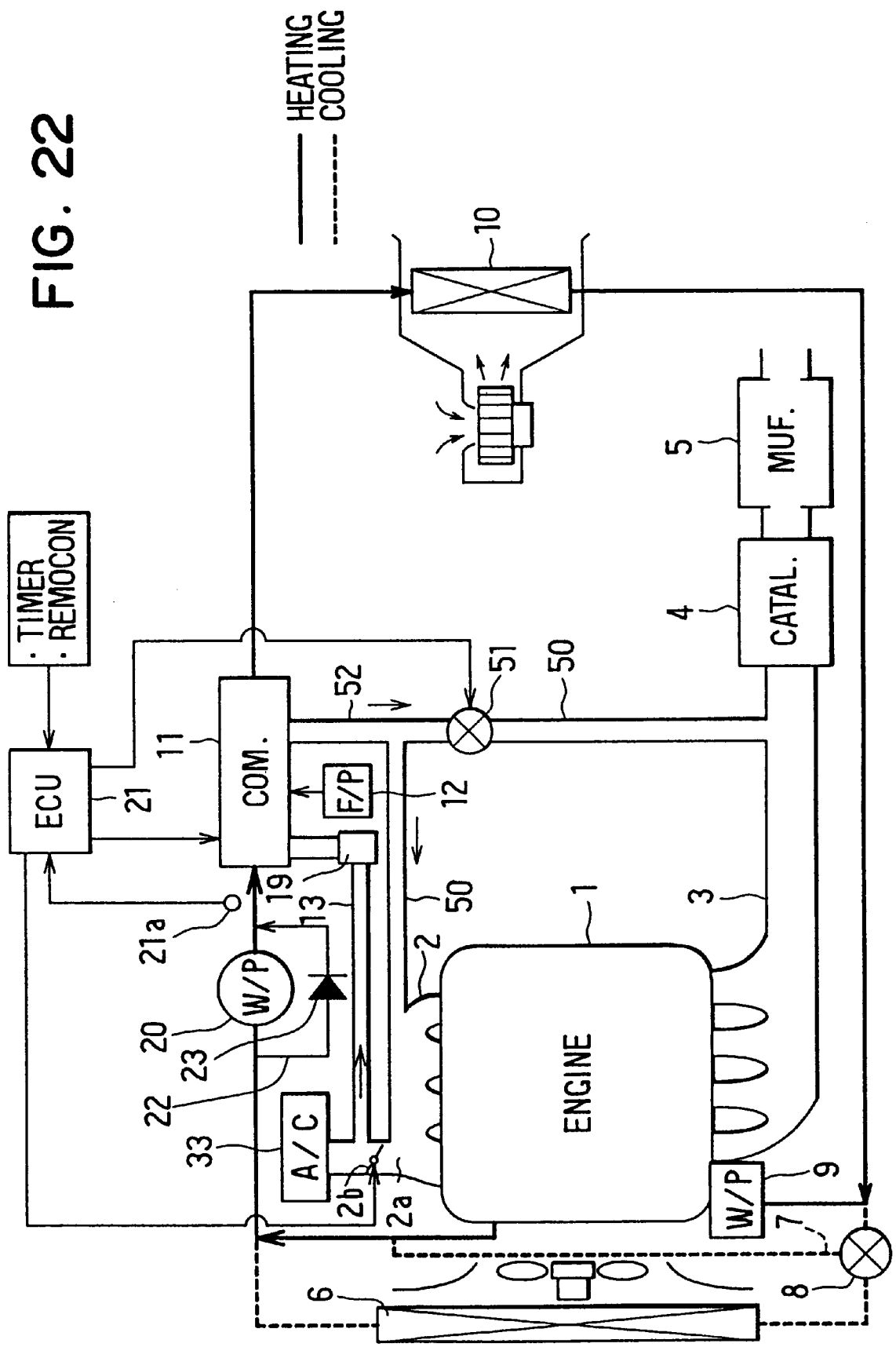
FIG. 22 is a schematic diagram showing the heating apparatus when a EGR valve is closed when the engine is operated, according to the tenth embodiment.
Figure 23:
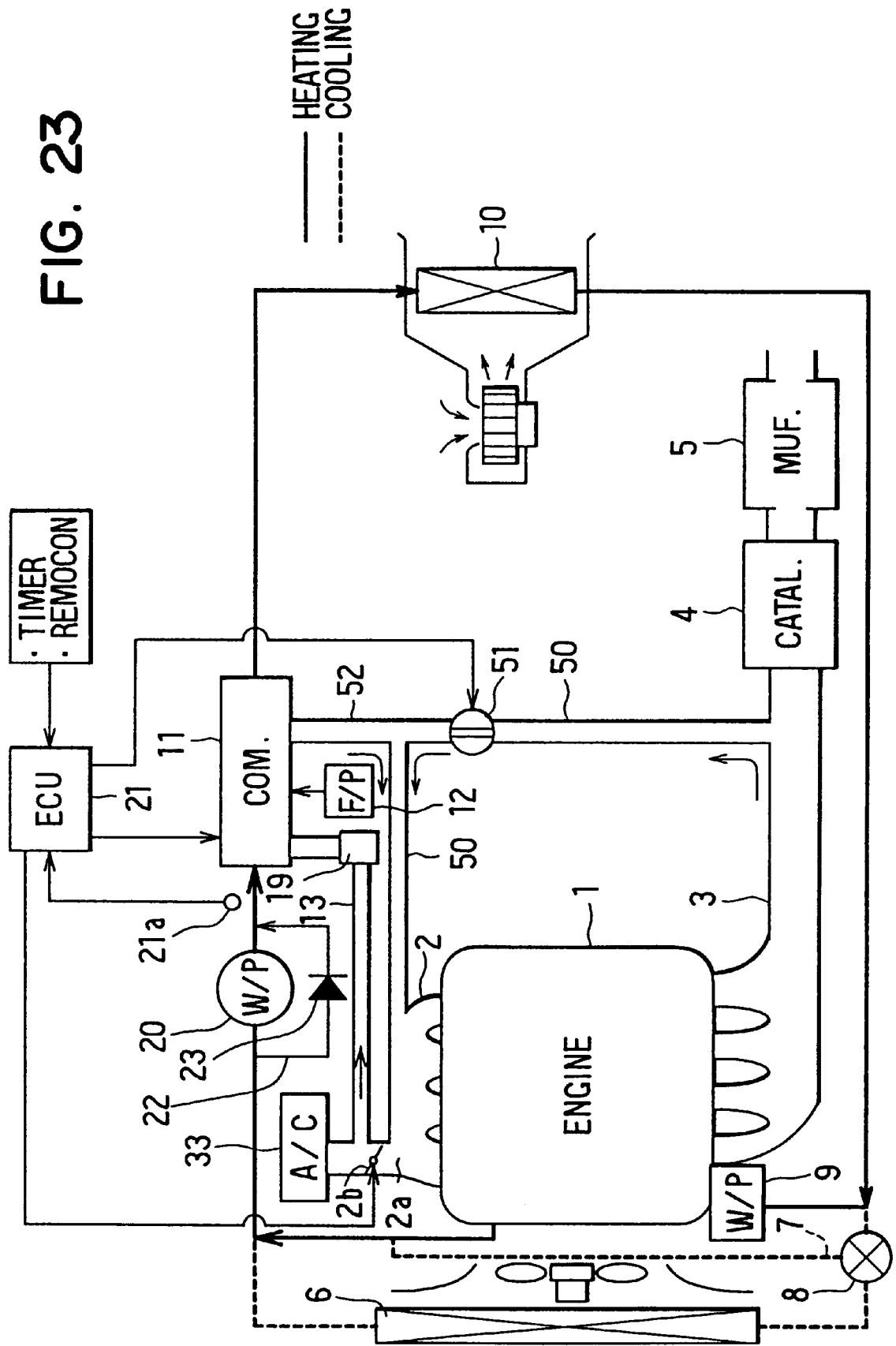
FIG. 23 is a schematic diagram showing the heating apparatus when the EGR valve is opened when the engine is operated, according to the tenth embodiment.

On the other hand, when the engine 1 is turned on at step S330, it is determined whether or not the EGR valve 51 is closed based on the burning state (e.g., burning temperature), the engine load, the rotation speed of the engine 1, the cooling water temperature and the like. When it is determined that the EGR valve 51 is closed at step S360, the EGR valve 51 is closed and the throttle valve 2b is opened at step S370. Further, at step S350, the combustor 11 is operated. Thus, as shown in FIG. 22, exhaust gas of the combustor 11 can be introduced into the intake pipe 2 through the exhaust pipe 52 and the communication pipe 50, without being received by pressure of exhaust gas of the engine 1 when the engine 1 is operated. On the other hand, when it is determined that the EGR valve 51 is opened at step S360, the EGR valve 51 is opened and the throttle valve 2b is opened at step S380. Further, at step S350, the combustor 11 is operated. Thus, as shown in FIG. 23, exhaust gas of the combustor 11 is introduced into the intake pipe 2 through the exhaust pipe 52 and the communication pipe 50, and exhaust gas of the engine 1 is also introduced into the intake pipe 2 of the engine 1 through the communication pipe 50, together with the exhaust gas of the combustor 11.

When the engine 1 is operated when the combustor 11 operates, exhaust gas of the combustor 11 is introduced into the engine 1 together with intake air to be burned (exploded). Therefore, in a fuel injection unit of the engine 1, exhaust gas of the combustor 11 can be mixed into the intake air so that oxygen concentration contained in the intake air of the engine 1 can be reduced.

By adjusting the opening degree of the throttle valve 2b, pressure of the communication pipe 50 connected to the intake pipe 2 at a downstream side of the throttle valve 2b in the flow direction of intake air is adjusted so that an amount of exhaust gas returning into the intake pipe 2 of the engine 1 is adjusted. Therefore, when the combustor 11 is stopped, the opening degree of the throttle valve 2b is controlled to be operatively linked with the EGR valve 51 based on the burning state (burning temperature) of the engine 1, the engine load, the rotation speed of the engine 1 and the like.

According to the tenth embodiment of the present invention, when the operation of the engine 1 is stopped, the throttle valve 2b is closed and the EGR valve 51 is opened. Therefore, exhaust gas of the combustor 11 flows into the exhaust pipe 3 through the exhaust pipe 52 of the combustor 11 and the communication pipe 50, and is discharged to the atmosphere after passing through the catalyst 4 and the muffler 5. Therefore, additional catalyst and muffler are not necessary for the combustor 11 even when the engine 1 stops.

When the engine 1 is operated, exhaust gas of the combustor 11 is introduced into the intake pipe of the engine 1. Therefore, exhaust gas of the combustor 11 can be discharged without using a volume type blower, and the combustor 11 can be stably burned. Thus, in the heating apparatus of the tenth embodiment, the combustor 11 can be stably burned while product cost of the heating apparatus is reduced. Further, because exhaust gas of the combustor 11 can be cleaned without additional catalyst and muffler for the combustor 11, the combustor 11 is readily mounted on the vehicle.

Further, even when the engine 1 is stopped, exhaust gas of the combustor 11 is introduced into the catalyst 4. Therefore, heating operation of the engine 1 can be facilitated, and the temperature of the catalyst 4 can be quickly increased so that the function of the catalyst 4 is improved.

Because the combustor 11 is burned slowly as compared with the engine 1, fuel can be readily completely burned in the combustor 11. Therefore, exhaust gas of the combustor 11 has an oxygen concentration smaller than that of exhaust gas of the engine 1. Thus, it is compared with a general exhaust gas recirculation system where exhaust gas of the engine 1 is simply introduced into the intake side of the engine 1, the burning temperature of the combustion chamber of the engine 1 can be reduced due to exhaust gas of the combustor 11. Thus, according to the tenth embodiment of the present invention, nitrogen oxide of exhaust gas of the engine 1 can be further reduced as compared with the general exhaust gas recirculation system.

Figure 24:
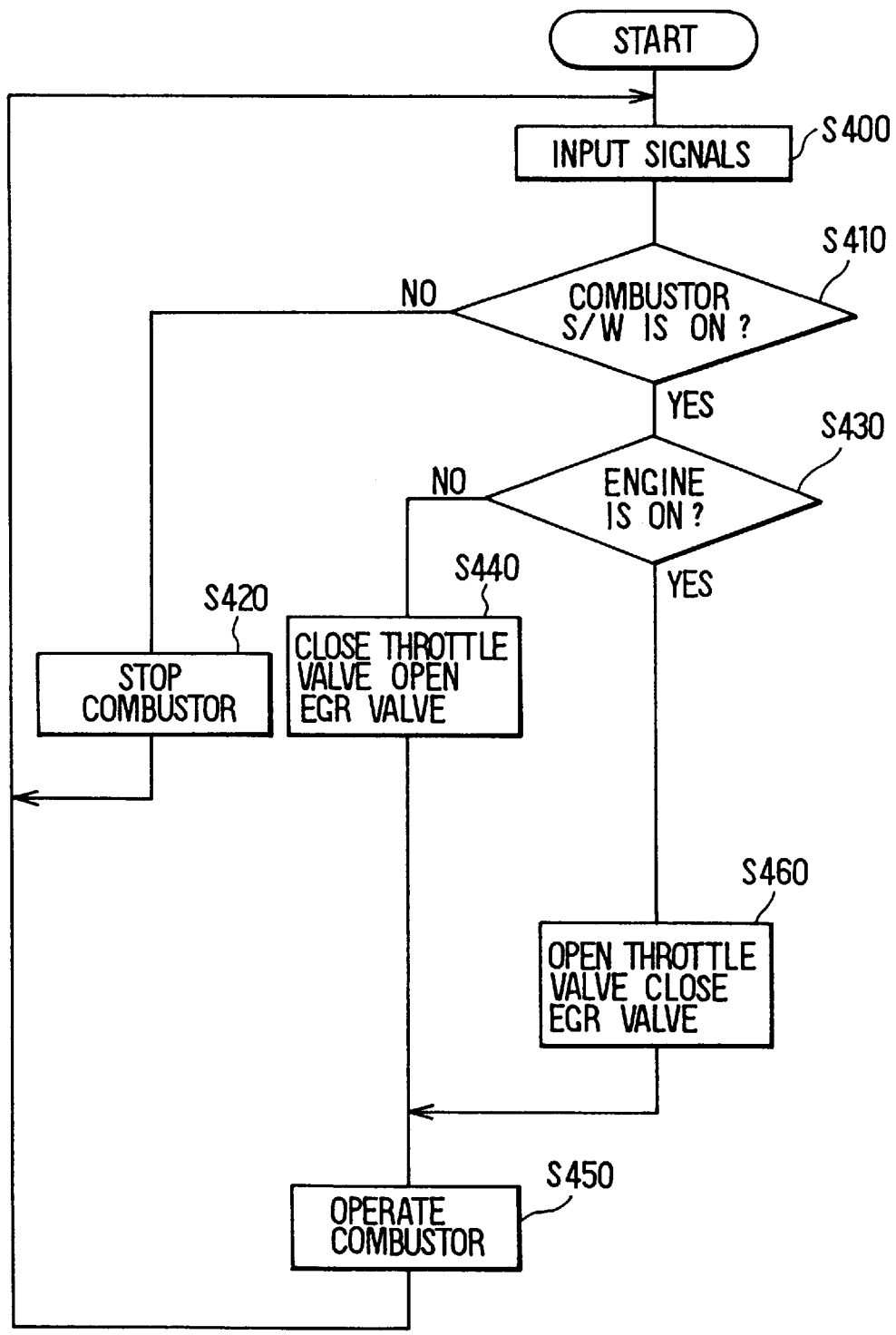
FIG. 24 is a flow diagram showing a control of an electronic control unit (ECU) of a heating apparatus for a vehicle according to an eleventh preferred embodiment of the present invention.

An eleventh preferred embodiment of the present invention will be now described with reference to FIG. 24. In the eleventh embodiment, steps S400–S450 in FIG. 24 are similar to steps S300–S350 in FIG. 21 of the above-described tenth embodiment, and the explanation of steps S400–S450 is omitted. In the above-described tenth embodiment, step S360 is provided so that it is determined whether or not the EGR valve 51 is closed. However, in the eleventh embodiment, when the engine 1 is operated, the EGR valve 51 is always closed while the throttle valve 2b is opened at step S460.

In the eleventh embodiment, the other components of the heating apparatus are similar to those in the tenth embodiment, and explanation thereof is omitted.

In the above-described tenth and eleventh embodiments of the present invention, it is determined whether or not the engine 1 is operated based on ignition signals. However, the operation of the engine 1 may be determined based on signals from an alternator mechanically operatively linked with the operation of the engine 1.

A twelfth preferred embodiment of the present invention will be now described with reference to FIG. 25. In the twelfth embodiment, the components similar to those in the above-described embodiments are indicated with the same reference numbers, and the explanation thereof is omitted.

Figure 25:
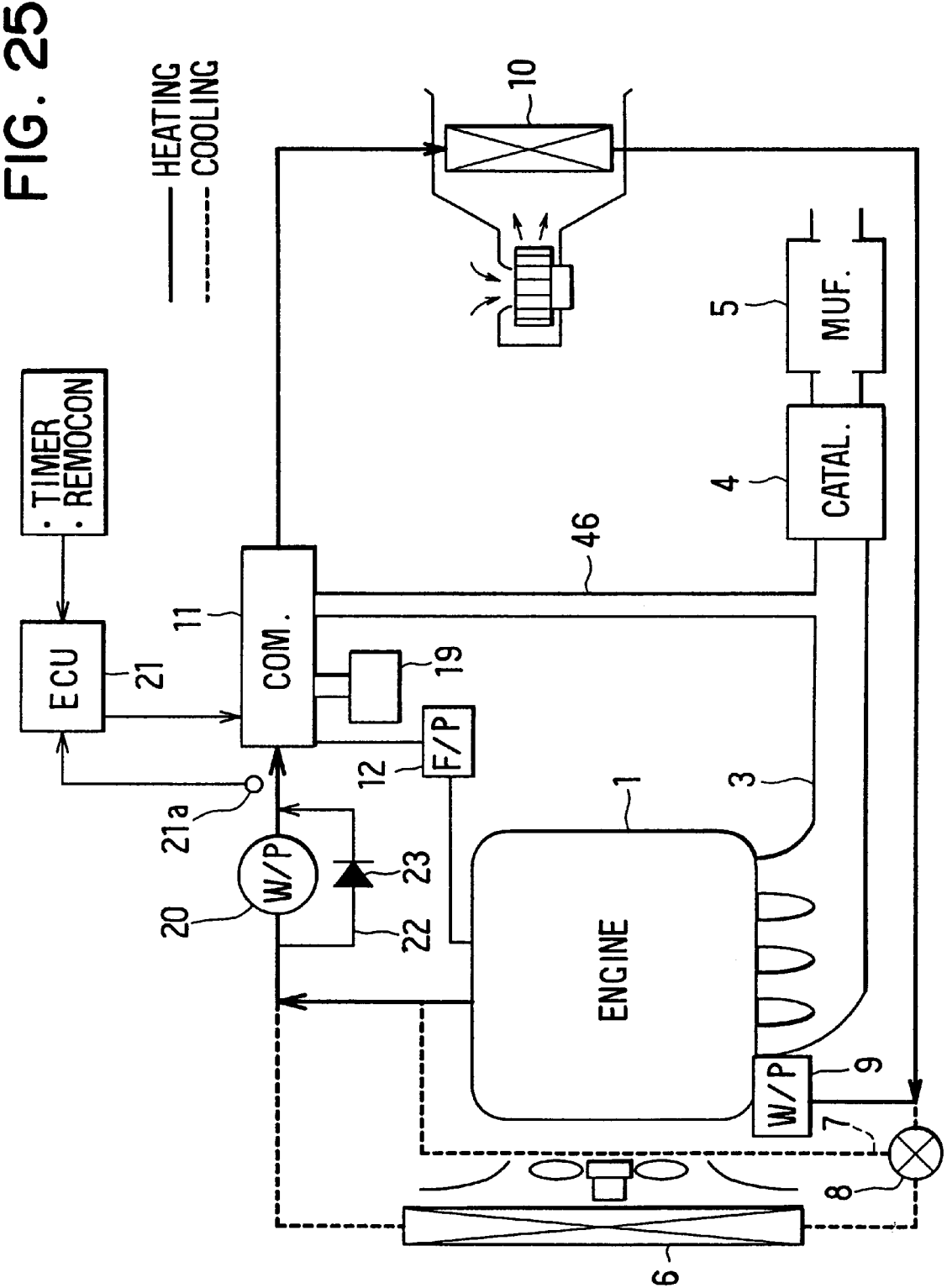
FIG. 25 is a schematic diagram showing a heating apparatus for a vehicle according to a twelfth preferred embodiment of the present invention.

FIG. 25 shows a heating apparatus for a vehicle of the twelfth embodiment. As shown in FIG. 25, exhaust gas discharged from each cylinder of the water-cooled internal combustion engine 1 is introduced into the exhaust pipe 3, and is discharged to the atmosphere after passing through the catalyst 4 and muffler 5.

When the combustor 11 is operated, fuel supplied from the fuel pump 12 is burned in the combustion chamber of the combustor 11. The operation of the combustor 11 or heat-generating amount from the combustor 11, a fuel amount supplied from the fuel pump 12 to the combustor 11, the electrical water pump 20 are controlled by the ECU 21 based on a set value of the timer switch or the remocon (i.e., remote control) unit and signals detected by the water temperature sensor 21a. The water temperature sensor 21a detects the temperature of cooling water flowing from the engine 1.

Exhaust gas of the combustor 11 flows through an exhaust pipe 46 connected to the exhaust pipe 3 at an upstream side of the catalyst 4. Therefore, combust gas of the combustor 11 can be discharged to the atmosphere after passing through the catalyst 4 and the muffler 5. In the twelfth embodiment of the present invention, the blower 19 for blowing air into the combustor 11 is a volume type blower (i.e., air pump).

Next, operation of the vehicle heating apparatus according to the twelfth embodiment will be now described. When the heating operation is set when the engine 1 is stopped, the fuel pump 12, the electrical water pump 20 and the blower 19 are operated and the combustor 11 is ignited (operated) according to signals from the timer switch or the remote control unit. Thus, cooling water heated by the combustor 11 circulates in the heater core 10 and the engine 1. Exhaust gas of the combustor 11 flows through the exhaust pipe 46, is introduced into the catalyst 4 to be cleaned, and is discharged to the atmosphere after noise is reduced in the muffler 5.

When the heating operation is set when the engine 1 operates, the water pump 19 is operated with the operation of the engine 1. Therefore, the electrical water pump 20 is stopped, and the burning state (e.g., burning temperature) of the combustor 11 is controlled according to temperature Tw of cooling water detected by the water temperature sensor 21a. For example, the combustor 11 is stopped, when the cooling water temperature Tw detected by the water temperature sensor 21a is equal to or higher than a predetermined temperature T (e.g., 80° C.). On the other hand, when the cooling water temperature Tw is lower than the predetermined temperature T, the combustor 11 is controlled so that the heat-generating amount from the combustor 11 is increased according to a decrease of the cooling water temperature Tw.

According to the twelfth embodiment of the present invention, exhaust gas of the combustor 11 flows into the exhaust pipe 3 through the exhaust pipe 46, and is discharged to the atmosphere after being cleaned in the catalyst 4 and reducing noise in the muffler 5, Therefore, additional catalyst and muffler are not necessary for the combustor 11. Thus, the combustor 11 is readily mounted on the vehicle.

Even when the engine 1 is stopped, cooling water heated in the combustor 11 circulates the heater core 10 and the engine 1. Therefore, the engine 1 is heated, and time for heating the engine 1 can be reduced at an engine starting time. Further, even when the engine 1 is stopped, exhaust gas of the combustor 11 is introduced into the catalyst 4, and the temperature of the catalyst 4 can be increased. Therefore, when the engine 1 restarts, a request time for increasing the temperature of the catalyst 4 to a predetermined temperature, i.e., a time for activating the catalyst 4 can be reduced. Thus, exhaust gas of the engine 1 can be quickly effectively cleaned. As a result, consumption power of an electric heater for heating the catalyst 4 can be reduced, and the vehicle is produced in low cost.

Figure 26:
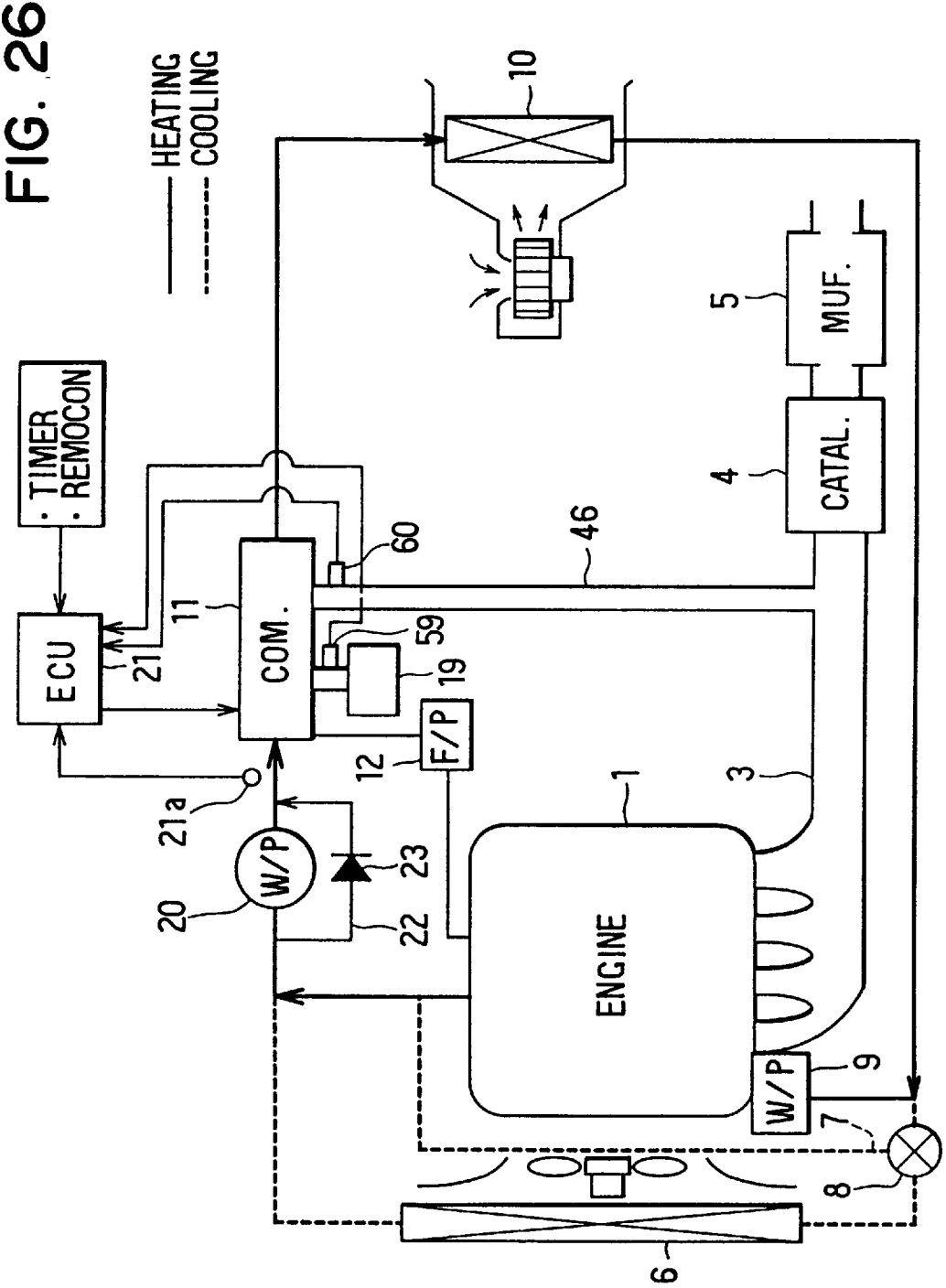
FIG. 26 is a schematic diagram showing a heating apparatus for a vehicle according to a thirteenth preferred embodiment of the present invention.

A thirteenth preferred embodiment of the present invention will be now described with reference to FIGS. 26–29. FIG. 26 shows a heating apparatus for a vehicle of the thirteenth embodiment. In the thirteenth embodiment, the same components as those in the twelfth embodiment are indicated with the same reference numbers, and the explanation thereof is omitted. In the thirteenth embodiment, the combustor 11 is set so that a required heating amount is stably generated from the combustor 11.

As shown in FIG. 26, a pressure sensor 59 for detecting pressure at an intake side of the combustor 11, and a pressure sensor 60 for detecting pressure at an exhaust side of the combustor 11 are provided. An electrical voltage applied to the blower 19 is controlled based on a pressure difference between both pressures detected by the pressure sensors 59, 60.

Figure 27:
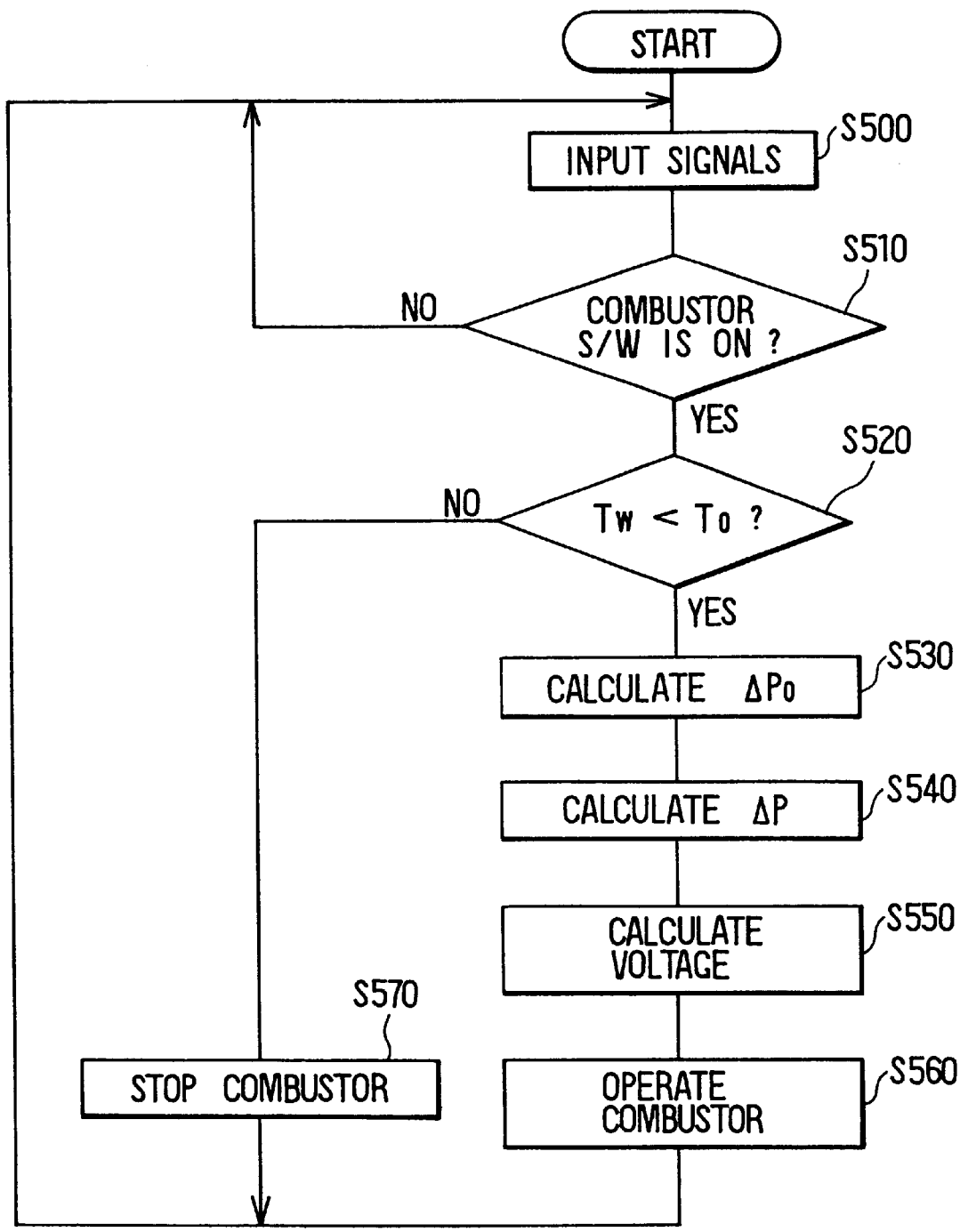
FIG. 27 is a flow diagram showing a control of an electronic control unit (ECU) of the heating apparatus according to the thirteenth embodiment.
Figure 28:
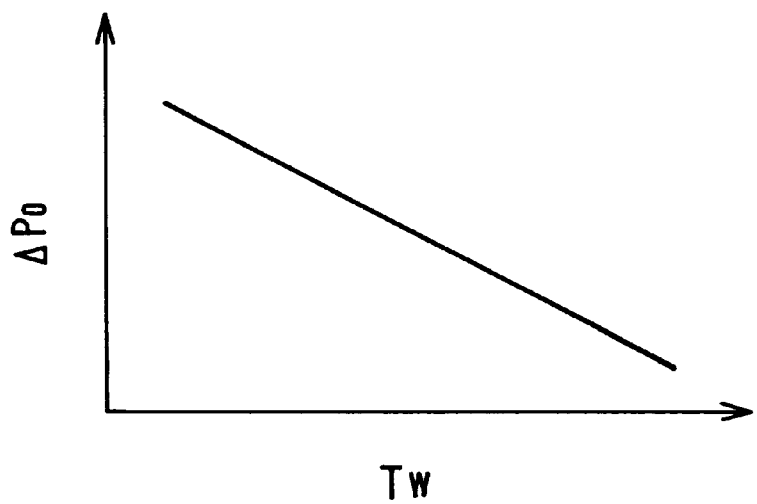
FIG. 28 is a graph showing the relationship between a target pressure difference $\Delta Po$ and a cooling water temperature Tw according to the thirteenth embodiment.
Figure 29:
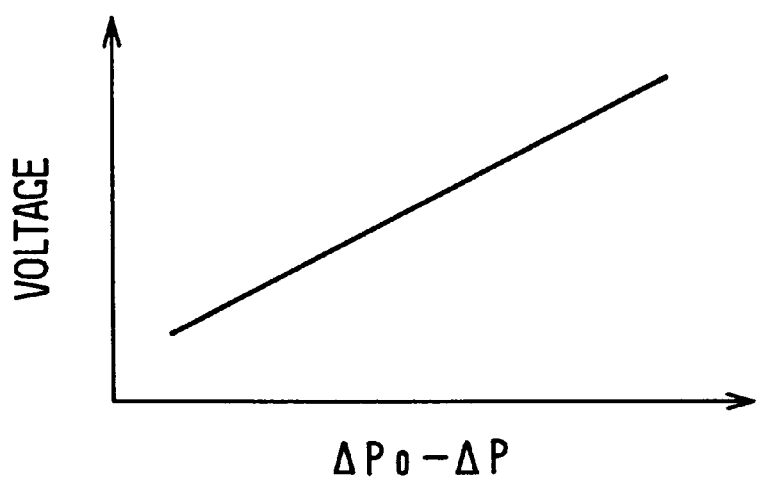
FIG. 29 is a graph showing the relationship between a voltage applied to a blower, and a difference ($\Delta Po - \Delta P$) between the target pressure difference $\Delta Po$ and an actual pressure difference $\Delta P$, according to the thirteenth embodiment.

Next, operation of the heating apparatus of the thirteenth embodiment will be now described based on the flow diagram of FIG. 27. When an ignition switch of the vehicle is turned on, detected values detected by the temperature sensor 21a and the pressure sensors 59, 60 are input at step S500. Next, at step S510, it is determined whether or not the switch (S/W) of the combustor 11 is turned on. When the switch of the combustor 11 is turned off, the program returns to step S500.

On the other hand, when the switch of the combustor 11 is turned on, it is determined whether or not the cooling water temperature Tw is lower than a predetermined temperature To (e.g., 80° C.) at step S520. When the cooling water temperature Tw is equal to or higher than the predetermined temperature To, the operation of the combustor 11 is stopped at step S570, and the program returns to step S500. When the cooling water temperature Tw is lower than the predetermined temperature To, a target pressure difference ΔPo corresponding to the cooling water temperature Tw is calculated based on the graph of FIG. 28 pre-stored in a ROM of the ECU 21 at step S530. The target pressure difference ΔPo is a target difference between the intake pressure and the discharge pressure of the combustor 11. That is, the target pressure difference ΔPo shows a target air amount supplying to the combustor 11 according to the operation state of the combustor 11.

Next, at step S540, an actual pressure difference ΔP between the intake pressure and the exhaust pressure of the combustor 11 is calculated based on the pressures detected by the pressure sensor 59, 60. At step S550, a voltage applied to the blower 19, corresponding to a difference (ΔPo−ΔP) between the target pressure difference ΔPo and the actual pressure difference ΔP, is calculated based on the graph of FIG. 29 pre-stored in the ROM of the ECU 21. Thereafter, the combustor 11 is operated at step S560.

According to the thirteenth embodiment of the present invention, the blower 19 is controlled so that the actual pressure difference ΔP becomes equal to the target pressure difference ΔPo. Therefore, a target air amount is supplied to the combustor 11, so that the combustor 11 can be stably burned. Thus, the passenger compartment of the vehicle can be heated stably.

In the above-described thirteenth embodiment, the present invention is applied to a vehicle only having the engine 1; however, may be applied to a hybrid vehicle travelled by the engine 1 and an electrical motor. Further, in the above-described thirteenth embodiment, the operation state of the combustor 11 is determined based on the cooling water temperature Tw. However, in an automatic air conditioner, the operation state of the combustor 11 can be determined based on the other condition such as a target air temperature.

Figure 30:
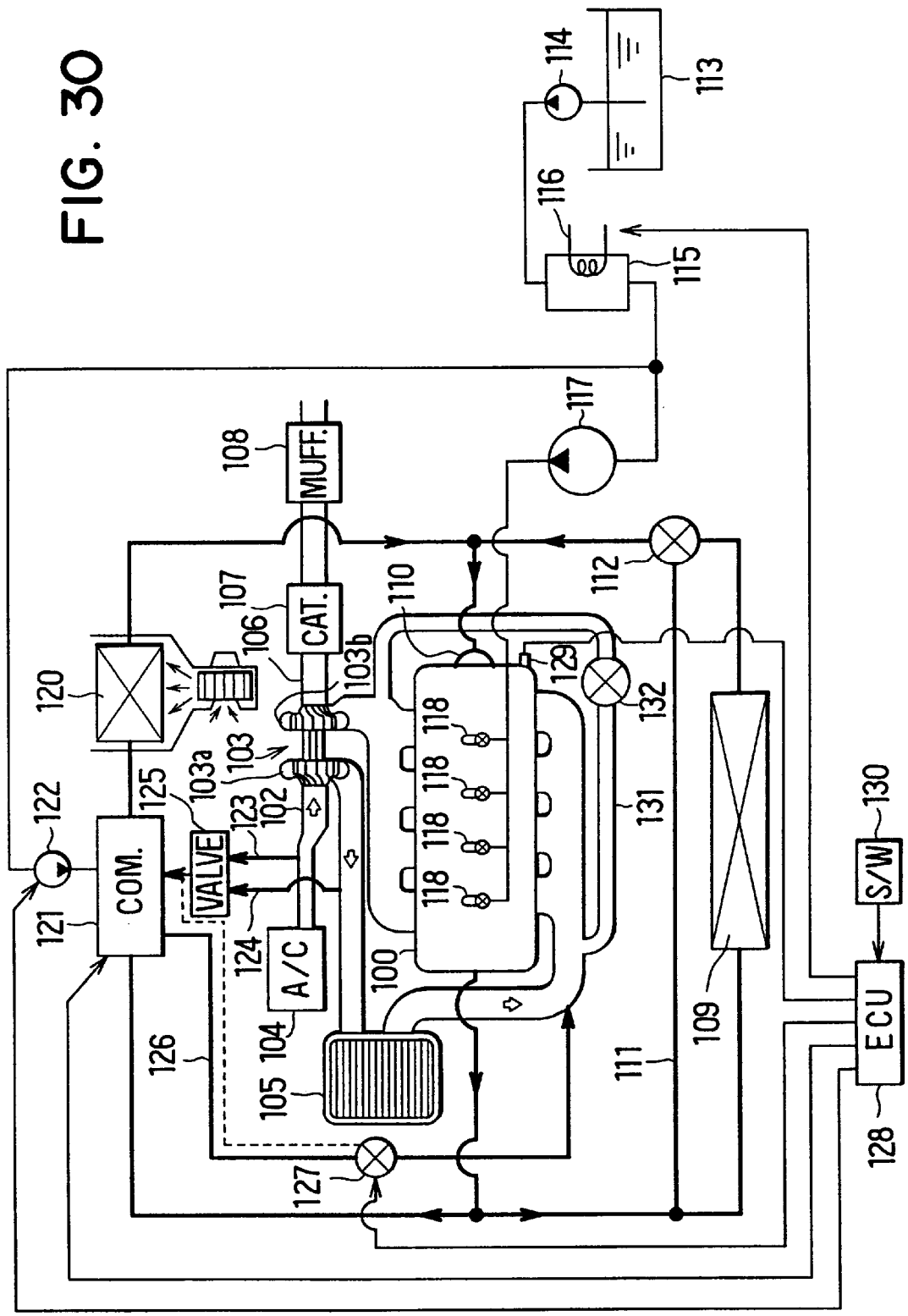
FIG. 30 is a schematic diagram showing a heating apparatus for a vehicle according to a fourteenth preferred embodiment of the present invention.

A fourteenth preferred embodiment of the present invention will be now described with reference to FIGS. 30–32. In the fourteenth embodiment, a heating apparatus of the present invention is applied to a liquid-cooled internal combustion engine (e.g., a water-cooled diesel engine) 100. A supercharger 103 for supercharging air introduced into the engine 100 is disposed in an intake pipe 102 through which air is introduced into the engine 100. In the fourteenth embodiment, the supercharger 103 is a turboblower type which supercharges intake air using energy of exhaust gas of the engine 100.

An air cleaner 104 for removing dust contained in intake air is disposed in the intake pipe 102 at an upstream air side of the supercharger 103 in an intake air flow direction. Further, an inter cooler 105 for cooling air is disposed at a downstream side of the supercharger 103 in the intake air flow direction. Intake air is cooled in the inter cooler 105 so that charging effect of intake air is improved.

Exhaust gas from the engine 1 flows through an exhaust pipe 106. In the exhaust pipe 106 at a downstream side of a compression wheel (turbowheel) 103b of the supercharger 103 in an exhaust gas flow direction, there is provided three way catalyst 107 catalyzing oxidation-reduction reaction of hydrocarbon or nitrogen oxide in the exhaust gas, and a muffler (silencer) 108 for reducing noise of exhaust gas flowing from the catalyst 107.

Cooling water for cooling the engine 100 flows through a radiator 109, and is cooled in the radiator 109. Cooling water is pumped to be circulated in the cooling water circuit of the heating apparatus by a water pump 110 driven by the engine 100. Cooling water flowing from the engine 100 returns to the engine 100 through a bypass passage 111 while bypassing the radiator 109. Cooling water flowing into the radiator 109 and cooling water flowing through the bypass passage 111 are switched by a thermostat 112. The water pump 110 and the bypass passage 111 are generally provided within the engine 100.

Fuel (oil) of the engine 100 is stored in a fuel tank 113. Fuel stored in the fuel tank 113 is discharged toward a side of the engine 100 by a fuel pump 114. Fuel is filtered in a fuel filter 115 so that dust contained in fuel is removed. A fuel heater 116 for heating fuel is disposed within the fuel filter 115. The fuel hater 116 is an electrical heater which generates heat by electrical power supplied from a battery mounted on the vehicle.

Fuel within the fuel filter 115 is sucked and a pressure of the sucked fuel is increased by a high pressure pump 117. A fuel injector 118 for injecting fuel is disposed each cylinder of the engine 100. The high pressure pump 117 and the fuel injector 118 are controlled based on an electronic control unit of the engine 110.

Air blown into a passenger compartment of the vehicle is heated in a heater core 120 by using cooling water as a heating source. Cooling water flowing into the heater core 120 can be heated by a combustor 121. Fuel is burned in a combustion chamber within the combustor 121 so that cooling water is heated in the combustor 121. Fuel cleaned in the fuel filter 115 is supplied to the combustor 121 by a fuel pump 122. The fuel pump 122 is controlled by an electronic control unit (ECU) 128 for the combustor 122.

Air cleaned in the air cleaner 104 is introduced into an intake side of the combustor 121 through first and second intake pipe portions 123, 124 of the combustor 121. The first intake pipe portion 123 is connected to the intake pipe 102 at an upstream side of a compressor wheel 103a of the supercharger 103, and the second intake pipe portion 124 is connected to the intake pipe 102 at a downstream side of the supercharger 103.

A director valve 125 is disposed so that a communication of the combustor 121 relative to both first and second intake pipe portions 123, 124 is switched by the director valve 125. A pressure of the intake pipe 102 at an upstream side of the compressor wheel 103a of the supercharger 103 and a pressure of the intake pipe 102 at a downstream side of the compressor wheel 103a of the supercharger 103 are compared, and intake air having a higher pressure in the comparison is introduced into the combustor 122 by the director valve 125. That is, the pressure of the intake pipe 102 at a position where the first intake pipe portion 123 is connected and the pressure of the intake pipe 102 at a position where the second intake pipe portion 124 is connected are compared, and any intake air having a higher pressure is introduced into the combustor 121 by the director valve 125. In the fourteenth embodiment, the director valve 125 is a mechanical type valve for switching communication states of both intake pipe portions 123, 124 based on pressures within the first and second intake pipe portions 123, 124.

Exhaust gas of the combustor 121 is introduced into the intake pipe 102 at a downstream side of the inter cooler 105 in the intake air flow direction through an exhaust pipe 126. A throttle valve 127 for adjusting an opening degree of the exhaust pipe 126 of the combustor 121 is disposed in the exhaust pipe 126 of the combustor 121.

The combustor 121, the fuel pump 122, the director valve 125 and the fuel heater 116 are controlled by the ECU 128. Signal from a water temperature sensor 129 for detecting temperature of cooling water within the engine 100, and on/off signal from a starting switch 130 which is manually operated by a passenger to switch operation of the combustor 121 are input into the ECU 128.

Exhaust gas of the engine 100 is introduced into the intake pipe 102 through a communication pipe 131 (i.e., EGR pipe), and the communication pipe 131 is opened and closed by a EGR valve 132. Exhaust gas of the engine 100 is returned to the intake pipe 102 through the communication pipe 131 so that nitrogen oxide in the exhaust gas of the engine 100 is reduced.

The EGR valve 132 is controlled by the electronic control unit of the engine 100 based on cooling water temperature Tw detected by the water temperature sensor 129. That is, the EGR valve 132 is closed when the cooling water temperature Tw detected by the water temperature sensor 129 is lower than a predetermined temperature, and is opened when the cooling water temperature Tw detected by the water temperature sensor 129 is equal to or higher than the predetermined temperature.

Next, operation of the heating apparatus for the vehicle according to the fourteenth embodiment of the present invention will be now described with reference to the flow diagram of FIG. 31.

When the engine 100 is operated, it is determined whether or not the cooling water temperature Tw input into the ECU 128 is lower than a first predetermined temperature Tw1 (e.g., approximately 85° C.) at step S600. When the cooling water temperature Tw detected by the water temperature sensor 129 is equal to or higher than the first predetermined temperature Tw1, it is not necessary to operate (ignite) the combustor 121, and the combustor 121 is turned off so that the operation of the combustor 121 is stopped. In this case, when the combustor 121 has been stopped, the stopped state of the combustor 121 is maintained.

On the other hand, when the cooling water temperature Tw is lower than the first predetermined temperature Tw1, it is determined whether or not the starting switch (S/W) 130 for staring the operation of the combustor 121 is turned on at step S620. When the starting switch 130 is turned on, the combustor 121 is operated (ignited) at step S630. In this case, when the combustor 121 has been operated, the operation state of the combustor 121 is maintained.

Further, when the starting switch 130 is not turned on at step S620, the water temperature Tw is detected again by the water temperature sensor 129, and it is determined whether or not the cooling water temperature Tw is lower than a second predetermined temperature Tw2 (e.g., approximately 50° C.) lower than the first predetermined temperature Tw1 at step S645. When the water temperature Tw is lower than the second predetermined temperature, the combustor 121 is operated at step S630. When the cooling water temperature Tw is equal to or larger than the second predetermined temperature Tw2 at step S645, the operation of the combustor 121 is stopped at step S610.

When the starting switch 130 is turned on at step S620, the combustor 121 is operated at step S630. Thereafter, it is determined again whether or not the starting switch 130 of the combustor 121 is turned on at step S640. When the starting switch 130 of the combustor 121 is turned on at step S640, it is determined again whether or not the cooling water temperature Tw is higher than the first predetermined temperature Tw1. When the cooling water temperature Tw is higher than the first predetermined temperature Tw1 at step S650, the combustor 121 is stopped at step S610. On the other hand, when the cooling water temperature Tw is equal to or lower than the first predetermined temperature Tw1 at step S650, the combustor 121 is turned on at step S630.

When the starting switch 130 of the combustor 121 is not turned on at step S640, it is determined again whether or not the cooling water temperature Tw is higher than the second predetermined temperature Tw2. When the cooling water temperature Tw is higher than the second predetermined temperature Tw1 at step S660, the combustor 121 is stopped at step S610. On the other hand, when the cooling water temperature Tw is equal to or lower than the second predetermined temperature Tw2 at step S660, the combustor 121 is turned on at step S630.

When the engine 100 operates, air (intake air) within the intake pipe 102 flows toward the combustion chamber of the engine 100, and exhaust gas of the engine 100 is discharged into the exhaust pipe 106. In this case, when the rotation speed of the engine 100 is low, exhaust energy of the engine 100 is small, the compressor wheel 103b of the supercharger 103 is not operated, and intake air is not charged (compressed) by the compressor wheel 103a of the supercharger 103. Therefore, the supercharger 103 becomes in a resistance of intake air flow. Thus, the pressure of the intake pipe 102 at the upstream side of the compressor wheel 103a of the supercharger 103 in the intake air flow direction becomes higher than the pressure of the intake pipe 102 at the downstream side of the compressor wheel 103a of the supercharger 103 in the intake air flow direction, and a pressure difference is generated between an inlet side and an outlet side of the compressor wheel 103a of the supercharger 103. As a result, when the rotation speed of the engine 1 is low, the director valve 125 is switched so that air introduced into the combustor 121 from the first intake pipe portion 123.

The exhaust pipe 126 of the combustor 121 is connected to the intake pipe 102 at a downstream side of the compressor wheel 103a of the supercharger 103 and the inter cooler 105. Therefore, due to pressure loss generated in the compressor wheel 103a of the supercharger 103 and the inter cooler 105, a pressure difference is generated between the intake side of the combustor 121 and the exhaust side of the combustor 121, and a part of intake air within the intake pipe 102 flows into the combustor 121.

When the rotation speed of the engine 100 is high, exhaust energy of the engine 106 becomes larger, a compressor wheel 103b of the supercharger 103 is operated to be rotated, and intake air is charged (compressed) by the compressor wheel 103a of the supercharger 103. Therefore, the pressure of the intake pipe 102 at the downstream side of the compressor wheel 103a of the supercharger 103 in the intake air flow direction becomes higher than the pressure of the intake pipe 102 at the upstream side of the compressor wheel 103a of the supercharger 103 in the intake air flow direction. Thus, intake air compressed by the supercharger 103 is supplied to the combustor 121 through the second intake pipe portion 124.

Exhaust gas of the combustor 121 is sucked into the engine 100 together with the intake air to be burned (exploded). Therefore, fuel injection is need to be controlled by the electronic control unit of the engine 100 according to oxygen concentration in intake air. However, according to the fourteenth embodiment of the present invention, the air amount blown toward the combustor 121 is determined by the pressure difference between the intake side and the exhaust side of the combustor 121. Therefore, by adjusting the opening degree (i.e., throttle state) of the throttle valve 127, the air amount supplying to the combustor 121 is controlled to correspond to fuel amount supplied to the combustor 121 from the fuel pump 122.

Figure 32A:
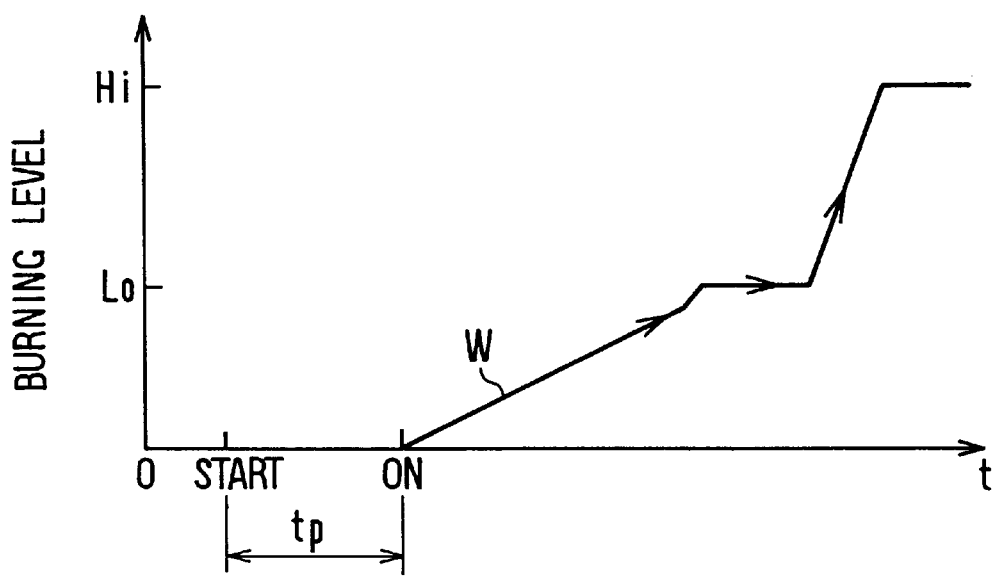
FIG. 32A is a graph showing a change of an air amount (W) supplying to a combustor of the heating apparatus when a burning level of the combustor is increased according to the fourteenth embodiment.

FIG. 32A shows an air amount (W) supplying into the combustor 121 when burning state (i.e., burning level) of the combustor 21 is changed from a stop state to a maximum burning state (level). The air amount (W) supplying to the combustor 121 is changed by adjusting the opening degree of the throttle valve 127. During the maximum burning level of the combustor 121, the maximum heating capacity of the combustor 121 can be provided. Air amount W supplying to the combustor 121 is increased as the opening degree of the throttle valve 127 increases, and the burning level of the combustor 121 is also increased as the air amount W supplying to the combustor 121 increases. As shown in FIG. 32A, until a predetermined pre-heating time "tp" (20 seconds) passes from a point where a staring signal for operating the combustor 121 is sent, the throttle valve 127 is closed so that air is not supplied into the combustor 121. During the predetermined pre-heating time "tp", a glow plug (not shown) is turned on, and the combustor 121 is preparatively heated. The turning-on time of the glow plug is the pre-heating time.

After the pre-heating time "tp" passes, the opening degree of the throttle valve 127 is increased so that air amount W blown into the combustor 121 is increased, and burning level of the combustor 121 is also increased. An air amount changing ratio ($\Delta W/\Delta t$) of the air amount W to a time from the stopping state to a burning level Lo is set to be smaller than an air amount changing ratio ($\Delta w/\Delta t$) of the air amount W to a time from the burning level Lo to a burning level Hi. On the other hand, when the burning level of the combustor 121 is decreased from the burning level Hi to the burning level Lo, the air amount W supplying to the combustor 121 is suddenly reduced.

Here, the operation of the fuel heater 116 will be now described. When the combustor 121 is in the pre-heating state, that is, when the glow plug is turned on, the fuel heater 116 heats fuel to be supplied to the combustor 121. When pressure at the intake side of the fuel pump 114 is lower than a predetermined pressure (e.g., atmospheric pressure) when the combustor 121 is stopped, it is determined that the fuel is solidified, and the fuel heater 116 is turned on so that fuel is melted.

According to the fourteenth embodiment of the present invention, when the supercharger 103 is operated, that is, when the rotational speed of the engine 100 is high, air pressed by the supercharger 103 is introduced into the intake side of the combustor 121. Therefore, it is not necessary to have a volume type blower for blowing air into the combustor 121, disposed at the intake side of the combustor 121.

Further, when the supercharger 103 is not operated, that is, when the rotational speed of the engine 100 is low, air is supplied to the combustor 121 by using the pressure difference between the first intake pipe portion 123 and the exhaust pipe 126 of the combustor 121. Therefore, similarly to the case where the supercharger 103 is operated, it is not necessary to have a volume type blower for blowing air into the combustor 121, disposed at the intake side of the combustor 121. Thus, a blower for the combustor 121 can be omitted, components of the heating apparatus of the vehicle can be reduced, and the heating apparatus is produced in low cost.

In a vehicle having a diesel engine, fuel is generally solidified when temperature of outside air is low in the winter. Therefore, to supply fuel to the diesel engine in the winter, a fuel heater is provided in standard. In the fourteenth embodiment of the present invention, because fuel supplying to the combustor 121 is heated by the fuel heater 116 provided in standard in the vehicle, fuel supplying to the combustor 121 can be heated without an additional fuel heater. Thus, ignition performance of the combustor 121 can be improved while the heating apparatus of the vehicle is produced in low cost.

Further, according to the fourteenth embodiment of the present invention, when the engine 100 is operated, the combustor 121 is operated until the second predetermined temperature Tw2 where the EGR valve 132 is opened, thereby quickly increasing the cooling water temperature. Thus, the EGR valve 132 can be early opened so that exhaust gas circulates. As a result, the heating operation of the engine 100 can be facilitated, and nitrogen oxide contained in the exhaust gas of the engine 100 can be sufficiently reduced.

Figure 33:
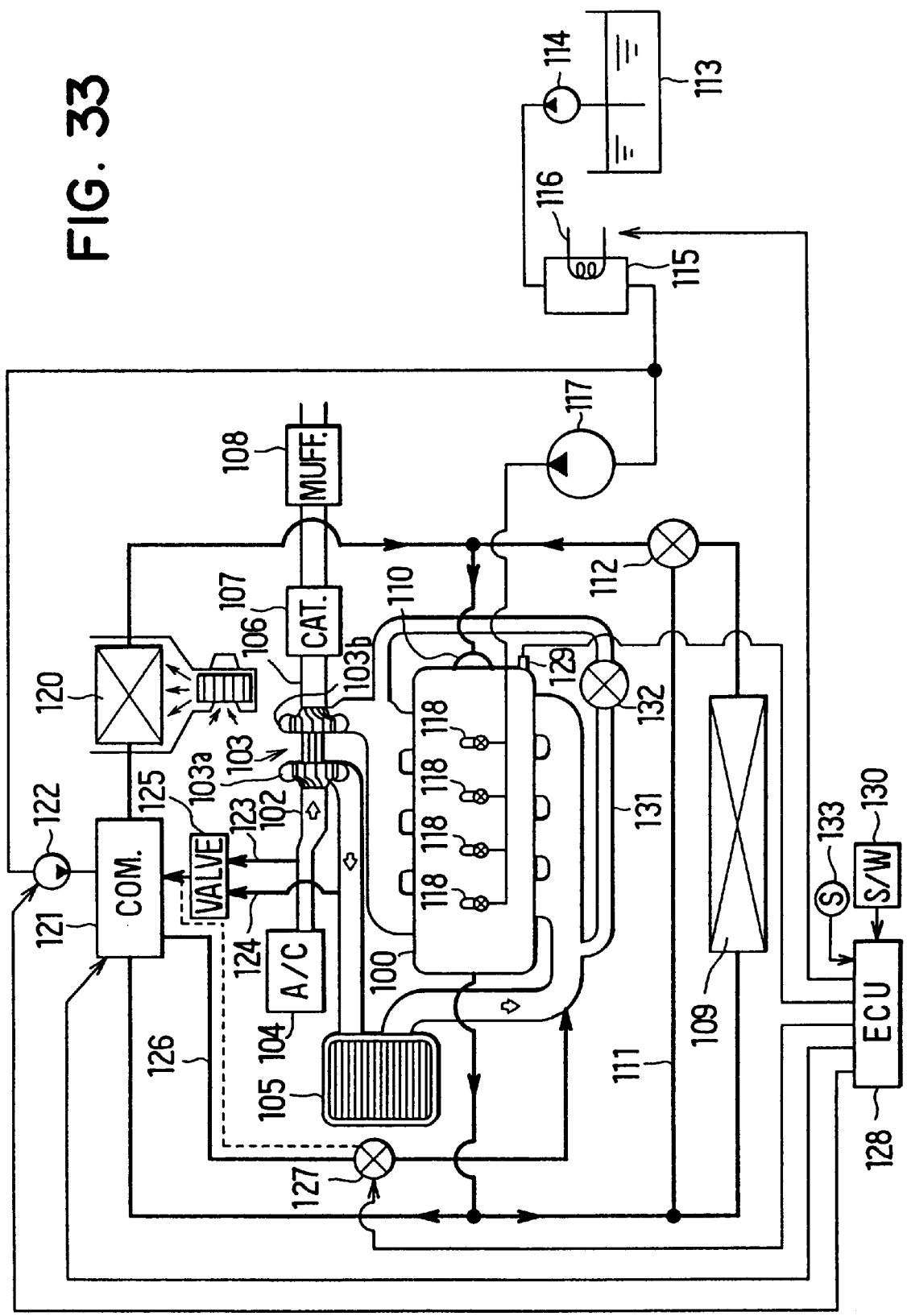
FIG. 33 is a schematic diagram showing a heating apparatus for a vehicle according to a fifteenth preferred embodiment of the present invention.
Figure 34:
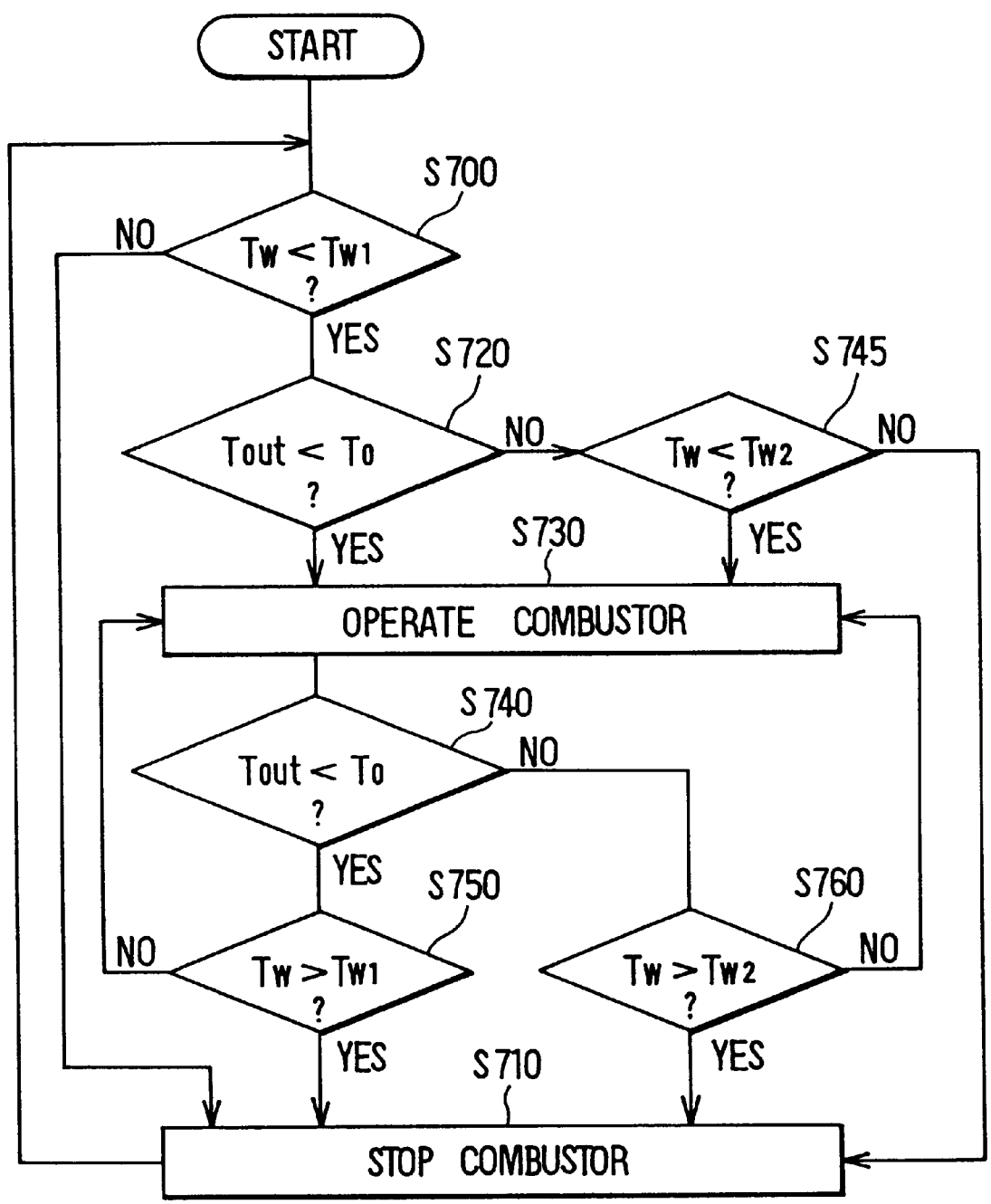
FIG. 34 is a flow diagram showing a control of an electronic control unit (ECU) of the heating apparatus according to the fifteenth embodiment.

A fifteenth preferred embodiment of the present invention will be now described with reference to FIGS. 33, 34. In the above-described fourteenth embodiment of the present invention, it is determined whether or not the combustor 121 is operated based on the on/off state of the starting switch 130 of the combustor 121, at step S620 and step S640. In the fifteenth embodiment, as shown in FIG. 33, an outside air temperature sensor 133 for detecting temperature Tout of outside air is provided, and it is determined whether or not the combustor 121 is operated based on the temperature Tout of outside air detected by the outside air temperature sensor 133.

Next, on/off operation of the combustor 121 according to the fifteenth embodiment of the present invention will be now described with reference to FIG. 34. When the engine 100 is operated, it is determined whether or not the cooling water temperature Tw input into the ECU 128 is lower than a first predetermined temperature Tw1 (e.g., 80° C.) at step S700. When the cooling water temperature Tw detected by the water temperature sensor 129 is equal to or higher than the first predetermined temperature Tw1, it is not necessary to operate (ignite) the combustor 121, and the combustor 121 is turned off so that the operation of the combustor 121 is stopped at step S710. In this case, when the combustor 121 has been stopped, the stopped state of the combustor 121 is maintained.

On the other hand, when the cooling water temperature Tw is lower than the first predetermined temperature Tw1, it is determined whether or not the outside air temperature Tout is lower than a predetermined temperature To at step S720. When the outside air temperature Tout is lower than the predetermined temperature To, the combustor 121 is operated (ignited) at step S730. In this case, when the combustor 121 has been operated, the operation state of the combustor 121 is maintained.

Further, when the outside air temperature To is equal to or higher than the predetermined temperature To at step S720, the water temperature Tw is detected again by the water temperature sensor 129, and it is determined whether or not the cooling water temperature Tw is lower than a second predetermined temperature Tw2 lower than the first predetermined temperature Tw1 at step S745. When the water temperature Tw is lower than the second predetermined temperature Tw2, the combustor 121 is operated at step S730. When the cooling water temperature Tw is equal to or higher than the second predetermined temperature Tw2 at step S745, the operation of the combustor 121 is stopped at step S710.

After the combustor 121 is operated at step S730, it is determined again whether or not the outside air temperature Tout is lower than the predetermined temperature To at step S740. When the outside air temperature Tout is lower than the predetermined temperature at step S740, it is determined again whether or not the cooling water temperature Tw is higher than the first predetermined temperature Tw1. When the cooling water temperature Tw is higher than the first predetermined temperature Tw1 at step S750, the combustor 121 is stopped at step S710. On the other hand, when the cooling water temperature Tw is lower than the first predetermined temperature Tw1 at step S750, the combustor 121 is turned on at step S730.

When the outside air temperature Tout is not lower than the predetermined temperature To at step S740, it is determined again whether or not the cooling water temperature Tw is higher than the second predetermined temperature Tw2 at step S760. When the cooling water temperature Tw is higher than the second predetermined temperature Tw2 at step S760, the combustor 121 is stopped at step S710. On the other hand, when the cooling water temperature Tw is lower than the second predetermined temperature Tw2 at step S760, the combustor 121 is turned on at step S730.

In the fifteenth embodiment of the present invention, the other components are similar to those in the fourteenth embodiment, and the explanation thereof is omitted. Therefore, in the fifteenth embodiment, the effect similar to that of the fourteenth embodiment can be provided.

In the above-described fourteenth and fifteenth embodiments of the present invention, the supercharger 103 is the turboblower type operated by the energy of exhaust gas of the engine 100. However, the supercharger 103 may be a supercharging machine in which intake air is charged directly by driving force of a crank shaft of the engine 100.

A sixteenth preferred embodiment of the present invention will be now described with reference to FIGS. 35–36B. In the sixteenth embodiment of the present invention, components similar to those in the above-described fourteenth and fifteenth embodiments are indicated with the same reference numbers and the explanation thereof is omitted.

Figure 35:
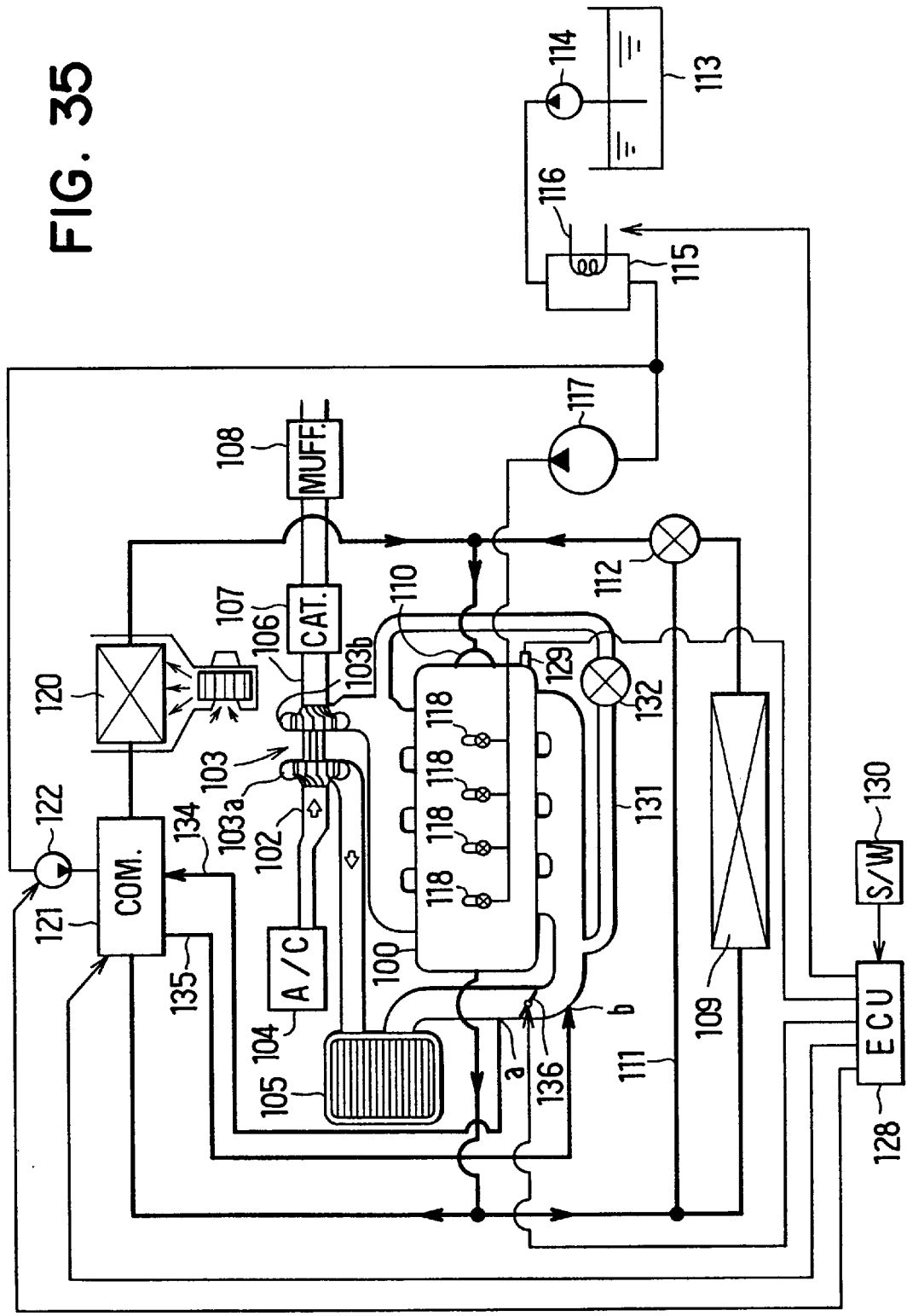
FIG. 35 is a schematic diagram showing a heating apparatus for a vehicle according to a sixteenth preferred embodiment of the present invention.

In the sixteenth embodiment, as shown in FIG. 35, a throttle valve 136 for generating a predetermined pressure loss relative to intake air is disposed within the intake pipe 102. In the sixteenth embodiment, the director valve 125 of the fourteenth embodiment is not provided. As shown in FIG. 35, instead of the first and second intake pipe portions 123, 124, an intake pipe 134 for introducing a part of intake air into the combustor 121 is connected to the intake pipe 102 at a position "a" on an upstream side of the throttle valve 136 in the intake air flow direction. On the other hand, an exhaust pipe 135 for introducing exhaust gas of the combustor 121 into the intake pipe 102 is connected to the intake pipe 102 at a position "b" on the downstream side of the throttle valve 136 in the intake air flow direction. An amount of air supplying to the combustor 121 is adjusted by adjusting an opening degree of the throttle valve 136.

The ECU 128 controls operations of the combustor 121, the fuel pump 122, the throttle valve 136, and the fuel heater 116. Signals from the water temperature sensor 129, and manually operated on/off signal of the starting switch 130 of the combustor 121 are input into the ECU 128.

Exhaust gas of the engine 100 is circulated to the intake pipe 102 through the communication pipe 131 (i.e., EGR pipe), and the communication pipe 131 is opened and closed by the EGR valve 132. Exhaust gas of the engine 100 is returned to the intake pipe 102 through the communication pipe 131 so that nitrogen oxide in the exhaust gas of the engine 100 is reduced.

The EGR valve 132 is controlled by the electronic control unit of the engine 100 based on cooling water temperature Tw detected by the water temperature sensor 129. That is, the EGR valve 132 is closed when the cooling water temperature Tw detected by the water temperature sensor 129 is lower than a predetermined temperature, and is opened when the cooling water temperature Tw detected by the water temperature sensor 129 is equal to or higher than the predetermined temperature.

Next, operation of the heating apparatus for the vehicle according to the sixteenth embodiment of the present invention will be now described.

Figure 31:
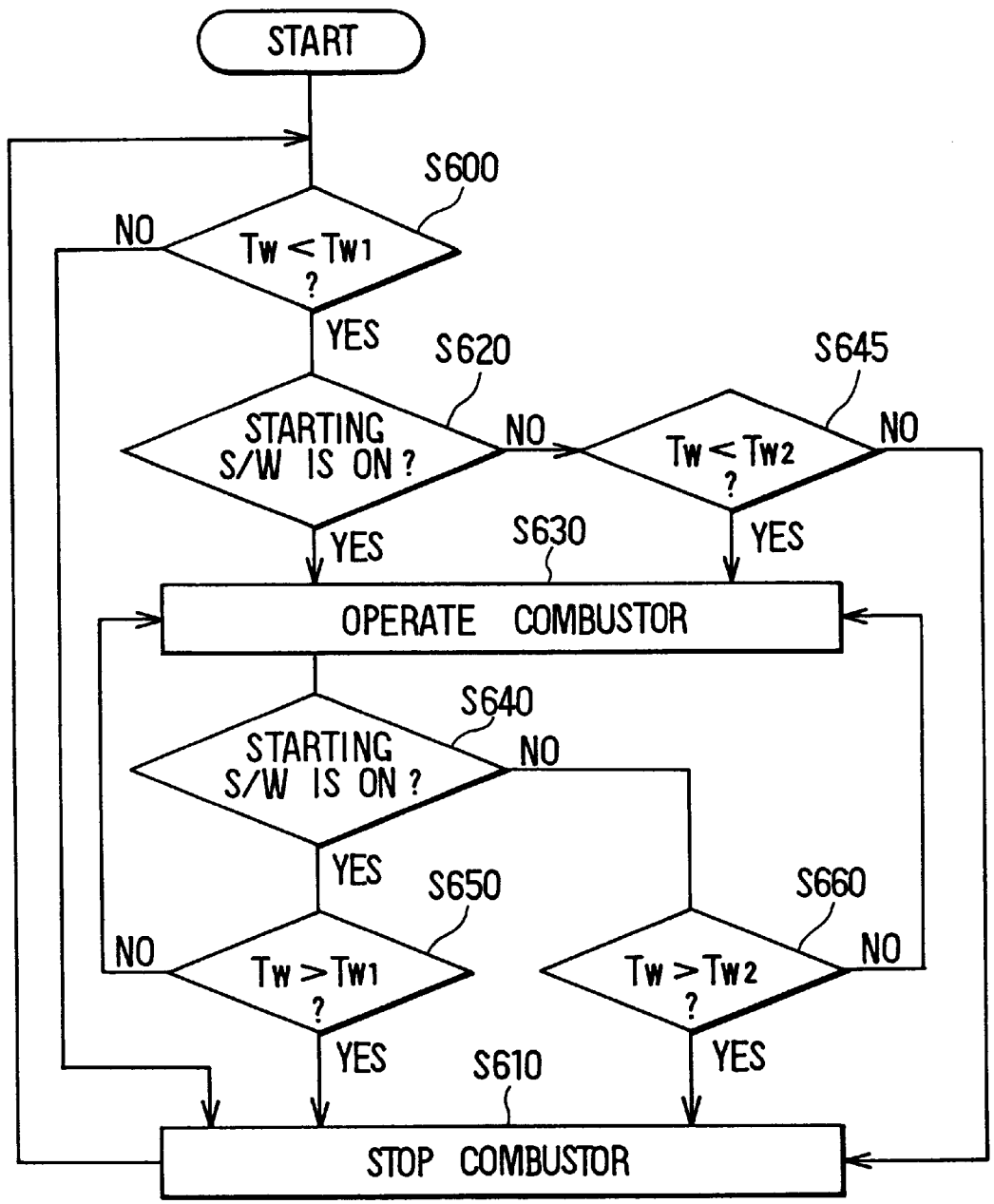
FIG. 31 is a flow diagram showing a control of an electronic control unit (ECU) of the heating apparatus according to the fourteenth embodiment.
Figure 32B:
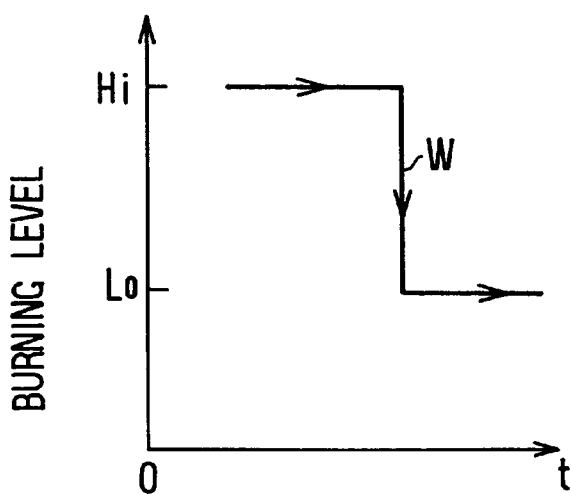
FIG. 32B is a graph showing a change of the air amount (W) supplying to the combustor of the heating apparatus when the burning level of the combustor is decreased according to the fourteenth embodiment.

The on/off operation of the combustor 121 is similar to the flow diagram of FIG. 31 in the above-described fourteenth embodiment of the present invention, and the explanation thereof is omitted. Here, the operation control of the combustor 121 will be mainly described. When the engine 100 operates, air (intake air) within the intake pipe 102 flows toward the combustion chamber of the engine 100, exhaust gas of the engine 100 is discharged into the exhaust pipe 106. The opening degree of the intake pipe 102 is reduced by the throttle valve 136 so that pressure loss is generated in the intake pipe 102. Therefore, pressure in the intake pipe 102 at an upstream side of the throttle valve 136 becomes higher than pressure in the intake pipe 102 at a downstream side of the throttle valve 136. Thus, a part of intake air within the intake pipe 102 flows toward the combustor 121.

Exhaust gas of the combustor 121 is sucked into the engine 100 together with the intake air to be burned (exploded) in the engine 100. Therefore, fuel injection is need to be controlled by the electronic control unit of the engine 100 according to oxygen concentration in intake air. However, according to the sixteenth embodiment of the present invention, the air amount supplying to the combustor 121 is determined by the pressure difference between the upstream and downstream sides of the throttle valve 136, that is, by the pressure difference between the position "a" and the position "b" in the intake pipe 102. Therefore, by adjusting the opening degree (i.e., throttle state) of the throttle valve 136, the air amount supplying to the combustor 121 is controlled to correspond to fuel amount supplied to the combustor 121 from the fuel pump 122.

Figure 36A:
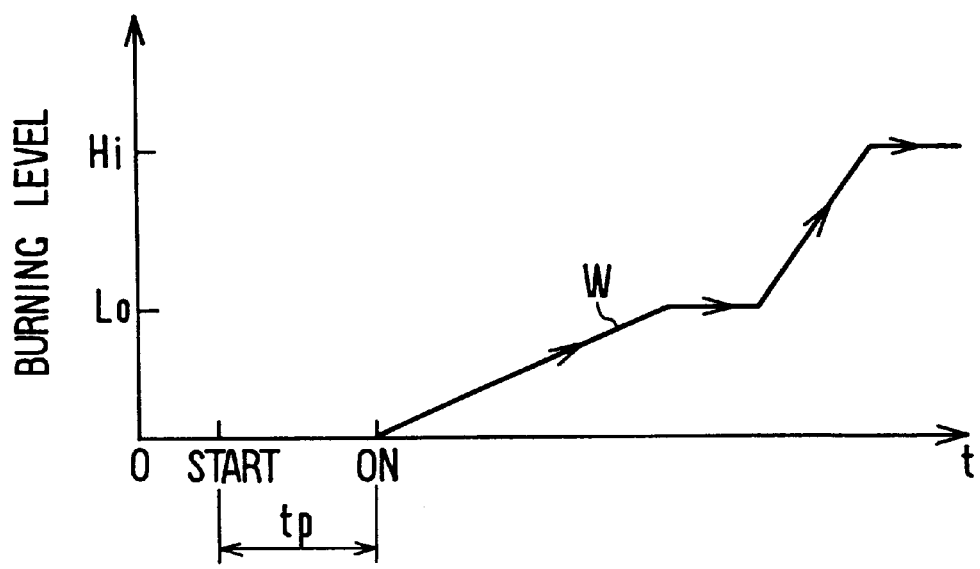
FIG. 36A is a graph showing a change of an air amount (W) supplying to a combustor of the heating apparatus when a burning level of the combustor is increased according to the sixteenth embodiment.
Figure 36B:
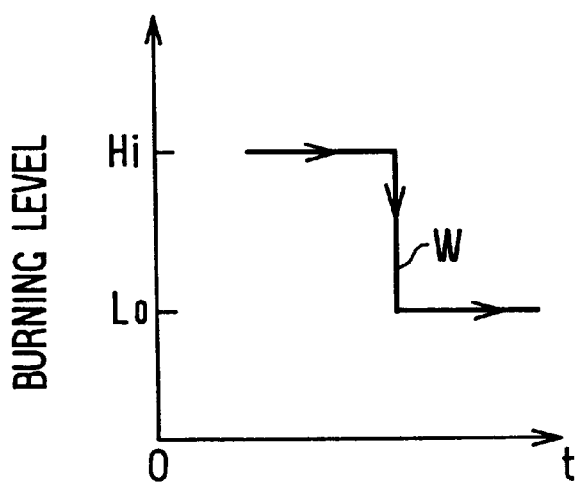
FIG. 36B is a graph showing a change of the air amount (W) supplying to the combustor of the heating apparatus when the burning level of the combustor is decreased according to the sixteenth embodiment.

FIG. 36A shows an air amount (W) to be blown into the combustor 121 when burning level of the combustor 21 is changed from a stop state to a maximum burning state. During the maximum burning state of the combustor 121, the maximum heating capacity of the combustor 121 can be provided. That is, as shown in FIG. 36A, until a predetermined pre-heating time "tp" (20 seconds) passes from a point where a staring signal for operating the combustor 121 is sent, the throttle valve 136 is fully opened, and air supplying toward the combustor 121 is stopped. During the predetermined pre-heating time "tp", the throttle valve 136 is fully opened, and the combustor 121 is preparatively heated by turning-on a glow plug.

After the pre-heating time "tp" passes, the opening degree of the throttle valve 136 is reduced so that air amount W blown into the combustor 121 is increased and the burning level of the combustor 121 is increased. An air amount changing ratio ($\Delta W/\Delta t$) of the air amount W to a time from the stopping state to a burning level Lo of the combustor 121 is set to be smaller than an air amount changing ratio ($\Delta w/\Delta t$) of the air amount W to a time from the burning level Lo to a burning level Hi of the combustor 121. That is, the air amount supplying to the combustor 121 is slowly changed until the burning level Lo of the burning state of the combustor 121, and the air amount supplying to the combustor 121 is quickly changed from the burning level Lo to the burning level Hi of the combustor 121. On the other hand, when the burning level of the combustor 121 is decreased from the burning level Hi to the burning level Lo, the air amount W supplying to the combustor 121 is suddenly reduced. In the sixteenth embodiment, the larger the opening degree of the throttle valve 136 is, the smaller the pressure different is. Therefore, the air amount supplying to the combustor 121 is reduced as the opening degree of the throttle valve 136 increases. On the other hand, the smaller the opening degree of the throttle valve 136 is, the larger the pressure different is. Therefore, the air amount supplying to the combustor 121 is increased as the opening degree of the throttle valve 136 decreases.

Next, the operation of the fuel heater 116 will be now described. When the combustor 121 is in the pre-heating state, that is, when the glow plug is turned on, the fuel heater 116 heats fuel to be supplied to the combustor 121. When pressure at intake side of the fuel pump 114 is lower than a predetermined pressure (e.g., atmospheric pressure) when the combustor 121 is stopped, it is determined that the fuel is solidified, and the fuel heater is turned on so that fuel is melted.

According to the sixteenth embodiment of the present invention, the intake pipe 134 and the exhaust pipe 135 are connected to the position "a" and the position "b" of the intake pipe 102, respectively, and a part of intake air is introduced into the combustor 121 due to the pressure difference between the position "a" and the position "b" of the intake pipe 102. Therefore, it is not necessary to have a volume type blower for blowing air into the combustor 121, disposed at the intake side of the combustor 121. Thus, a blower for the combustor 121 can be omitted, components of the heating apparatus of the vehicle can be reduced, and the heating apparatus is produced in low cost.

In a vehicle having a diesel engine, fuel is generally solidified when temperature of outside air is low in the winter. Therefore, to supply fuel to the diesel engine in the winter, a fuel heater is provided in standard. In the sixteenth embodiment of the present invention, because fuel supplying to the combustor 121 is heated by the fuel heater 116 provided in standard in the vehicle, fuel supplying to the combustor 121 can be heated without an additional fuel heater. Thus, ignition performance of the combustor 121 can be improved while the heating apparatus of the vehicle is produced in low cost.

Further, according to the sixteenth embodiment of the present invention, when the engine 1 is operated, the combustor 121 is operated until the second predetermined temperature Tw2 where the EGR valve 132 is opened similarly to the fourteenth embodiment, thereby quickly increasing the cooling water temperature. Thus, the EGR valve 132 can be early opened so that exhaust gas circulates. As a result, the heating operation of the engine 100 can be facilitated, and nitrogen oxide contained in the exhaust gas can be sufficiently reduced.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A heating apparatus for heating a passenger compartment of a vehicle having a liquid-cooled internal combustion engine which sucks air from an intake pipe, said heating apparatus comprising:

a heat exchanger for heating the passenger compartment by using cooling liquid for cooling the engine as a heating source;

a combustor having a combustion chamber for burning fuel, said combustor being disposed to heat the cooling liquid supplying to said heat exchanger by burning fuel in said combustor; and an exhaust gas circulation unit for introducing exhaust gas of the engine into said combustion chamber of said combustor and thereafter introducing the exhaust gas to the intake pipe of the engine, when operation of said combustor is stopped.

2. A heating apparatus for heating a passenger compartment of a vehicle having a liquid-cooled internal combustion engine which sucks air from an intake pipe and discharges exhaust gas from an exhaust pipe, said heating apparatus comprising:

a heat exchanger for heating the passenger compartment by using cooling liquid for cooling the engine as a heating source;

a combustor having a combustion chamber for burning fuel, said combustor being disposed to heat the cooling liquid supplying to said heat exchanger by burning fuel in said combustor;

a first communication pipe through which the intake pipe of the engine communicates with an intake side of said combustion chamber of said combustor;

a second communication pipe through which the exhaust pipe of the engine communicates with the intake side of said combustion chamber;

a third communication pipe through which the intake pipe of the engine communicates with an exhaust side of said combustion chamber;

a fourth communication pipe through which the exhaust pipe of the engine communicates with said exhaust side of said combustion chamber;

a first switching unit for switching a communication between said intake side of said combustion chamber of said combustor and said first communication pipe, and a communication between said intake side of combustion chamber of said combustor and said second communication pipe; and a second switching unit for switching a communication between said exhaust side of said combustion chamber of said combustor and said third communication pipe, and a communication between said exhaust side of said combustion chamber of said combustor and said fourth communication pipe, wherein:

said first and second switching units are operated in such a manner that said first communication pipe and said fourth communication communicate with said combustor, when said combustor is operated when the engine is stopped, said first and second switching units are operated in such a manner that said first communication pipe and said third communication pipe communicate with said combustor when said combustor is operated when the engine is operated with a rotation speed smaller than a predetermined rotation speed, said first and second switching units are operated in such a manner that said second communication pipe and said fourth communication pipe communicate with said combustor when the engine is operated with a rotation speed larger than the predetermined rotation speed, and said first and second switching units are operated in such a manner that said second communication pipe and said third communication pipe communicate with said combustor when said combustor is stopped when the engine is operated.

3. An exhaust gas circulation system for a vehicle having a heater core which heats air using cooling liquid for cooling an internal combustion engine as a heating source and a combustor which heats the cooling liquid by burning fuel, said exhaust gas circulation system being for reducing nitrogen oxide contained in exhaust gas of the engine, said exhaust gas circulation system comprising:

first means for introducing the exhaust gas into the combustor so that the exhaust gas is heat-exchanged with cooling liquid in said combustor; and second means for returning the exhaust gas having been heat-exchanged with cooling liquid in the combustor to an intake side of the engine.

4. A heating apparatus for heating a passenger compartment of a vehicle having a liquid-cooled internal combustion engine which sucks air from an intake pipe and discharges exhaust gas from an exhaust pipe in which a catalyst for cleaning exhaust gas discharged from the engine is provided, said heating apparatus comprising:

a heat exchanger for heating the passenger compartment by using cooling liquid for cooling the engine as a heating source;

a combustor having a combustion chamber for burning fuel, said combustor being disposed to heat the cooling liquid supplying to said heat exchanger by burning fuel in said combustion chamber; and a switching unit for switching between a case where exhaust gas of the engine is introduced into said combustion chamber of said combustor and a case where air is introduced into said combustion chamber of said combustor, wherein said switching unit is operated in such a manner that air is supplied to said combustor when a rotation speed of the engine is equal to or lower than a predetermined speed, and exhaust gas of the engine is introduced into said combustion chamber of said combustor when the rotation speed of the engine is larger than the predetermined speed.

5. The heating apparatus according to claim 4, further comprising a communication pipe for introducing exhaust gas of said combustor into the catalyst in the exhaust pipe of the engine.

6. The heating apparatus according to claim 5, wherein said switching unit is disposed so that air is introduced into said combustion chamber of said combustor from the intake pipe of the engine when the rotation speed of the engine is equal to or lower than the predetermined speed.

7. A heating apparatus for heating a passenger compartment of a vehicle having a liquid-cooled internal combustion engine which sucks air from an intake pipe and discharges exhaust gas from an exhaust pipe in which a catalyst for cleaning exhaust gas discharged from the engine is provided, said heating apparatus comprising:
- a heat exchanger for heating the passenger compartment by using cooling liquid for cooling the engine as a heating source;
- a combustor having a combustion chamber for burning fuel, said combustor being disposed to heat the cooling liquid supplying to said heat exchanger by burning fuel in said combustion chamber; and
- a switching unit for switching between a case where exhaust gas of the engine is introduced into said combustion chamber of said combustor and a case where air is introduced into said combustion chamber of said combustor,
- wherein said switching unit is operated in such a manner that air is supplied to said combustor when a temperature of exhaust gas of the engine is equal to or lower than a predetermined temperature, and exhaust gas of the engine is introduced into said combustion chamber of said combustor when the temperature of exhaust gas of the engine is higher than the predetermined temperature.

8. The heating apparatus according to claim 7, further comprising
- a communication pipe for introducing exhaust gas of said combustor into the catalyst in the exhaust pipe of the engine.

9. A heating apparatus for heating a passenger compartment of a vehicle having an internal combustion engine which sucks air from an intake pipe and discharges exhaust gas from an exhaust pipe, said heating apparatus comprising:
- a combustor for heating the passenger compartment by burning fuel;
- a switching unit for switching between a case where exhaust gas of said combustor is introduced into the intake pipe of the engine and a case where exhaust gas of said combustor is introduced into the exhaust pipe of the engine; and
- a control unit for controlling said switching unit,
- wherein said control unit has determining means for determining whether exhaust gas of said combustor is introduced into the intake pipe of the engine or into the exhaust pipe of the engine.

10. The heating apparatus according to claim 9, wherein when said combustor is operated when the engine is stopped, said control unit controls said switching unit in such a manner that exhaust gas of said combustor is introduced into the intake pipe of the engine until a predetermined time passes after said combustor starts operating, and is introduced into the exhaust pipe of the engine after the predetermined time is passed after said combustor starts operating.

11. The heating apparatus according to claim 10, wherein:
said control unit includes an outside air temperature sensor for detecting temperature of outside air outside the vehicle; and
said control unit sets the predetermined time to be shorter according to an increase of the temperature of outside air.

12. The heating apparatus according to claim 9, wherein:
said control unit includes an oxygen concentration detector for detecting oxygen concentration contained in exhaust gas of said combustor; and
when said combustor is operated when the engine is stopped, said control unit controls said switching unit in such a manner that exhaust gas of said combustor is introduced into the intake pipe of the engine when oxygen concentration detected by said oxygen concentration detector is equal to or larger than a predetermined oxygen concentration, and is introduced into the exhaust pipe of the engine when oxygen concentration detected by said oxygen concentration detector is smaller than the predetermined oxygen concentration.

13. The heating apparatus according to claim 9, wherein:
said control unit includes a burning temperature sensor for detecting a burning temperature of said combustor; and
when said combustor is operated when the engine is stopped, said control unit controls said switching unit in such a manner that exhaust gas of said combustor is introduced into the intake pipe of the engine when the burning temperature detected by said burning temperature sensor is lower than a predetermined temperature, and is introduced into the exhaust pipe of the engine when the burning temperature detected by said burning temperature sensor is equal to or higher than the predetermined temperature.

14. A heating apparatus for heating a passenger compartment of a vehicle having an internal combustion engine which sucks air from an intake pipe and discharges exhaust gas from an exhaust pipe, said heating apparatus comprising:
- a heating unit for heating the passenger compartment by heat generated from the engine;
- a combustor for heating the passenger compartment by burning fuel;
- a first communication pipe through which the exhaust pipe of the engine communicates with the intake pipe of the engine;
- a switching valve disposed in said first communication pipe, for opening and closing said first communication pipe;
- a second communication pipe through which an exhaust side of said combustor communicates with said first communication pipe at a position between said switching valve and the exhaust pipe; and
- a check valve disposed in said second communication pipe, for preventing exhaust gas of the engine from flowing into the exhaust side of said combustor through said second communication pipe,
- wherein said switching valve opens said first communication pipe when the engine is operated when said combustor operates.

15. The heating apparatus according to claim 14, wherein:
said heating unit heats air to be blown into the passenger compartment by using cooling liquid for cooling the engine as a heating source; and
said combustor is disposed to heat the cooling liquid flowing into the heating unit.

16. The heating apparatus according to claim 14, further comprising
- a throttle valve, disposed in the intake pipe of the engine, for generating a flow resistance of intake air; and
- a third communication pipe through which intake air in the intake pipe is introduced into said combustor,
- wherein said third communication pipe is connected to the intake pipe at an upstream side of said throttle valve in a flow direction of intake air.

17. The heating apparatus according to claim 14, wherein said switching valve closes said first communication pipe when the engine is stopped when said combustor operates.

18. A heating apparatus for heating a passenger compartment of a vehicle having an internal combustion engine which sucks air from an intake pipe and discharges exhaust gas to the atmosphere through an exhaust pipe, said heating apparatus comprising:
- a heating unit for heating the passenger compartment by using heat generated from the engine;
- a combustor for heating the passenger compartment by burning fuel; and
- a control unit for controlling operation of said combustor, wherein exhaust gas of said combustor is introduced into the exhaust pipe of the engine when the engine is stopped, and is introduced into the intake pipe of the engine when the engine is operated.

19. The heating apparatus according to claim 18, further comprising:
- a first communication pipe through which exhaust gas of said combustor is introduced into the exhaust pipe of the engine;
- a second communication pipe through which exhaust gas of said combustor is introduced into the intake pipe of the engine; and
- a switching valve for switching a flow of exhaust gas of said combustor,
- wherein said switching valve is operated by said control unit in such a manner that exhaust gas of said combustor is introduced into said first communication pipe when the engine is stopped, and the exhaust gas of said combustor is introduced into said second communication pipe when the engine is operated, during said combustor operates.

20. The heating apparatus according to claim 18, wherein:
- said heating unit heats air to be blown into the passenger compartment by using cooling liquid for cooling the engine as a heating source; and
- said combustor is disposed to heat the cooling liquid flowing into the heating unit.

21. The heating apparatus according to claim 20, wherein the cooling liquid bypasses said combustor until a predetermined time passes after said combustor starts operating.

22. The heating apparatus according to claim 19, wherein said switching valve is electrically operated by electrical power.

23. The heating apparatus according to claim 19, wherein said switching valve is mechanically operated by pressure of exhaust gas of the engine.

24. The heating apparatus according to claim 19, further comprising:
- a vacuum pump for generating a negative pressure with the operation of the engine,
- wherein said switching valve is set to be operated by the negative pressure of the vacuum pump.

25. A heating apparatus for heating a passenger compartment of a vehicle having an internal combustion engine which sucks air from an intake pipe and discharges exhaust gas to the atmosphere from an exhaust pipe in which a catalyst for cleaning exhaust gas discharged from the engine is provided, the intake pipe having therein a throttle valve for adjusting an opening degree of the intake pipe, said heating apparatus comprising:
- a heating unit for heating the passenger compartment by heat generated from the engine;
- a combustor for heating the passenger compartment by burning fuel;
- a first communication pipe through which an intake side of said combustor communicates with the intake pipe of the engine at an upstream side of said throttle valve in a flow direction of intake air;
- a second communication pipe through which the exhaust pipe of the engine communicates with the intake pipe of the engine at a downstream side of said throttle valve in the flow direction of intake air;
- a switching valve disposed in said second communication pipe, for opening and closing said second communication pipe; and
- a third communication pipe through which an exhaust side of said combustor communicates with said second communication pipe at a position between said switching valve and the intake pipe, wherein:
  - said switching valve opens said second communication pipe and said throttle valve is closed when the engine is stopped when said combustor operates; and
  - said throttle valve is opened when the engine is operated.

26. The heating apparatus according to claim 25, wherein:
- said heating unit heats air to be blown into the passenger compartment by using cooling liquid for cooling the engine as a heating source; and
- said combustor is disposed to heat the cooling liquid flowing into the heating unit.

27. The heating apparatus according to claim 25, wherein said switching valve closes said second communication pipe when the engine is operated when said combustor operates.

28. The heating apparatus according to claim 25, wherein said second communication pipe is connected to the exhaust pipe at an upstream side of the catalyst in a flow direction of exhaust gas of the engine.

29. A heating apparatus for heating a passenger compartment of a vehicle having a liquid-cooled internal combustion engine which sucks air from an intake pipe and discharges exhaust gas from an exhaust pipe in which a catalyst for cleaning exhaust gas discharged from the engine is provided, said heating apparatus comprising:
- a heat exchanger for heating the passenger compartment by using cooling liquid for cooling the engine as a heating source;
- a combustor disposed to heat the cooling liquid supplying to said heat exchanger by burning fuel; and
- a communication pipe through which exhaust gas of said combustor is introduced into the catalyst in the exhaust pipe.

30. The heating apparatus according to claim 29, further comprising:
- a blower for blowing air into said combustor; and
- a control unit for controlling operation of said combustor, wherein:
  - said control unit includes a pressure difference detector for detecting a pressure difference between a pressure on an intake side of said combustor and a pressure on an exhaust side of said combustor, target pressure difference determining means for determining a target pressure difference based on an operation state of said combustor, and blower controlling means for controlling an air amount blown by said blower; and
  - said blower control means controls the air amount blown from said blower in such a manner that a pressure difference detected by said pressure difference director becomes to be equal to the target pressure difference.

31. A heating apparatus for heating a passenger compartment of a vehicle having a liquid-cooled internal combustion engine which sucks air from an intake pipe and discharges exhaust gas from an exhaust pipe in which a muffler for reducing noise generated from exhaust gas of the engine is provided, said heating apparatus comprising:

a heat exchanger for heating the passenger compartment by using cooling liquid for cooling the engine as a heating source;

a combustor disposed to heat the cooling liquid supplying to said heat exchanger by burning fuel; and a communication pipe through which exhaust gas of said combustor is introduced into the muffler in the exhaust pipe.

32. The heating apparatus according to claim 31, further comprising:

a blower for blowing air into said combustor; and a control unit for controlling operation of said combustor, wherein:

said control unit includes a pressure difference detector for detecting a pressure difference between a pressure on an intake side of said combustor and a pressure on an exhaust side of said combustor, target pressure difference determining means for determining a target pressure difference based on an operation state of said combustor, and blower controlling means for controlling an air amount blown by said blower; and said blower control means controls the air amount blown from said blower in such a manner that a pressure difference detected by said pressure difference director becomes to be equal to the target pressure difference.

33. A heating apparatus for heating a passenger compartment of a vehicle having an internal combustion engine which sucks air from an intake pipe and discharges exhaust gas from an exhaust pipe, and a supercharger for supercharging air introduced into the engine, said heating apparatus comprising:

a combustor for heating the passenger compartment by burning fuel; and a communication pipe through which air compressed by the supercharger is introduced into said combustor.

34. The heating apparatus according to claim 33, further comprising a heat exchanger for heating air to be blown into the passenger compartment using cooling liquid for cooling the engine as a heating source, wherein said combustor is disposed to heat the cooling liquid flowing into the heat exchanger.

35. The heating apparatus according to claim 34, further comprising an exhaust gas circulating unit for introducing exhaust gas of the engine to the intake pipe of the engine when temperature of cooling liquid of the engine is higher than a first predetermined temperature.

36. The heating apparatus according to claim 35, wherein said combustor is operated until the temperature of cooling liquid of the engine becomes equal to or higher than a second predetermined temperature lower than the first predetermined temperature.

37. A heating apparatus for heating a passenger compartment of a vehicle having an internal combustion engine which sucks air from an intake pipe and discharges exhaust gas from an exhaust pipe, a supercharger for supercharging air introduced into the engine by energy of exhaust gas of the engine, and an inter cooler disposed in the intake pipe for cooling air compressed in the supercharger, said heating apparatus comprising:

a combustor for heating the passenger compartment by burning fuel;

a communication pipe through which an exhaust side of said combustor communicates the intake pipe at a downstream air side of the inter cooler; and means for introducing air in the intake pipe into said combustor in such a manner that air having a higher pressure between a downstream air side and an upstream air side of the supercharger is introduced into said combustor.

38. A heating apparatus for heating a passenger compartment of a vehicle having a diesel engine and a fuel heater for heating fuel supplying into the diesel engine, said heating apparatus comprising:

a combustor for heating the passenger compartment by burning fuel; and means for supplying fuel heated in the fuel heater into said combustor.

39. A heating apparatus for heating a passenger compartment of a vehicle having an internal combustion engine which sucks air from an intake pipe and discharges exhaust gas from an exhaust pipe, the intake pipe having therein a throttle valve for adjusting an opening degree of the intake pipe, said heating apparatus comprising:

a combustor for heating the passenger compartment by burning fuel;

a first communication pipe connected to the intake pipe of the engine at an upstream side of said throttle valve in a flow direction of intake air in such a manner that a part of intake air is introduced into said combustor; and a second communication pipe connected to the intake pipe of the engine at a downstream side of said throttle valve in the flow direction of intake air in such a manner that exhaust gas of said combustor is introduced into the intake pipe of the engine.

40. The heating apparatus according to claim 39, wherein an air amount supplying to said combustor is adjusted by adjusting an opening degree of said throttle valve.

41. A heating apparatus for heating a passenger compartment of a vehicle having an internal combustion engine which sucks air from an intake pipe and discharges exhaust gas from an exhaust pipe, said heating apparatus comprising:

a combustor for heating the passenger compartment by burning fuel;

means for generating a pressure difference between a first position and a second position in the intake pipe when the engine operates, pressure at the first position being larger than that at the second position when the engine operates;

a first communication pipe through which an intake side of said combustor is connected to the first position of the intake pipe; and a second communication pipe through which an exhaust side of said combustor is connected to the second position of the intake pipe.

* * * * *